United States Patent
Kondo et al.

(10) Patent No.: US 6,231,785 B1
(45) Date of Patent: May 15, 2001

(54) BENZENE DERIVATIVE AND ITS PRODUCTION METHOD

(75) Inventors: Tomoyuki Kondo, Chiba; Katsuhiko Kobayashi, Kumamoto; Shuichi Matsui; Hiroyuki Takeuchi, both of Chiba, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/404,141

(22) Filed: Sep. 27, 1999

(30) Foreign Application Priority Data

Sep. 25, 1998 (JP) .................................................. 10-273294

(51) Int. Cl.⁷ .......................... C09K 19/34; C09K 19/30; C09K 19/12; C07C 22/00
(52) U.S. Cl. .................. 252/299.6; 252/299.61; 252/299.63; 252/299.66; 570/144
(58) Field of Search .......................... 252/299.63, 299.66, 252/299.61, 299.6; 570/144

(56) References Cited

U.S. PATENT DOCUMENTS

| 5,032,313 | 7/1991 | Goto et al. ........................ 252/299.63 |
| 5,589,102 | * 12/1996 | Bartmann et al. ............... 252/299.01 |
| 5,665,271 | * 9/1997 | Ogihara et al. .................. 252/299.61 |
| 5,858,270 | 1/1999 | Matsui et al. .................... 252/299.01 |
| 6,007,740 | * 12/1999 | Andou et al. .................... 252/299.63 |

FOREIGN PATENT DOCUMENTS 5-255165  10/1993 (JP) .

OTHER PUBLICATIONS

A. HAAS et al., "Synthese seitenketenfluorierter aromatischer Verbindungen und deren chemische Reaktivität", Chem. Ber., 121, 1329–1340 (1988).

* cited by examiner

Primary Examiner—C. H. Kelly

(74) Attorney, Agent, or Firm—Wenderoth, Lind & Ponack, L.L.P.

(57) ABSTRACT

A method of producing a difluorobenzyl ether derivative (6)

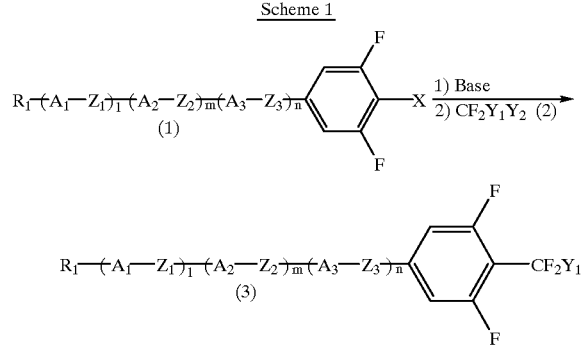

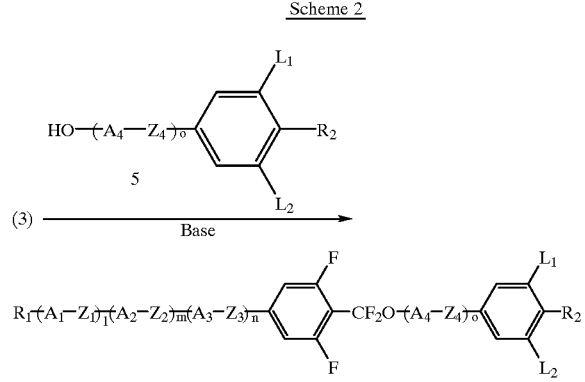

in which a benzene derivative (1) is reacted with a base to form carbanion which is in turn reacted with a difluoromethane derivative (2) to give a benzene derivative (3) which is further reacted with a phenol derivative (5) in the presence of a base.

7 Claims, No Drawings

BENZENE DERIVATIVE AND ITS PRODUCTION METHOD

FIELD OF THE INVENTION

This invention relates to a benzene derivative useful for liquid crystalline materials and to its simple and effective production method. The invention further relates to simple and effective production method of a difluorobenzyl ether derivative being derived from the benzene derivative as an intermediate and being provided with properties feasible as the liquid crystalline materials.

BACKGROUND OF THE INVENTION

Recently more and more used are active matrix driving systems with good display qualities such as contrast, display capacity and response time. Among the systems, a liquid crystalline display device of thin film transistor (TFT) system is dominating for a television, a view finder and a personal computer and so on. Also a STN system display device is largely employed for a display device of a personal computer and others, because of its low production cost owing to its relatively simple structure and its large display capacity compared with the active matrix system display device.

Recent developmental tendency in this field is focused on downsizing, mobilizing, saving of consuming power and responding with high speed in the liquid crystalline display device. Thus required are such liquid crystalline compounds and liquid crystalline compositions having low driving voltage (i.e. low threshold voltage) and low viscosity.

The threshold voltage (Vth) is a function of dielectric anisotropy ($\Delta\epsilon$) as represented by the equation below (Mol. Cryst. Liq. Cryst., 12, 57 (1970)):

$$Vth=\pi(K/\epsilon_0\Delta\epsilon)^{1/2}$$

where K is a elastic constant and $\epsilon_0$ is a dielectric constant under vacuum.

As to be understood from the equation, two ways to lower Vth can be considered either increasing $\Delta\epsilon$ or reducing K. However, as the control of K is difficult in the state of art technology, it is required to use liquid crystalline materials having large $\Delta\epsilon$, which has stimulated vigorous development of liquid crystalline compounds having large $\Delta\epsilon$.

While viscosity is a factor controlling the response speed of liquid crystalline molecule to the electric field, it is desirable to use liquid crystalline compounds having low viscosity as the majority to prepare the liquid crystal composition with high response speed.

Shown below are typical compounds (7) and (8) in Laid-open Japanese Patent Publication No. Hei 2-233 626, developed as liquid crystalline materials for low driving voltage which is usable for the liquid crystal display device with TFT system.

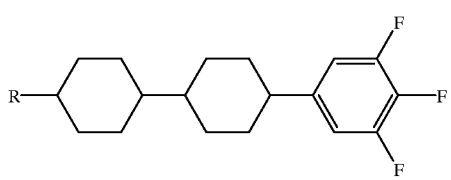
(7)

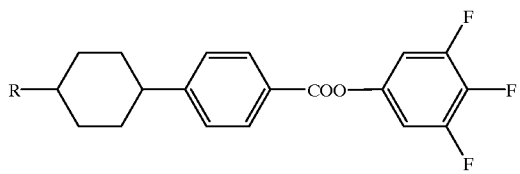
(8)

Both compounds (7) and (8) have a 3,4,5-trifluorophenyl group on one terminal of the molecule and hence are expected to be liquid crystalline materials for low driving voltage. However, toward the request of further reduction of driving voltage, the compound (7) ($\Delta\epsilon=10$) is hardly satisfy the request because of its small dielectric anisotropy. On the other hand, the compound (8) ($\Delta\epsilon=15$) is unsuited to high speed responding, because an ester group existing in the center of the molecule make viscosity high although it is possible to achieve low voltage driving due to its large dielectric anisotropy. Thus such a compound that satisfies both low consumption power and high speed response is not yet known.

It is also known that a difluoromethyleneoxy group acts to increase $\Delta\epsilon$ of the compound, which is similar to the ester group mentioned above.

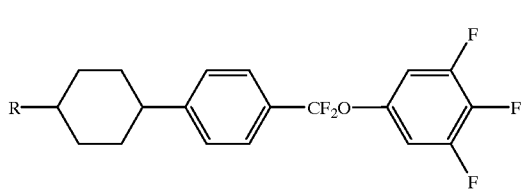
(9)

DE-19531165A1

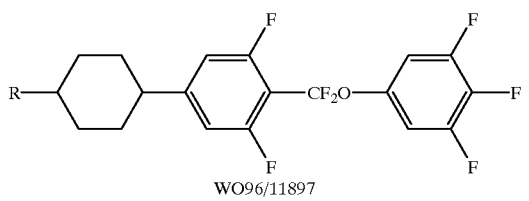
(10)

WO96/11897

Both compound (9) (DE-19 531 165 Al) and compound (10) (WO 96/11 897) are liquid crystalline compounds having a difluoromethyleneoxy group, and these two patent specifications disclose that these compounds are useful for components of liquid crystalline composition which are capable of low voltage driving and high speed response due to their large $\Delta\epsilon$ and relatively low viscosity.

As to the production method of these difluorobenzyl ether, the following producing method is disclosed in the patents DE-19 531 165 Al and Laid-open Japanese Patent Publication No. Hei 5-255 165:

Scheme 3

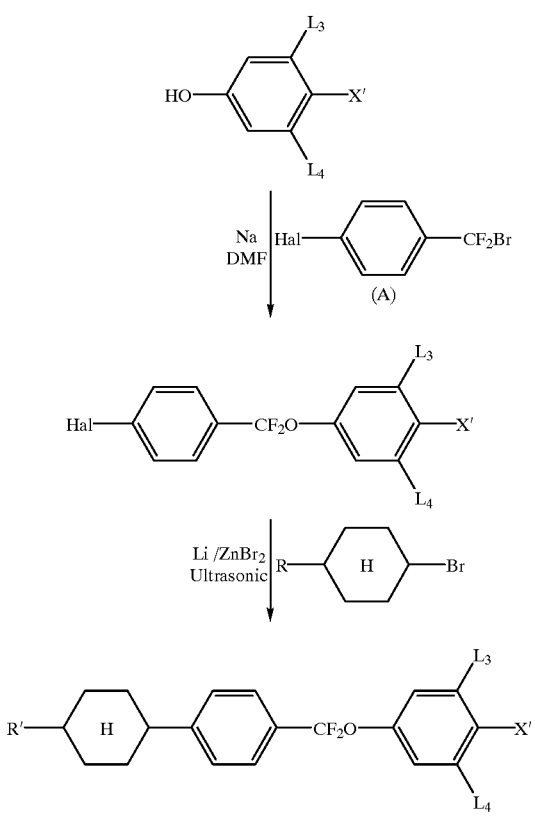

where X' represents fluorine or chlorine; L₃ and L₄ each independently represents hydrogen or fluorine; Hal represents halogen; R' represents alkyl, and Scheme 4

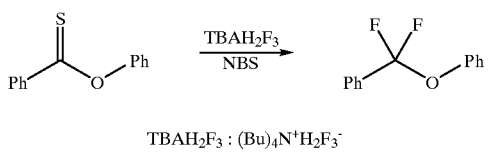

TBAH₂F₃ : (Bu)₄N⁺H₂F₃⁻ where Ph represents-phenyl.

The production route shown in Scheme 3 has multiple steps including alkylation after the etherification between the intermediate (A) and the phenol derivative. Then, the formation of by-products is anticipated.

As to the compound (A) used as a starting material in the method shown in Scheme 3, A. Haas et al. has reported the method of production (Scheme 5; Chem. Ber., 121, 1329–1340 (1988)):

Scheme 5

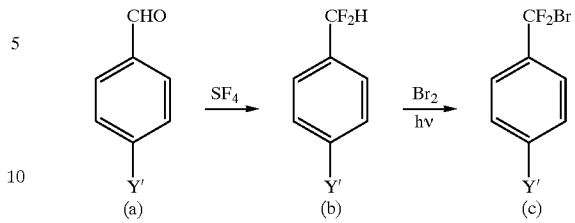

where Y' represents hydrogen, chlorine, nitro, trifluoromethyl or t-butyl.

The production route shown in Scheme 5 is a method of fluorinating the carbonyl of the benzaldehyde derivative (a) by sulfur tetrafluoride followed by brominating via photoreaction. Sulfur tetrafluoride used for the fluorination is highly reactive gas and a special reaction apparatus is necessary for its use due to its high toxicity. Further, as the bromination of benzyl position is carried out by the photoreaction (a radical reaction), it is anticipated to generate by-products being brominated at benzyl position on the substituent Y' when Y' is linear alkyl or 1,4-cyclohexylene.

The production route shown in Scheme 4 cannot also be a simple way, because the intermediate thion-O-ester itself requires long synthetic route and the thiocarbonyl must be fluorinated.

As above mentioned, it is not yet known on the method of producing the difluorobenzyl ether derivative which-are useful as liquid crystalline materials, and on the simple and efficient method of producing the benzene derivative which is important for the intermediate. It is anticipated that the demand for the simple production method of the difluorobenzyl ether derivative will increase with their development as liquid crystalline materials.

SUMMARY OF THE INVENTION

The object of this invention is to provide the difluorobenzyl ether derivative which are useful for liquid crystalline materials and its simple and efficient method of production; and to provide the benzene derivative which is starting materials for the difluorobenzyl ether derivative, is exhibiting proper physical properties for liquid crystalline materials, and is starting materials for medicine and agricultural chemicals, and also to provide its simple and efficient method of production.

We found that difluorohalomethyl can be easily introduced at the 4 position on a benzene ring by the reaction of the difluoromethane derivative with carbanion generated by the reaction of the 3,5-difluorobenzene derivative with a base.

Upon examining the physical properties of the benzene derivative thus obtained, we found that the derivative exhibits desirable characteristics as photo-electric materials, such as being colorless, forming liquid crystal phase within the temperature range favorable for photo-electric use, having relatively low viscosity and positive dielectric anisotropy of medium level, thus performing preferable-behavior as a component of a liquid crystalline composition.

Further, we found that the difluorobenzyl ether derivative is obtained in high yield by the reaction of a phenol derivative with the benzene derivative under the conventional conditions for etherification, and we completed the invention.

Accordingly, the invention includes:

(1) A method (Scheme 1) for producing a benzene derivative represented by the formula (3) (where $R_1$ represents hydrogen or alkyl having 1 to 15 carbons, one or more methylene in the alkyl which is not adjacent to each other may be replaced by oxygen, sulfur or —CH=CH—, and any hydrogen in the alkyl may be replaced by fluorine; $A_1$, $A_2$ and $A_3$ each represent independently trans-1,4-cyclohexylene in which one or more methylene constituting the ring may be replaced by oxygen or sulfur, or 1,4-phenylene in which one or more hydrogen on the ring may be replaced by fluorine; $Z_1$, $Z_2$ and $Z_3$ each represent independently a single bond, —CH$_2$CH$_2$—, —(CH$_2$)$_4$—, —CH$_2$O— or —OCH$_2$—; l, m and n each represent independently 0 or 1; $Y_1$ represents chlorine, bromine or iodine) characterized in that Scheme 1

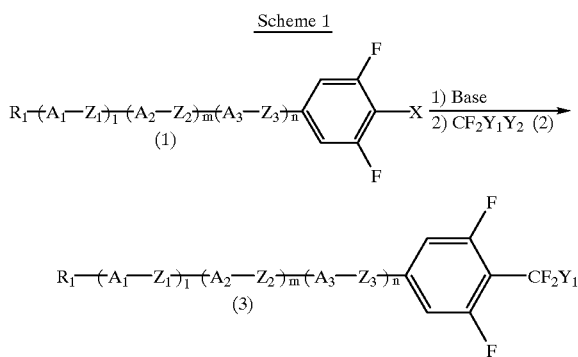

(5) A benzene derivative represented by the formula (4)

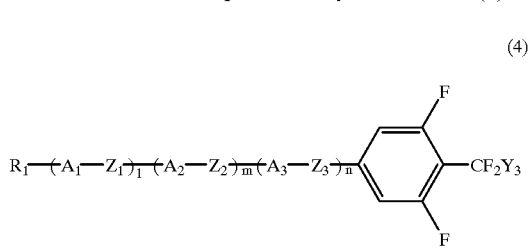

where $R_1$, $A_1$, $A_2$, $A_3$, $Z_1$, $Z_2$, $Z_3$, l, m and n have the same meaning as above; $Y_3$ represents bromine or iodine.

(6) A liquid crystalline composition containing two or more components characterized in that at least one compound represented by the formula (4) is contained.

(7) A method (Scheme 2) of producing a difluorobenzyl ether derivative represented by the formula (6) (where $R_2$ represents halogen, cyano or alkyl having 1 to 15 carbons, one or more methylene in the alkyl which are not adjacent to each other may be replaced by oxygen, sulfur or —CH=CH—, and one or more hydrogen in the alkyl may be replaced by halogen; $A_4$ represents 1,4-phenylene in which one or more hydrogen on the ring may be replaced by halogen; $Z_4$ represents a single bond, —CH$_2$CH$_2$—, —(CH$_2$)$_4$—, —CH$_2$O— or —OCH$_2$—; $L_1$ and $L_2$ each represent independently hydrogen or halogen; o is 0 or 1; $R_1$, $A_1$, $A_2$, $A_3$, $Z_1$, $Z_2$, $Z_3$, l, m and n each have the same meaning as above) characterized in that Scheme 2

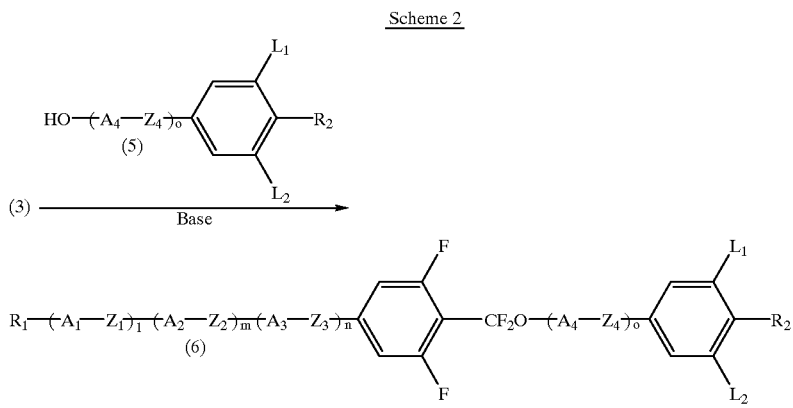

a benzene derivative represented by the formula (1) (where $R_1$, $A_1$, $A_2$, $A_3$, $Z_1$, $Z_2$, $Z_3$, l, m and n have the same meaning as above; X represents hydrogen, chlorine, bromine or iodine) is treated with a base, and the formed carbanion is reacted with a difluoromethane derivative represented by the formula (2) (where $Y_1$ and $Y_2$ each independently represent chlorine, bromine or iodine).

(2) A method for producing the benzene derivative according to claim 1, wherein both $Y_1$ and $Y_2$ in the formula (2) are bromine.

(3) A method for producing the benzene derivative according to claim 2, wherein alkyl lithium is used as the base.

(4) A method of producing the benzene derivative according to claim 3, wherein n-butyl lithium is used as the base.

the benzene derivative represented by the formula (3) (where $R_1$, $A_1$, $A_2$, $A_3$, $Z_1$, $Z_2$, $Z_3$, l, m and n have the same meaning described above) is reacted with a phenol derivative represented by the formula (5) ($A_4$, $Z_4$, $L_1$, $L_2$ and $R_2$ has the same meaning described above.

PREFERRED EMBODIMENTS

The benzene derivative represented by the formula (3) which is favorably obtainable by the method shown in Scheme 1 using the benzene derivative represented by the formula (1) as the starting material, can be concretely illustrated in the formulas (3-1) to (3-4) below:

(3-1)
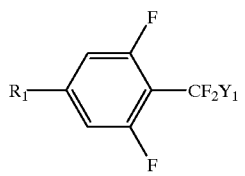

(3-2)
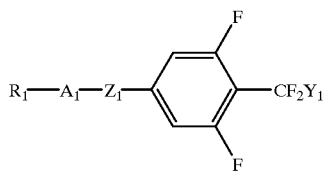

(3-3)
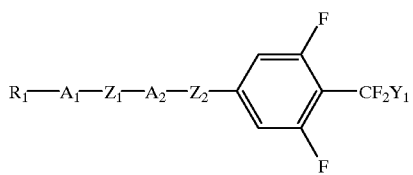

(3-4)
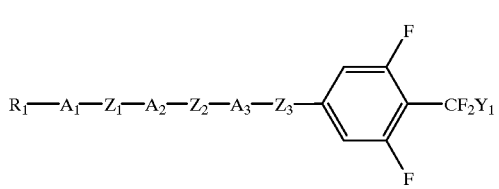

where $R_1$, $A_1$, $A_2$, $A_3$, $Z_1$, $Z_2$, $Z_3$ and $Y_1$ have the same meaning as described above.

The difluorobenzyl ether derivative represented by the formula (6) which is favorably obtainable by the method shown in Scheme 2 using a benzene derivative represented by the formula (3) as the starting material, can be concretely illustrated in the formulas (6-1) to (6-5) below:

(6-1)
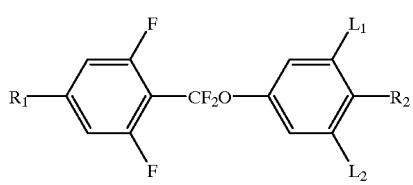

(6-2)
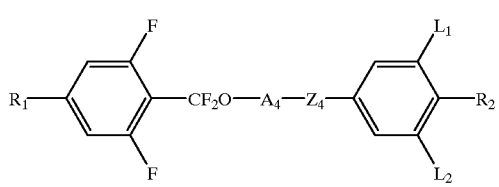

(6-3)
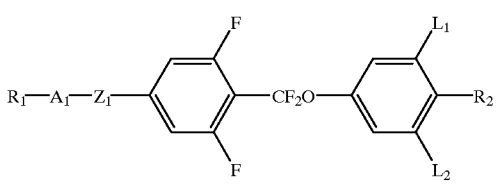

(6-4)
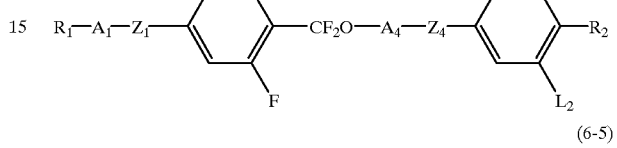

(6-5)
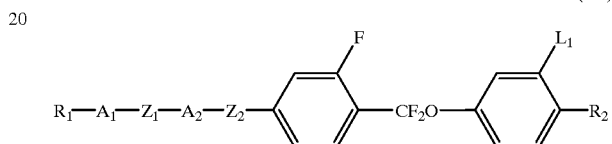

where $R_1$, $A_1$, $A_2$, $A_4$, $Z_1$, $Z_2$, $Z_4$, $L_1$, $L_2$ and $R_2$ have the same meaning as described above.

In the benzene derivative (3), $R_1$ represents hydrogen or alkyl having 1 to 15 carbons, one or more methylene in the alkyl which is not adjacent to each other may be replaced by oxygen, sulfur or —CH═CH—, and any hydrogen in the alkyl may be replaced by fluorine; $A_1$, $A_2$ and $A_3$ are each independently represents trans-1,4-cyclohexylene in which one or more methylene constituting the ring may be replaced by oxygen or sulfur, or represents 1,4-phenylene in which one or more hydrogen on the ring may be replaced by fluorine; $Z_1$, $Z_2$ and $Z_3$ represent each independently a single bond, —CH$_2$CH$_2$—, —(CH$_2$)$_4$—, —CH$_2$O— or —OCH$_2$—; m and n each independently represent 0 or 1; $Y_1$ represents chlorine, bromine or iodine.

$R_1$ can be concretely illustrated as hydrogen, alkyl, alkoxy, alkoxyalkyl, alkylthio, alkylthioalkyl, alkenyl, alkenyloxy or alkenylthio.

More concretely, $R_1$ can be methyl, ethyl, propyl, butyl, pentyl, hexyl, heptyl, octyl, nonyl, decyl, methoxy, ethoxy, propoxy, butoxy, pentoxy, hexyloxy, heptyloxy, octyloxy, methoxymethyl, ethoxymethyl, propoxymethyl, butoxymethyl, methoxyethyl, ethoxyethyl, propoxyethyl, methoxypropyl, ethoxypropyl, propoxypropyl, methylthio, ethylthio, propylthio, butylthio, pentylthio, hexylthio, heptylthio, octylthio, methylthiomethyl, ethylthiomethyl, propylthiomethyl, butyl thiomethyl, methylthioethyl, ethylthioethyl, propylthioethyl, methylthiopropyl, ethylthiopropyl, propylthiopropyl, vinyl, 1-propenyl, 1-butenyl, 1-pentenyl, 3-butenyl, 3-pentenyl, aryloxy, arylthio and so on.

$A_1$, $A_2$ and $A_3$ in the formula (3) can be concretely illustrated in the formulas (r-1) to (r-16) below.

(r-1) 

(r-2) 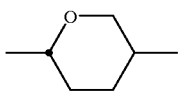

(r-3) 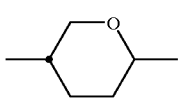

(r-4) 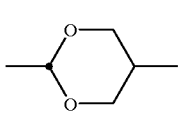

(r-5) 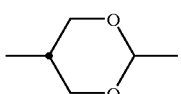

(r-6) 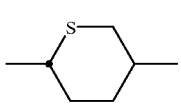

(r-7) 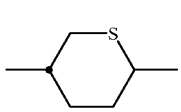

(r-8) 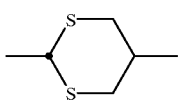

(r-9) 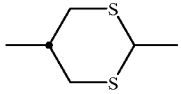

(r-10) 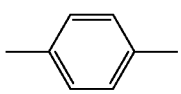

(r-11) 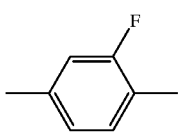

(r-12) 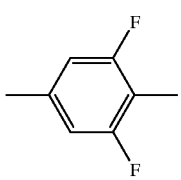

-continued (r-13) 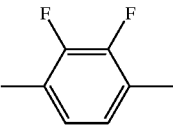

(r-14) 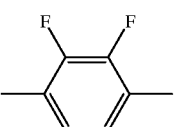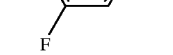

(r-15) 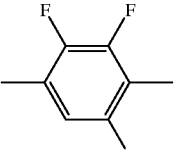

(r-16) 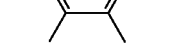

In the difluorobenzyl ether derivative (6), $R_1$, $A_1$, $A_2$, $A_3$, $Z_1$, $Z_2$, $Z_3$, l, m and n have the same meaning described above; $R_2$ represents halogen, cyano or alkyl having 1 to 15 carbons, one or more methylene in the alkyl which are not adjacent to each other may be replaced by oxygen, sulfur or —CH=CH—, and one or more hydrogen in the alkyl may be substituted by halogen; $A_4$ represents 1,4-phenylene in which one or more hydrogen on the ring may be replaced by halogen; $Z_4$ represents a single bond, —CH$_2$CH$_2$—, —(CH$_2$)$_4$—, —CH$_2$O— or —OCH$_2$—; $L_1$ and $L_2$ represent each independently hydrogen or halogen; o means 0 or 1.

$R_2$ can be concretely illustrated as fluorine, chlorine, cyano, alkyl, alkoxy, alkylthio, alkoxyalkyl, alkylthioalkyl, alkenyl, alkenyloxy, alkenylthio, halogen-substituted alkyl, halogenated alkoxy, halogen-substituted alkoxyalkyl, and halogen-substituted alkenyl.

More concretely, $R_2$ can be methyl, ethyl, propyl, butyl, pentyl, hexyl, heptyl, octyl, nonyl, decyl, methoxy, ethoxy, propoxy, butoxy, pentoxy, hexyloxy, heptyloxy, octyloxy, methoxymethyl, ethoxymethyl, propoxymethyl, butoxymethyl, methoxyethyl, ethoxyethyl, propoxyethyl, methoxypropyl, ethoxypropyl, propoxypropyl, methylthio, ethylthio, propylthio, butylthio, pentylthio, hexylthio, heptylthio, octylthio, methylthiomethyl, ethylthiomethyl, propylthiomethyl, butylthiomethyl, methylthioethyl, ethylthioethyl, propylthioethyl, methylthiopropyl, ethylthiopropyl, propylthiopropyl, vinyl, 1-propenyl, 1-butenyl, 1-pentenyl, 3-butenyl, 3-pentenyl, allyloxy, trifluoromethyl, difluoromethyl, difluorochloromethyl, 2,2,2-trifluoroethyl, 2-fluoroethyl, 3-fluoropropyl, 4-fluorobutyl, 5-fluoropentyl, 3-chloropropyl, trifluoromethoxy, difluoromethoxy, difluorochloromethoxy, pentafluoroethoxy, 1,1,2,2-tetrafluoroethoxy, heptafluoropropoxy, 1,1,2,3,3,3-hexafluoropropoxy, trifluoromethoxymethyl, 2-fluoroethenyl, 2,2-difluoroethenyl, 1,2,2-trifluoroethenyl, 3-fluoro-1-butenyl and 4-fluoro-1-butenyl.

$A_4$ can be concretely illustrated in the formulas (r-10) to (r-16) shown above.

The benzene derivative (1) used as the starting material in the production method of the benzene derivative (3) can be easily produced according to the method described below.

The compound (1-1) in which n=1, $A_3$ is trans-1,4-cyclohexylene, $Z_3$ is a single bond and X is hydrogen in the formula (1) can be easily produced according to the method described below. Namely, the compound (1-1) can be produced by the reaction of the Grignard reagent (14) prepared from 3,5-difluorobromobenzene with the cyclohexanone derivative (13) to give the alcohol compound (15), followed by the dehydration with a mineral acid such as hydrochloric acid, sulfuric acid etc., an organic acid such as p-toluenesulfonic acid, or with non-aqueous acidic ion-exchange resin, and followed by the catalytic hydrogenation in the presence of hydrogenous reduction catalyst such as paradium-carbon or Raney nickel:

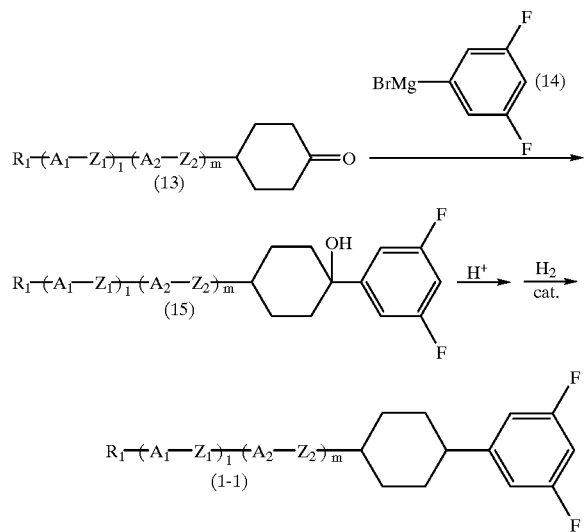

where $R_1$, $A_1$, $A_2$, $Z_1$, $Z_2$, l and m each have the same meaning as described above.

The compound (1-2) in which n=1, $A_3$ is 1,4-phenylene that may be optionally substituted by fluorine, $Z_3$ is a single bond and X is hydrogen in the formula (1), can be easily produced by the method described below. Namely, according to the method reported by Akira. Suzuki et al. in J. of Synthetic Organic Chemistry, Japan, 46 (9), 848 (1988), the compound (1-2) can be produced by the reaction of the halogen-substituted benzene derivative (16) in the presence of catalyst such as tetrakistriphenylphosphinepalladium(0) with the boronic acid derivative (17) which is obtainable by the action of trialkyl borate to the Grignard reagent (14) mentioned before and the following hydrolysis:

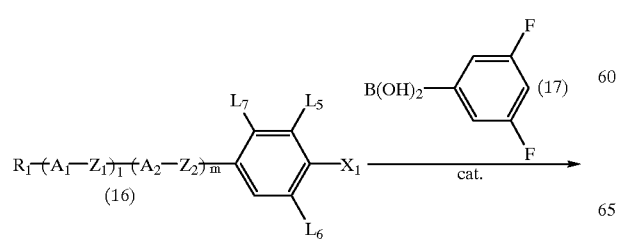

-continued

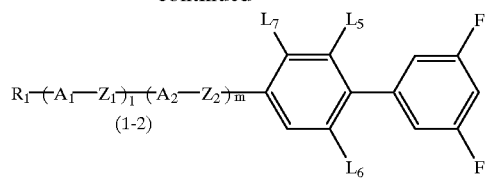

where $R_1$, $A_1$, $A_2$, $Z_1$, $Z_2$, l and m each have the same meaning as described above; $L_5$, $L_6$ and $L_7$ each independently represent hydrogen or fluorine.

The compound (1-3) in which n=1, Z3 is —$CH_2CH_2$— and X is hydrogen in the formula (1) can be easily produced by the method described below. Namely, the acetaldehyde derivative (18) is reacted with the Grignard reagent (14), and the formed alcohol compound (19) is dehydrated in the presence of an acid catalyst and then catalytic hydrogenation is carried out to give the compound (1-3):

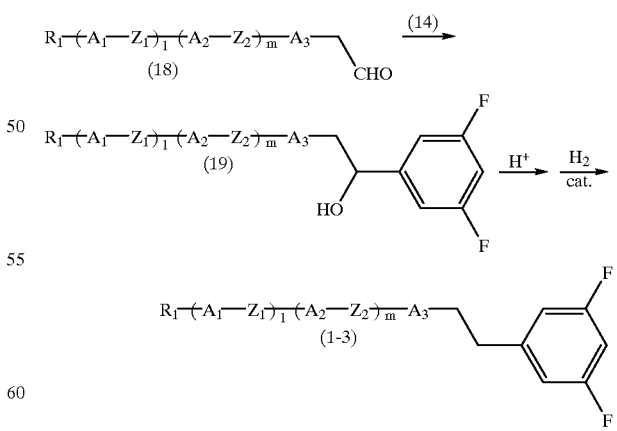

where $R_1$, $A_1$, $A_2$, $A_3$, $Z_1$, $Z_2$, l and m each have the same meaning as described above.

The compound (1-4) in which m=1, $Z_2$ is —$CH_2O$— and X is hydrogen in the formula (1) can be easily produced by the method described below. Namely, the compound (1-4)

having a ether bond can be produced by the reaction of the alcohol or phenol derivative (21) in the presence of a base such as alkali metal hydroxide or alkali metal hydride in an aprotic polar solvent such as DMF, with the alkyl bromide (20) obtained by the bromination of the corresponding alcohol (O. Kamm et al., Org. Synth., I, 25 (1941); J. G. Calzada et al., Org. Synth., 54, 63 (1974)):

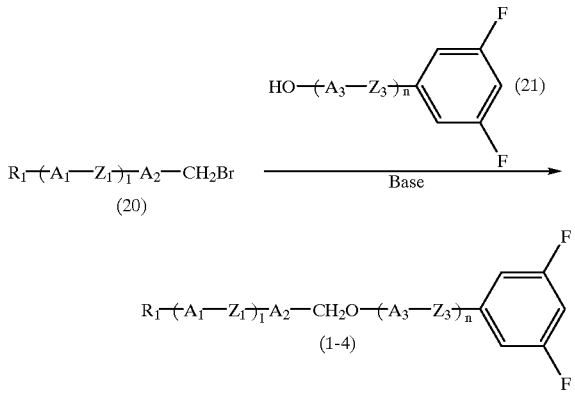

where $R_1$, $A_1$, $A_2$, $A_3$, $Z_1$, $Z_3$, l and n each have the same meaning as described above.

The compound in which —CH=CH— or —(CH$_2$)$_4$— is introduced at the position of $Z_1$, $Z_2$ or $Z_3$ in the formula (1) can be produced according to the method described in U.S. Pat. No. 5,468,421 and U.S. Pat. No. 5,641,432.

The base used in the production method of the benzene derivative (3) of this invention can be any base that can generate carbanion at the 4-position on the benzene ring of the 3,5-difluorobenzene derivative such as alkali metal, alkali-metal hydride, alkyl lithium or alkali metal alcoholate. Among them, alkyl lithium is preferable and especially n-butyl lithium is most preferable because of its easy availability, safety of handling and capability of generating carbanion at the 4-position of the 3,5-difluorobenzene ring at high selectivity.

The amount of the base used in the reaction is preferably 0.9 to 1.5 equivalents to compound (1) in case of X=H, and is most preferably 1.1 to 1.3 equivalents to increase the conversion yield while maintaining high selectivity.

In case of X being chlorine, bromine or iodine in the compound (1), the amount of the base used is preferably 1.8 to 2.5 equivalents and most preferably 2.1 to 2.3 equivalents to the compound (1).

The difluoromethane derivative (2) used in the production method of benzene derivative (3) of this invention can be usable when $Y_1$ and $Y_2$ are any halogen other than fluorine.

Among the difluoromethane derivative (2), dibromodifluoromethane ($Y_1$=$Y_2$=Br) and bromochlorodifluoromethane ($Y_1$=Cl, $Y_2$=Br) can be produced by the method reported by Haszeldine R. N. et al. (J. Chem. Soc., 1952, 4259), and also dichlorodifluoromethane ($Y_1$=$Y_2$=Cl) can be produced by the method reported by Hanne, A. L. et al. (Org. React., 1944, 2, 64). Among them dibromodifluoromethane ($Y_1$=$Y_2$=Br) is preferred because it is commercially available from plural reagent makers, also its handling is easy as it has a boiling point (b.p. 25° C.) near room temperature. The amount used is preferably 1.5 to 2.3 equivalents to compound (1), and most preferably 1.8 to 2.1 equivalents in order to suppress the formation of by-product of 3,5-difluoro-4-halobenzene derivative and to increase the conversion yield of the reaction.

As to the reaction solvents used in the production method of the benzene derivative (3) of this invention, any reaction solvent being inert to the reaction is usable. Aromatic compounds such as benzene, toluene etc, aliphatic hydrocarbons such as hexane, heptane etc, cycloaliphatic hydrocarbon such as cyclohexane etc, aliphatic ether compounds such as diethyl ether, methyl-t-butyl ether, ethylene glycol dimethyl ether, diethylene glycol dimethyl ether etc, and cyclic ethers such as tetrahydrofuran, dioxane etc are illustrated. Among them, aliphatic ether compounds and cyclic ether compounds are preferred because they have large solubility to the compounds represented by the formula (1). The amount used is preferably 5 to 20 times by weight to the compound (1).

The reaction temperature in the production method of the benzene derivative (3) of this invention is preferably under −40° C. for reacting a base in order to introduce difluorohalomethyl at 4-position of the 3,5-difluorobenzene derivative (1), and most preferably −74 to −60° C. The temperature is preferably under −30° C. and most preferably −74 to −60° C. in order to suppress the formation of by-product of 3,5-difluoro-4-halobenzene in the reaction of difluorodihalomethane with carbanion.

The reaction time in the production method of benzene derivative (3) of this invention is preferable to leave for 0.5 to 4 hours for maturity after the addition of the base in order to complete the reaction. For the reaction with difluoromethane, it is similarly preferable to mature for 0.5 to 4 hours after the addition of difluoromethane, totaling for 1 to 8 hours for overall reaction is preferable.

By the way, the production method of the benzene derivative (3) of this invention (Scheme 1) gives a small amount (less than 35% by weight) of by-products such as the 3,5-difluoro-4-halobenzene derivative (11) and others:

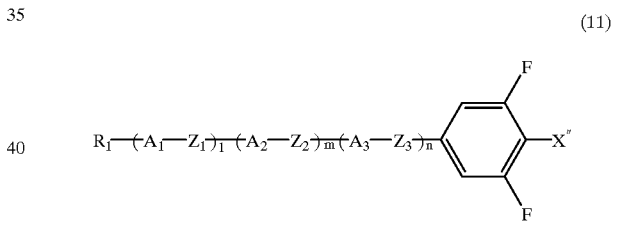

where $R_1$, $A_1$, $A_2$, $A_3$, $Z_1$, $Z_2$, $Z_3$, l, m and n each have the same meaning as described above; X" represents chlorine, bromine or iodine.

As to the separation and purification of the object from the reaction mixture in the production method of benzene derivative (3) of this invention, a conventional procedure employed in usual organic synthesis can be available. Namely, after adding water and an organic solvent for extraction to the reaction mixture, agitating enough, washing the separated organic layer with water, and drying with desiccant such as anhydrous sodium sulfate, the evaporation of the organic solvent under reduced pressure can afford the object with more than 60% purity as the concentrated residue. The object with more than 80% purity can be obtained by the treatment with silica gel chromatography or the distillation of the concentrated residue, and the object with more than 95% purity can be obtained by further recrystallization.

In the production method of difluorobenzyl ether derivative (6) of this invention described below, the concentrated residue of about 60% purity can be directly used without purifying the reaction mixture obtained in the production of the benzene derivative (3) described above.

The phenol derivative (5) used in the production method of the difluorobenzyl derivative (6) of this invention can be produced via the preparation of the boronic acid ester derivative by reacting trialkyl borate with the Grignard reagent prepared from bromobenzene derivative (22) according to the method of R. L. Kidwell et al. (Org. Synth., V, 918 (1973)) and the following oxidation by peroxide such as peracetic acid:

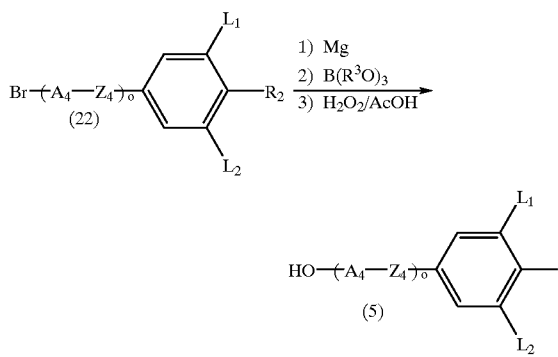

where $R_2$, $A_4$, $Z_4$, $L_1$, $L_2$, o each have the same meaning described above; $R^3$ represents alkyl.

This phenol derivative (5) can also be produced by the known method described below:
1) A method by the hydrolysis of a halogen-substituted derivative in the presence of a catalyst (Laid-open Japanese Patent Publication No. Sho 62-11 716).
2) A method by Baeyer-Villiger oxidation of acyl, ketone derivative (J. Fluorine Chem. (1994) 67,(1) 41).
3) A method by hydrolysis of a diazonium salt (Laid-open Japanese Patent Publication No. Hei 3- 246 244).
4) A method by fluorine substitution to a phenol derivative (Laid-open Japanese Patent Publication Nos. Sho 62-207 229 and Hei 2-34 335).

The compound which $R_2$ is halogen-substituted alkoxy in the formula (5) can be produced according to DE-19 531 165 A1.

As to the base used in the production method of difluorobenzyl ether (6) of this invention, alkali metal, alkali metal hydroxide, alkali metal carbonate, alkali metal hydride, alkali metal alcoholate etc can be used. From the standpoint of easy handling, alkali metal hydroxide such as potassium hydroxide, sodium hydroxide etc and alkali metal carbonate such as potassium carbonate, sodium carbonate etc are preferred. Alkali metal hydride such as sodium hydride is commercially available in oily form, which can be safely handled and preferably used.

The amount of the base used in this etherification varies depending on the kind of the base used, and 1 to 2 equivalents to the benzene derivative (3) is preferable.. In case of alkali metal hydroxide or alkali metal hydride, 1.1 to 1.3 equivalents are preferable, and in case of alkali metal carbonate, 1.5 to 2 equivalent is preferable. As this etherification can be accelerated in the presence of a catalytic amount of potassium iodide, the addition of potassium iodide of 0.03 to 0.1 equivalents to the benzene derivative (3) is favorable.

In this etherification, the use of more than one equivalent of the phenol derivative (5) to the benzene derivative (3) can afford the difluorobenzyl ether derivative (6) without any problem, and 1.1 to 1.3 equivalents is optimum in order to facilitate the separation and purification of the object from the reaction mixture.

As to the solvent used in the production method of the difluorobenzyl ether derivative (6) of this invention, any solvent being inert to the reaction is usable, preferably illustrated as aromatic compounds such as benzene, toluene etc, aliphatic hydrocarbons such as hexane, heptane etc, alicyclic hydrocarbons such as such as cyclohexane etc, aliphatic ether compounds such as methyl-t-butyl ether, ethylene glycol dimethyl ether, diethylene glycol dimethyl ether etc, cyclic ether compounds such as tetrahydrofurane, dioxane etc, an aprotic polar solvent such as N,N-dimethylacetamide, N,N-dimethylformamide (DMF), hexamethylphosphoric triamide (HMPA), N-methyl-2-pyrolidinone etc. Among these, N, N-dimethylacetamide and DMF are most preferable.

As to the amount of reaction solvent used in this reaction, any amount can be used as far as good agitation of the reaction mixture and the safe and stable reaction are maintained, and 3 to 10 times by weight to the benzene derivative (3) is practically preferable.

The reaction temperature in the production method of the difluorobenzyl ether derivative (6) of this invention can be set between room temperature and the boiling point of the solvents depending on the structure of benzene derivative (3), and preferably 60 to 130° C. The reaction time in this reaction is preferably 1 to 4 hours depending on the structure and the amount of benzene derivative (3) used and the kind of the base used. Concretely, in case alkali metal hydroxide or alkali metal carbonate is used as a base, a mixture of the benzene derivative (3), the phenol derivative (5), the base and the solvent are mixed and are preferably reacted for 1 to 3 hours at the temperature described above. In case alkali metal hydride is used as the base, a mixture of the phenol derivative (5) and the base is preferably reacted in the solvent describe above at the temperature ranging from room temperature to 60° C. for 0.5 to 1 hour, and further reaction for 1 to 3 hours at the temperature from 60 to 130° C. with the benzene derivative(3) added is preferable.

One may use conventional procedure in organic synthesis for separating and purifying the object from the reaction mixture in the production method of the difluorobenzyl ether derivative (6) of the present invention. Accordingly, after adding water and organic solvent for extraction to the reaction mixture, agitating, washing the separated organic layer with water, and drying on desiccant, the object with more than 90% purity can be obtained as the concentrated residue by the evaporation of the solvent under reduced pressure. The object with more than 95% purity can be obtained with silica gel chromatography or distillation. The object with more than 99% purity can be obtained with recrystallization.

In the production method of the difluorobenzyl ether derivative (6) of this invention, the benzene derivative (3) obtained in Scheme 1 can be used without purification, which is a mixture with 3,5-difluoro-4-halobenzene derivative (11). In this case, only benzene derivative (3) having difluorohalomethyl group reacts and gives a mixture of the objective difluorobenzyl ether derivative (6) and the 3,5-difluoro-4-halobennzene derivative (11). Both of which can be easily separated each other by known separation method such as recrystallization, silica gel column chromatography or distillation to give the object with 80 to more than 95% purity. Further, the object with more than 99% purity can be obtained by recrystallization.

Also the mixture of the difluorobenzyl ether derivative (6) and the 3, 5-difluoro-4-halobenzene derivative (11) can be subject to the catalytic hydrogenation in the presence of catalyst such as palladium-carbon to reduce the only 3,5- difluoro-4-halobenzene derivative (11) into the compound (1'):

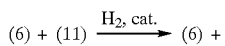

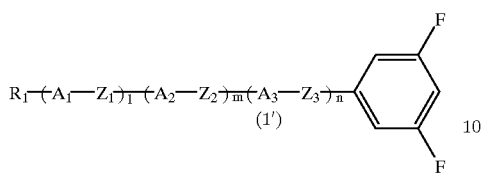

where $R_1$, $A_1$, $A_2$, $A_3$, $Z_1$, $Z_2$, $Z_3$, l, m and n have the same meaning as above.

The mixture of the difluorobenzyl ether derivative (6) and the compound (1') can be easily separated by known separation methods such as recrystallization, silica gel column chromatography or distillation, and gives the object with 80% to more than 95%. The object with more than 99% purity can be obtained by recrystallization. The recovered compound (1'), on the other hand, can be used in the reaction of Scheme 1 (a difluorohalomethylation) similar to the compound represented by the formula (1).

The 3,5-difluoro-4-halobenzene derivative (11) can be converted into the 3,5-difluoro-4-cyanobenzene derivative (12) which is useful for liquid crystalline materials (e.g. Laid-open Japanese Patent Publication No. Hei 1-131 144), by reacting with copper cyanide in the presence of a catalyst such as copper (I) iodide in an aprotic polar solvent such as N, N-dimethyl formamide:

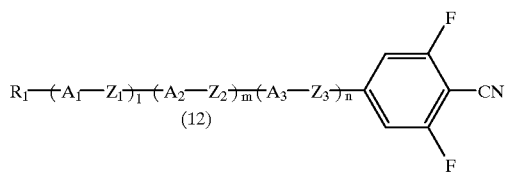

where $R_1$, $A_1$, $A_2$, $A_3$, $Z_1$, $Z_2$, $Z_3$, l, m and n have the same meaning as above.

As such, an effective utilization of by-product is possible in the method of this invention.

EXAMPLES

Detailed explanation will be made using examples below where nomenclatures maybe used such as: Cr for crystal, Sm for smectic, N for nematic, Iso for isotropic. The unit of phase transition temperature is °C. Also in the data expression of $^1$H-NMR and $^{19}$F-NMR, nomenclatures will be used such as: s for singlet, d for doublet, t for triplet and J for coupling constant (Hz). Also in the data expression of MS spectrum, M+ represents molecular ion peak where value in the parentheses represents ion peak intensity of each fragment.

Example 1

Preparation of 1-bromodifluoromethyl-2,6-difluoro-4-(trans-4-propylcyclohexyl)benzene—A compound of the formula (3) where $R_1$=n-propyl, l=1, M=n=0, $A_1$=trans-1,4-cyclohexylene, $Z_1$=single bond and $Y_1$=Br (compound No. 10)

In a flask equipped with a stirrer, a thermometer, a dropping funnel and a nitrogen inlet, 140 g (0.59 mol) of 2,6-difluoro-4-(trans-4-propylcyclohexyl)benzene was dissolved in 1000 ml of tetrahydrofuran (THF) and after cooling to −65° C. by coolant, and 455 ml of hexane solution (1.55 M) of n-butyllithium (0.71 mol) was added drop by drop with maintaining the same temperature. After the addition, the mixture was stirred for additional 2 hours keeping temperature below −60° C. A solution of dibromodifluoromethane 246.3 g (1.18 mol) in 150 ml THF was added at temperature maintained below −45° C. and was stirred for additional 2 hours at the same temperature. The reaction mixture was warmed to room temperature and after addition of 1000 ml water, the mixture was extracted with 1000 ml of toluene. The extracted layer was washed with water, dried over anhydrous magnesium sulfate and concentrated under reduced pressure to give 224 g of reaction product. The obtained product was purified by silica gel column chromatography (heptane as a eluent) to give 177 g of the column treated product. On analysis by gas chromatography (GC), the column treated product was revealed as a mixture of the object (66%), 2,6-difluoro-4-(trans-4-propylcyclohexyl)bromobenzene (32%) and other contaminants. The yield of the object based on 2,6-difluoro-4-(trans-4-propylcyclohexyl)benzene was 53.6%.

The above column treated product, 25 g, was recrystallized several times from ethanol to give 11.3 g of objective 1-bromodifluoromethyl-2,6-difluoro-4-(trans-4-propylcyclohexyl) benzene (oil at room temperature). The chemical structure of this compound was strongly supported by various spectral data. $^1$H-NMR (δ ppm): 0.5–2.2 (m, 16H), 2.42 (m, 1H), 6.7–6.9 (broad d, 2H). $^{19}$F-NMR: −40.3 (m, 2F), −111.2 (m, 2F). GC-MS: 348 (M+-F, 2.8), 322 (6.7), 288 (88.2), 225 (5.9), 202 (38.9), 189 (100), 176 (97.2), 163 (72.2), 133 (16.9), 81 (16.9), 69 (38.9), 55 (57.6), 41 (50.7).

Example 2

Preparation of trans-2-(3,5-difluoro-4-bromodifluoromethylphenyl)-5-propyl-1,3-dioxane—A compound of the formula (3) where $R_1$=n-propyl, l=1, m=n=0, $A_1$=trans-1,3-dioxane-2,5-diyl, $Z_1$=single-bond, $Y_1$=Br (compound No. 151)

In a flask equipped with a stirrer, a thermometer, a dropping funnel and a nitrogen inlet, 20.3 g (83.2 mmol) of trans-2-(3,5-difluorophenyl)-5-propyl-1,3-dioxane synthesized according to the method described in Laid-open Japanese Patent Publication Hei 4-503 678 was dissolved in 80 ml of THF and after cooled to below −65° C. by coolant, 65.5 ml (104.8 mmol) of hexane solution (1.61 M) of n-butyllithium was added drop by drop. After the addition, the mixture was stirred for additional 2 hours at temperature maintained below −60° C., and then 25 ml of THF solution of dibromodifluoromethane 35.2 g (166.4 nmol) was added at temperature maintained below −45° C. and was stirred for 2 hours at same temperature. The reaction mixture was warmed to room temperature and after addition of 200 ml water, the mixture was extracted with 300 ml of toluene. After washing the extracted layer with water, and drying over anhydrous magnesium sulfate, evaporation of solvent under reduced pressure gave 33.9 g of the reaction product. The GC analysis revealed that the product is a mixture of the object (84.9%) and trans-2-(3,5-difluoro-4-bromophenyl)-5-propyl-1,3-dioxane (15.1%). The obtained reaction product was purified by silica gel column chromatography (eluent: heptane/toluene=1/1) to give 21.8 g of column treated product (the object 99.3%). The yield of the objectbased on trans-2-(3,5-difluorophenyl)-5-propyl-1,3-dioxane was 58.6%. Recrystallization of the above treated product from ethanol yielded 18.1 g of the objective trans-2-(3,5-difluoro-4-bromodifluoromethylphenyl)-5-propyl-1,3-dioxane (oil at room temperature). The chemical structure of the object was strongly supported by various spectral data.
$^1$H-NMR (δ ppm): 0.8–1.7 (m,7H), 1.9–2.4 (m, 1H), 3.51 (t, J=11.5 Hz, 2H), 4.0–4.4 (m,2H), 5.34 (s, 1H), 7.0–7.3 (m, 2H). $^{19}$F-NMR: −41.3 (m, 2F), −109.9 (m, 2F). GC-MS: 371 (M+-Br, 87.5), 191 (10.4), 163 (48.9), 83 (21.9), 70 (33.3), 55 (100), 42 (77.1), 29 (26.9).
The following benzene derivatives (compound Nos. 1–9, 11–150, 152–302) can be also easily prepared according to the method described in EXAMPLE 1 and EXAMPLE 2.
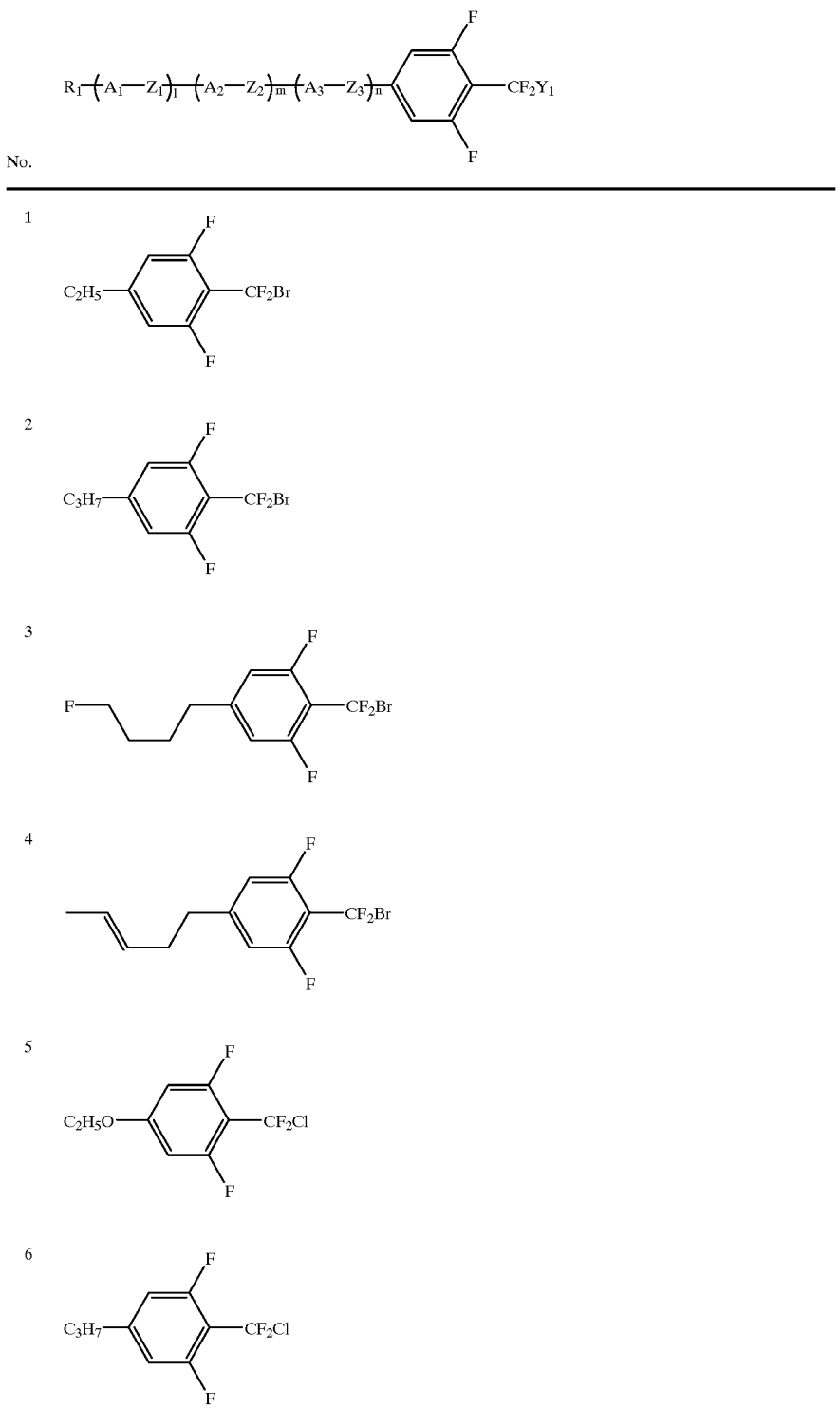

-continued
| | $R_1\text{-}(A_1\text{-}Z_1)_l\text{-}(A_2\text{-}Z_2)_m\text{-}(A_3\text{-}Z_3)_n\text{-}\phantom{}$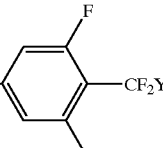 |
|---|---|
| No. | |
| 7 | 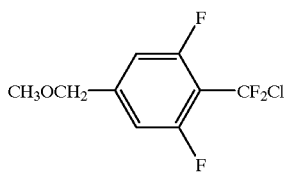 |
| 8 | 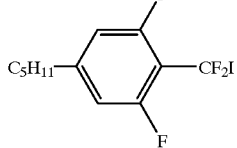 |
| 9 | 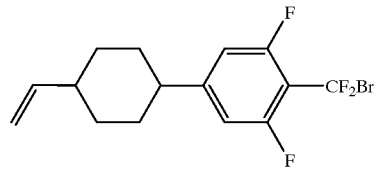 |
| 10 | 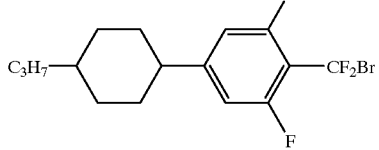 |
| 11 | 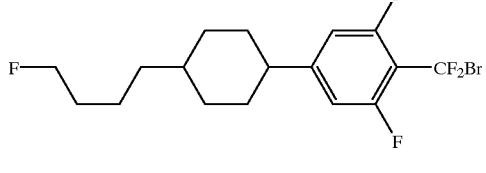 |
| 12 | 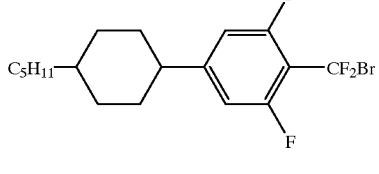 |
| 13 | 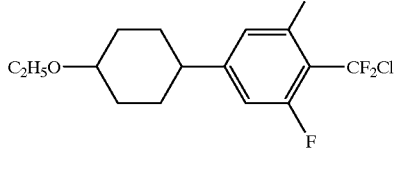 |

-continued
| | |
|---|---|
| No. | 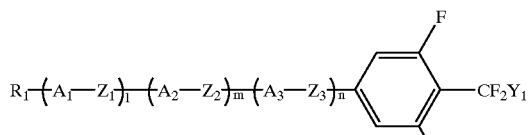 |
| 14 | 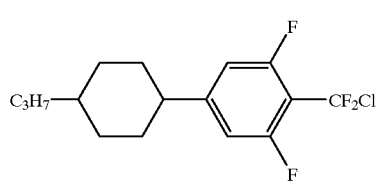 |
| 15 | 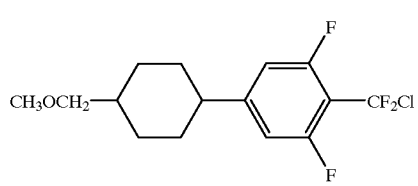 |
| 16 | 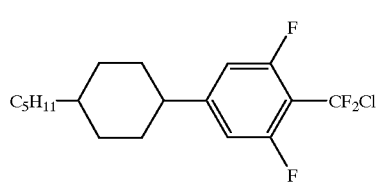 |
| 17 | 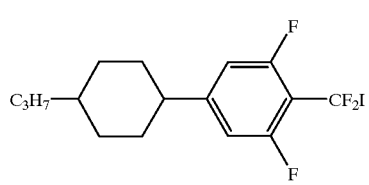 |
| 18 | 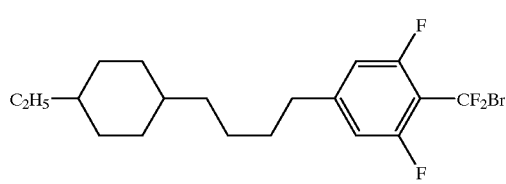 |
| 19 | 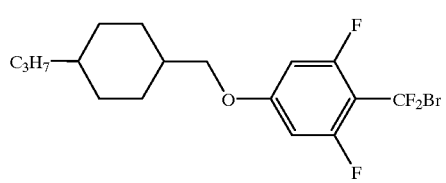 |
| 20 | 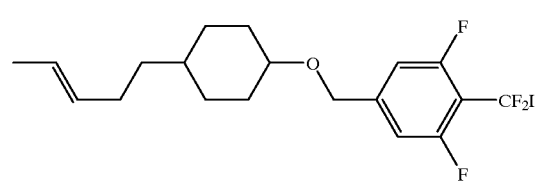 |

| No. | $R_1-(A_1-Z_1)_l-(A_2-Z_2)_m-(A_3-Z_3)_n$—[2,6-difluorophenyl]—$CF_2Y_1$ |
|---|---|
| 21 | 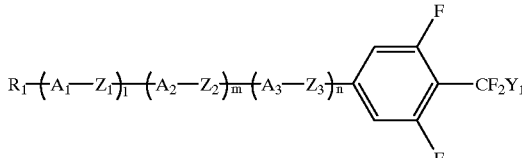 |
| 22 | 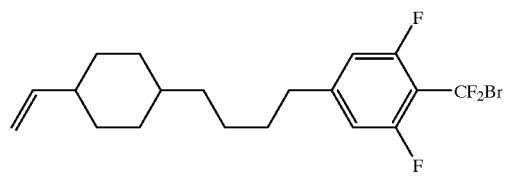 |
| 23 | 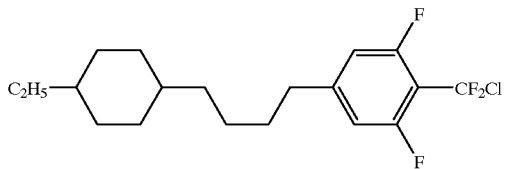 |
| 24 | 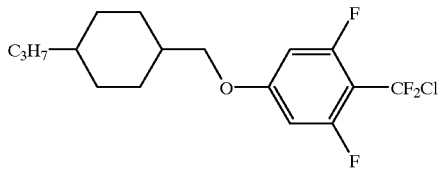 |
| 25 | 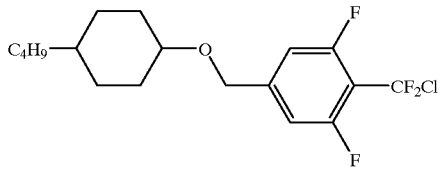 |
| 26 | 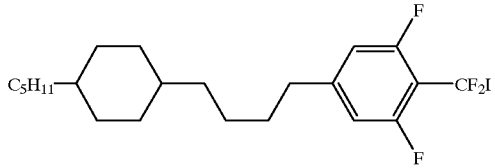 |
| 27 | 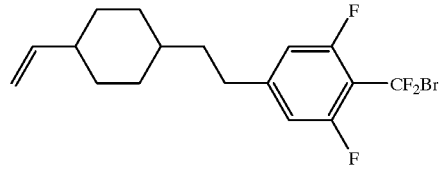 |

-continued
| | |
|---|---|
| No. | 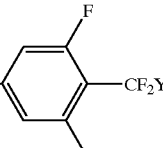 |
| 28 | 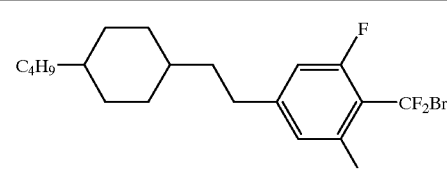 |
|---|---|
| 29 | 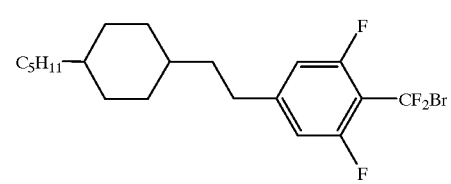 |
| 30 | 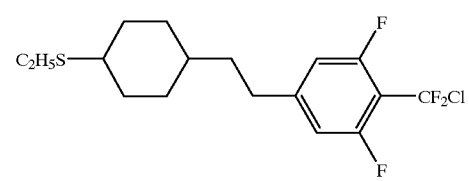 |
| 31 | 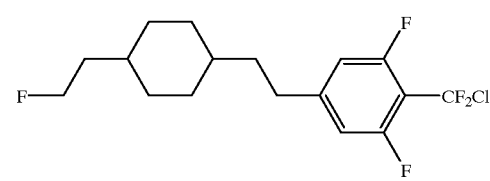 |
| 32 | 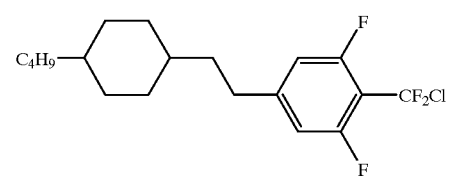 |
| 33 | 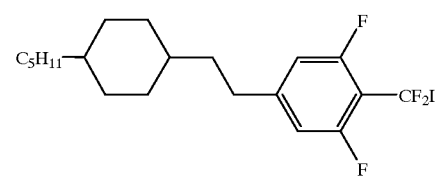 |
| 34 | 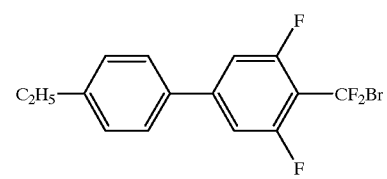 |

-continued
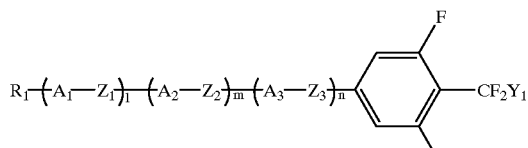
| No. | |
|---|---|
| 35 | 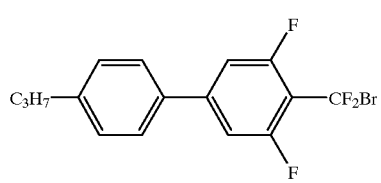 |
| 36 | 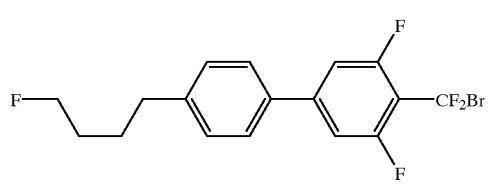 |
| 37 | 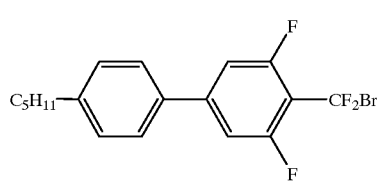 |
| 38 | 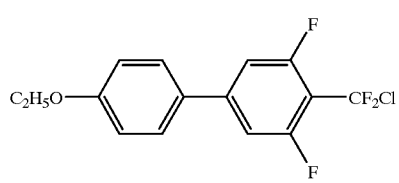 |
| 39 | 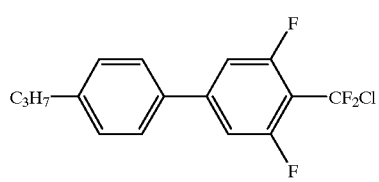 |
| 40 | 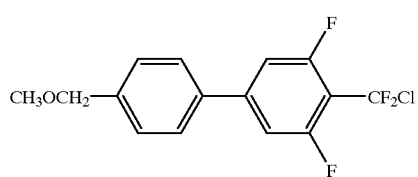 |
| 41 | 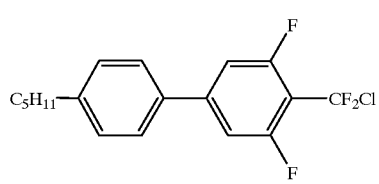 |

-continued
| No. | $R_1-(A_1-Z_1)_l-(A_2-Z_2)_m-(A_3-Z_3)_n-\mathrm{C_6H_2F_2-CF_2Y_1}$ |
|---|---|
| 42 | 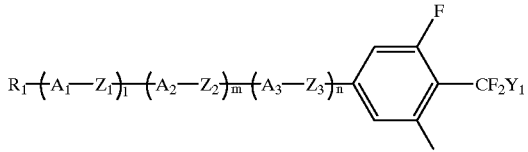 |
| 43 | 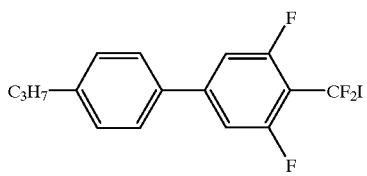 |
| 44 | 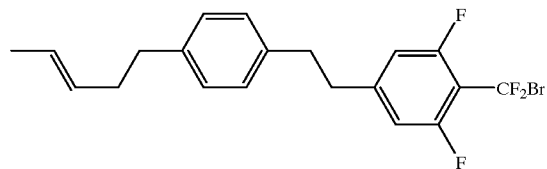 |
| 45 | 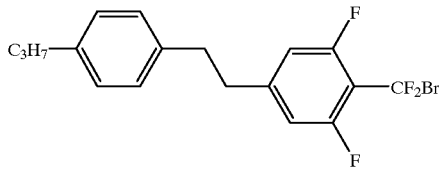 |
| 46 | 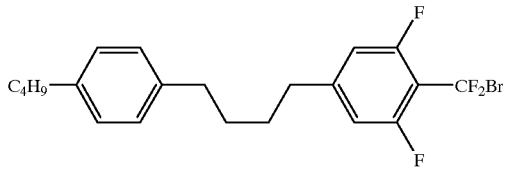 |
| 47 | 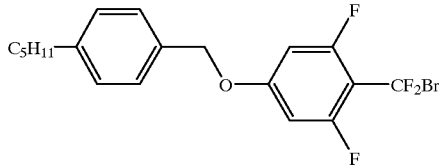 |
| 48 | 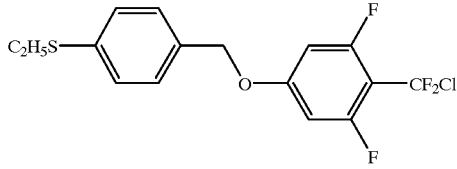 |

-continued
| | |
|---|---|
| No. | $R_1\text{--}(A_1\text{--}Z_1)_l\text{--}(A_2\text{--}Z_2)_m\text{--}(A_3\text{--}Z_3)_n\text{--}\underset{F}{\underset{|}{\overset{F}{\overset{|}{C_6H_2}}}}\text{--}CF_2Y_1$ |
| 49 | 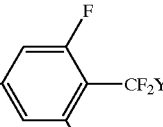 |
| 50 | 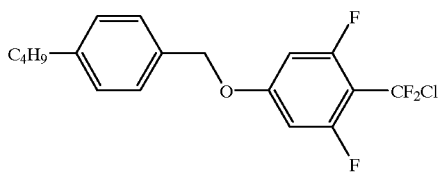 |
| 51 | 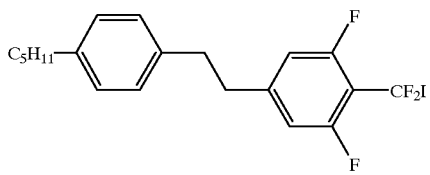 |
| 52 | 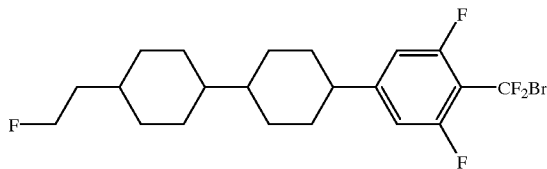 |
| 53 | 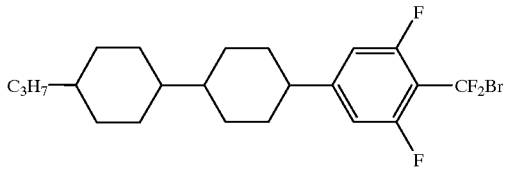 |
| 54 | 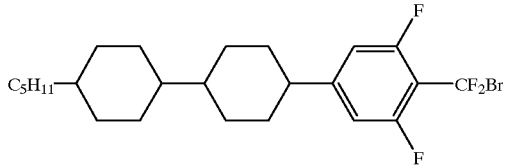 |
| 55 | 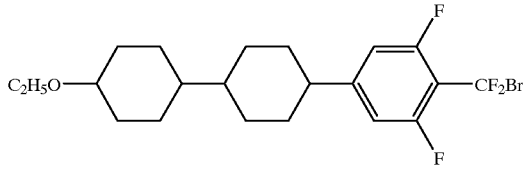 |

-continued
| No. | $R_1-(A_1-Z_1)_l-(A_2-Z_2)_m-(A_3-Z_3)_n-$ [difluorophenyl]$-CF_2Y_1$ |
|---|---|
| 56 | 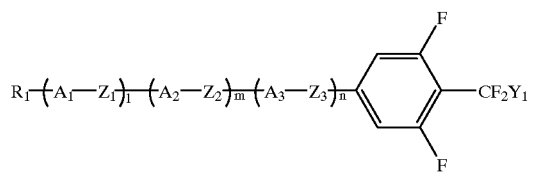 |
| 57 | 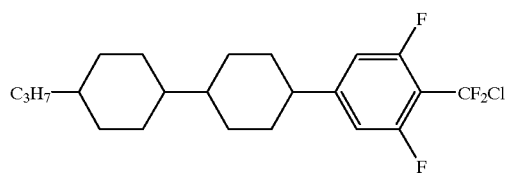 |
| 58 | 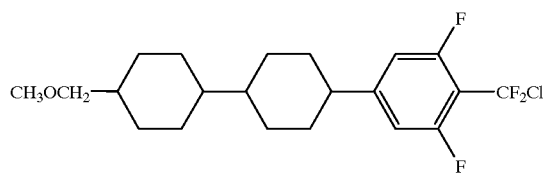 |
| 59 | 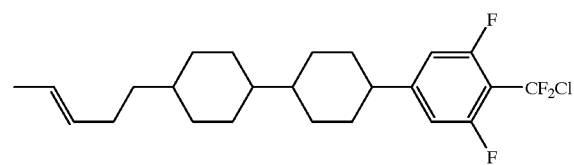 |
| 60 | 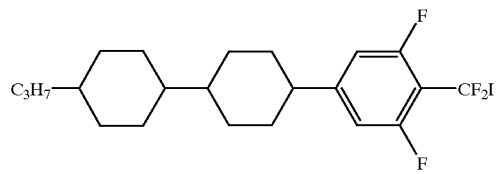 |
| 61 | 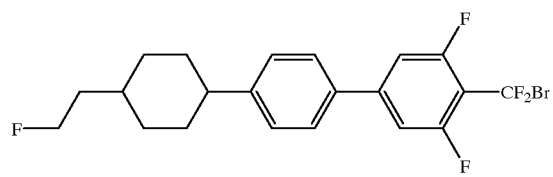 |
| 62 | 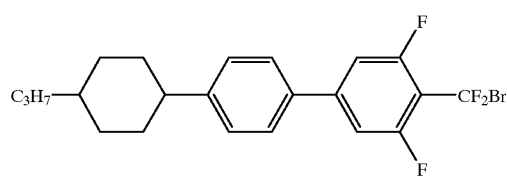 |

-continued
$$R_1 \!\!-\!\!(A_1\!\!-\!\!Z_1)_l\!\!-\!\!(A_2\!\!-\!\!Z_2)_m\!\!-\!\!(A_3\!\!-\!\!Z_3)_n\!\!-\!\!\underset{F}{\underset{|}{\overset{F}{\overset{|}{\bigcirc}}}}\!\!-\!\!CF_2Y_1$$
| No. | |
|---|---|
| 63 | 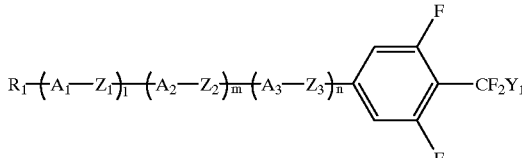 |
| 64 | 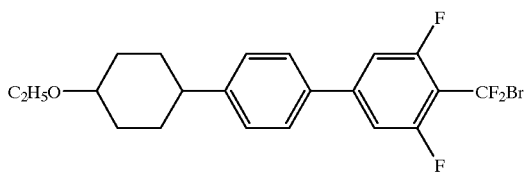 |
| 65 | 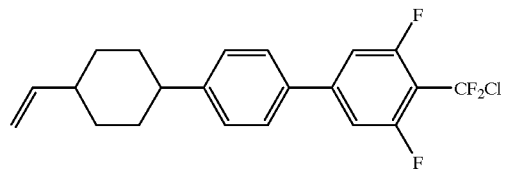 |
| 66 | 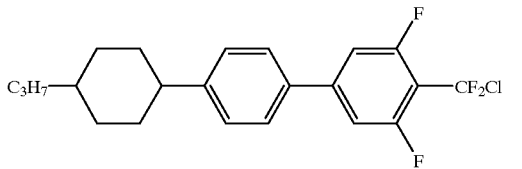 |
| 67 | 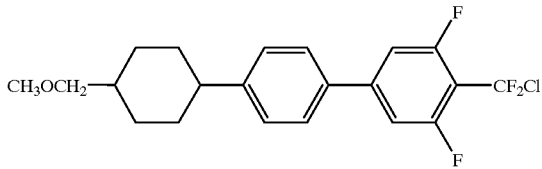 |
| 68 | 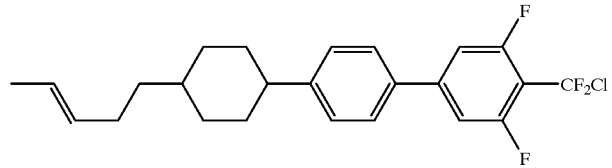 |
| 69 | 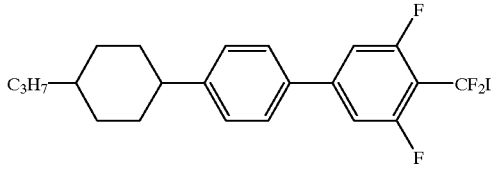 |

-continued
| No. | $R_1-(A_1-Z_1)_l-(A_2-Z_2)_m-(A_3-Z_3)_n-\text{[2,6-F}_2\text{-4-CF}_2Y_1\text{-C}_6H_2\text{]}$ |
|---|---|
| 70 | 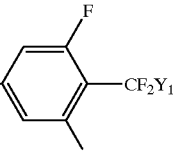 |
| 71 | 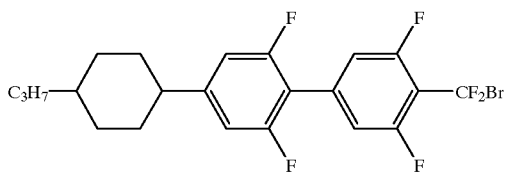 |
| 72 | 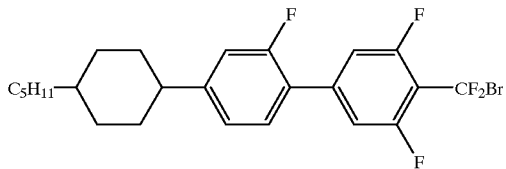 |
| 73 | 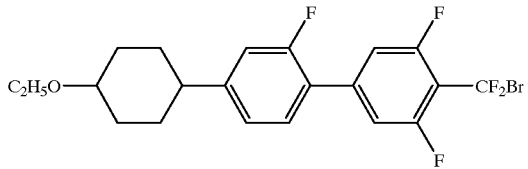 |
| 74 | 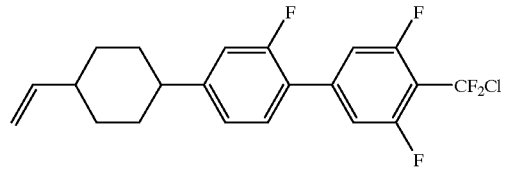 |
| 75 | 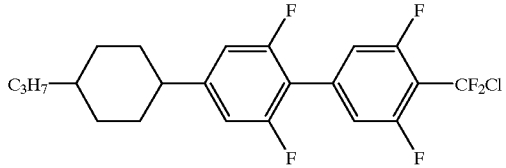 |
| 76 | 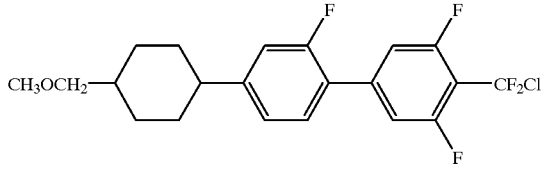 |

-continued
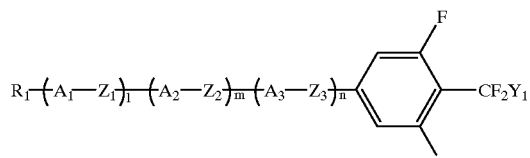
| No. | |
|---|---|
| 77 | 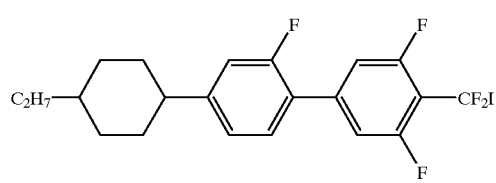 |
| 78 | 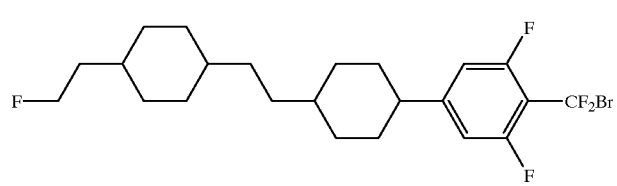 |
| 79 | 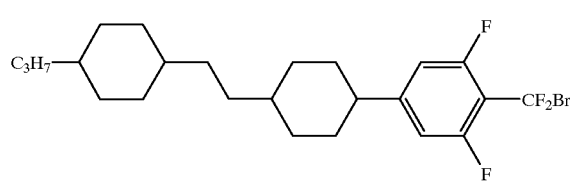 |
| 80 | 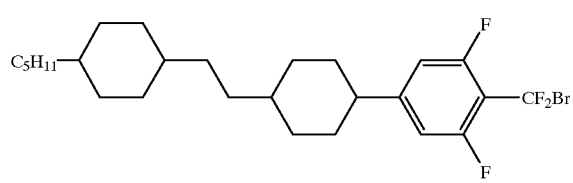 |
| 81 | 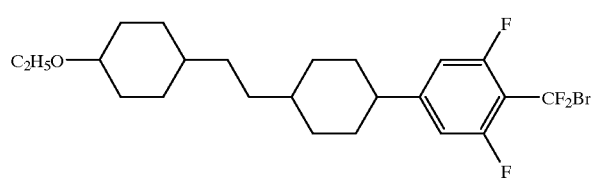 |
| 82 | 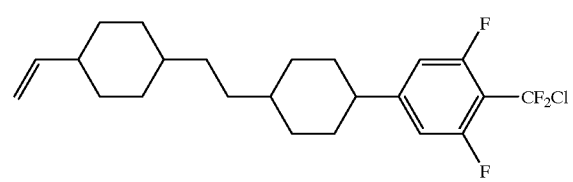 |
| 83 | 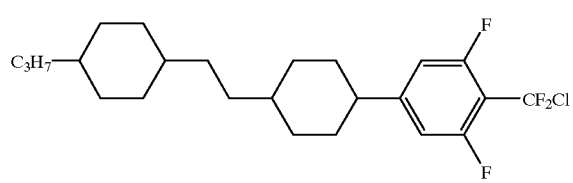 |

-continued
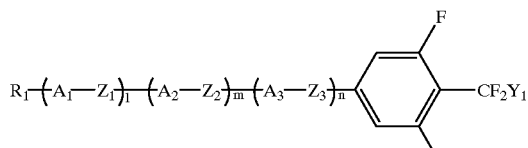
| No. | |
|---|---|
| 84 | 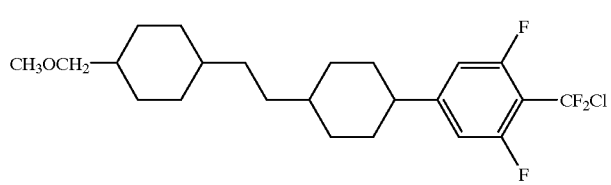 |
| 85 | 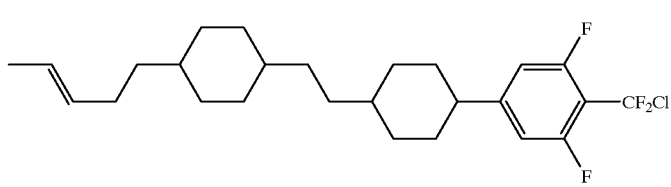 |
| 86 | 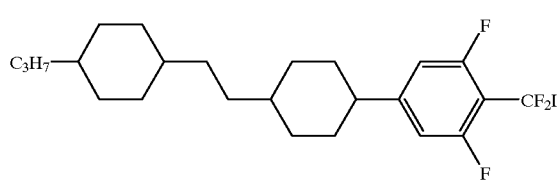 |
| 87 | 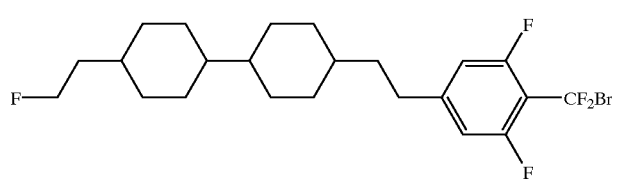 |
| 88 | 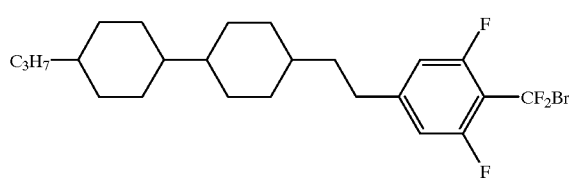 |
| 89 | 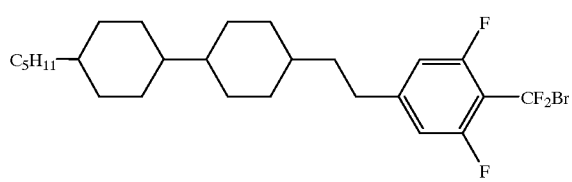 |
| 90 | 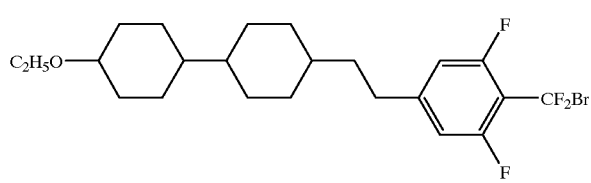 |

-continued
| No. | R₁-(A₁-Z₁)ₗ-(A₂-Z₂)ₘ-(A₃-Z₃)ₙ-[2,6-difluorophenyl]-CF₂Y₁ |
|---|---|
| 91 | 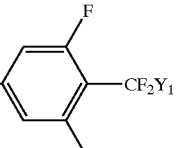 |
| 92 | 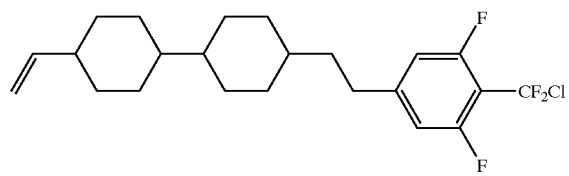 |
| 93 | 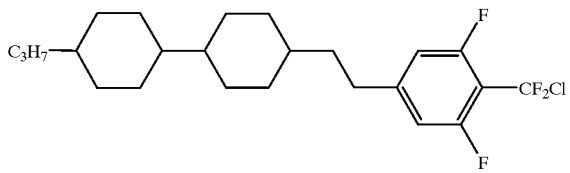 |
| 94 | 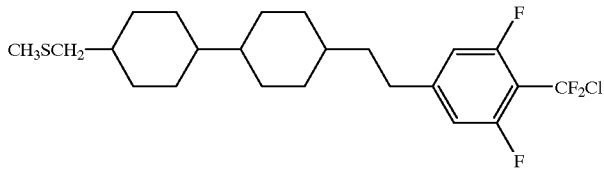 |
| 95 | 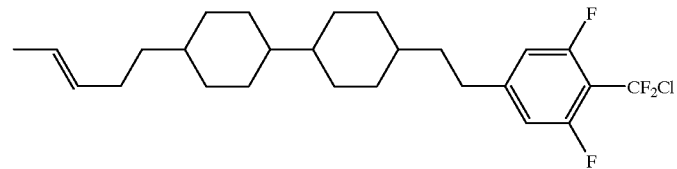 |
| 96 | 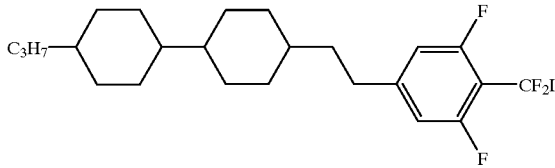 |
| 97 | 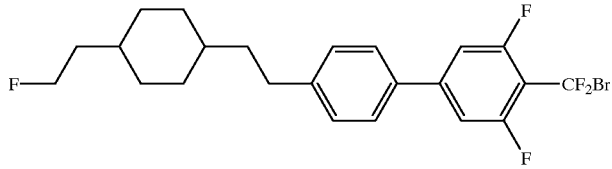 |

-continued
| | |
|---|---|
| No. | $R_1-(A_1-Z_1)_l-(A_2-Z_2)_m-(A_3-Z_3)_n-\text{(2,6-difluoro-4-}CF_2Y_1\text{-phenyl)}$ |
| 98 | 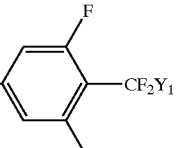 |
| 99 | 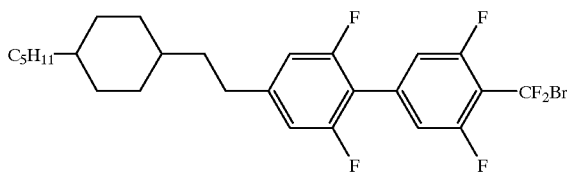 |
| 100 | 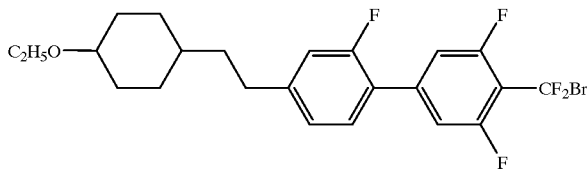 |
| 101 | 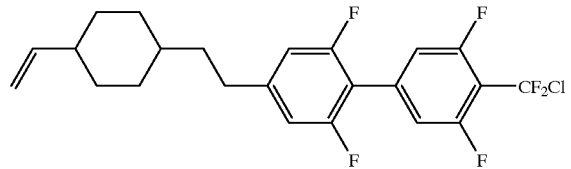 |
| 102 | 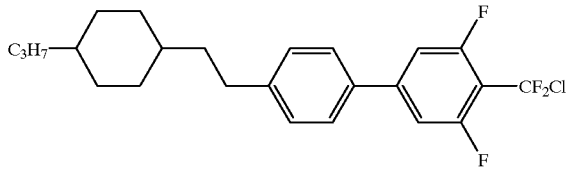 |
| 103 | 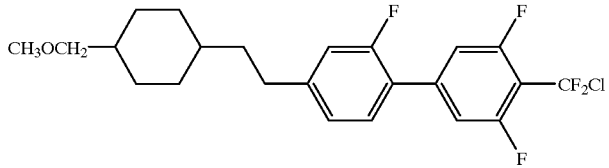 |
| 104 | 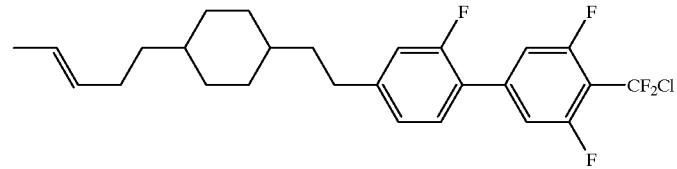 |

-continued
| No. | $R_1-(A_1-Z_1)_l-(A_2-Z_2)_m-(A_3-Z_3)_n-\text{(2,6-difluorophenyl)}-CF_2Y_1$ |
|---|---|
| 105 | 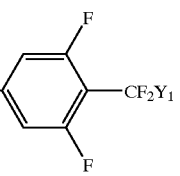 |
| 106 | 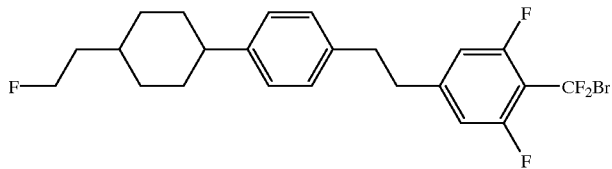 |
| 107 | 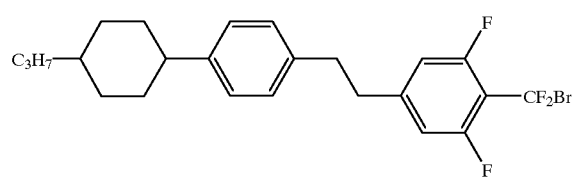 |
| 108 | 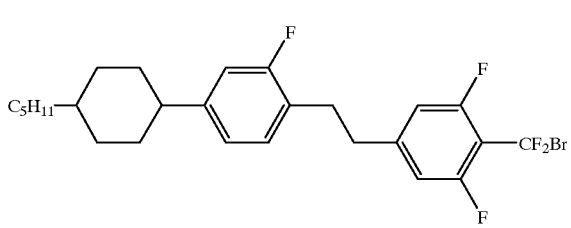 |
| 109 | 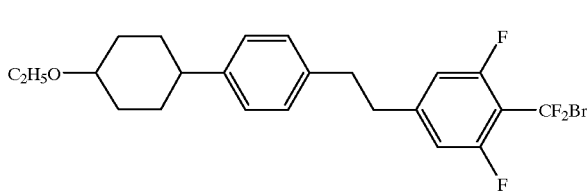 |
| 110 | 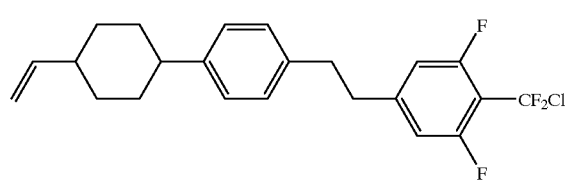 |
| 111 | 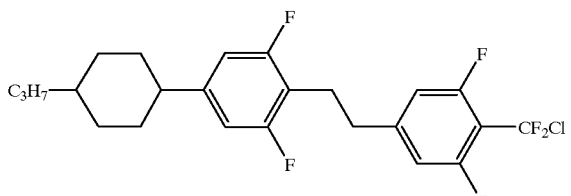 |

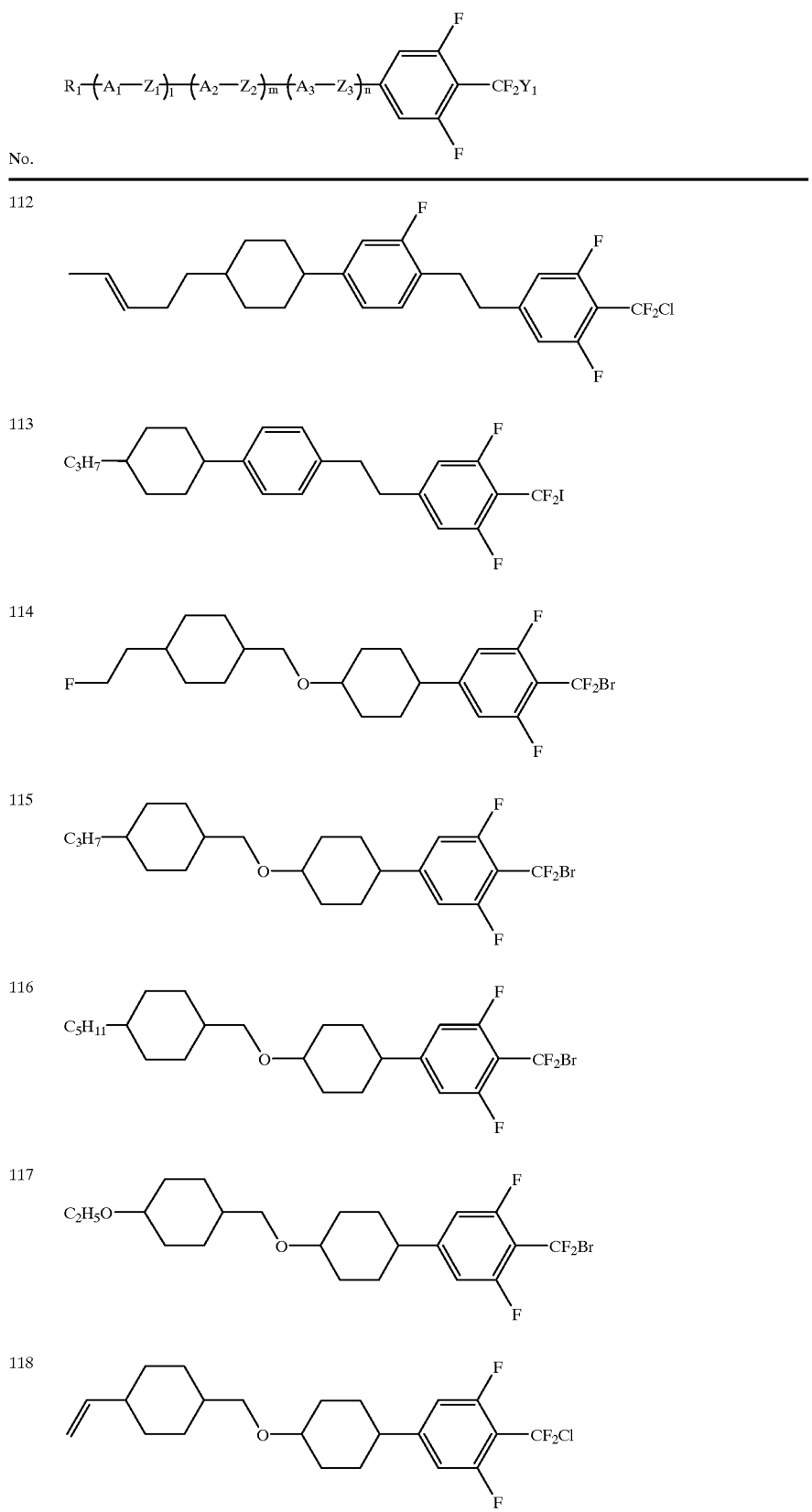

-continued
| No. | $R_1-(A_1-Z_1)_l-(A_2-Z_2)_m-(A_3-Z_3)_n-\text{[2,6-difluorophenyl]}-CF_2Y_1$ |
|---|---|
| 119 | 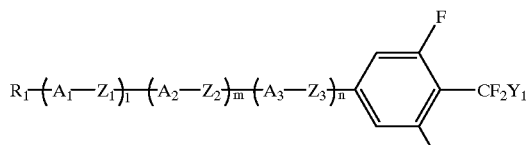 |
| 120 | 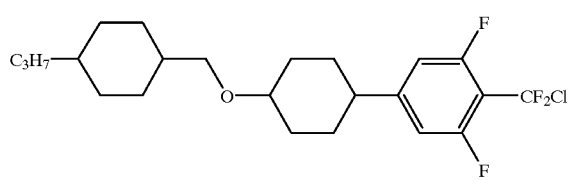 |
| 121 | 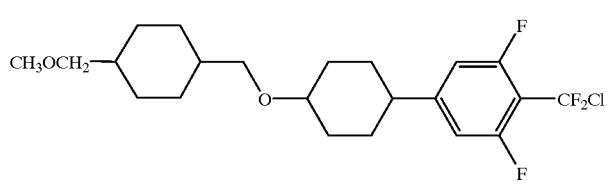 |
| 122 | 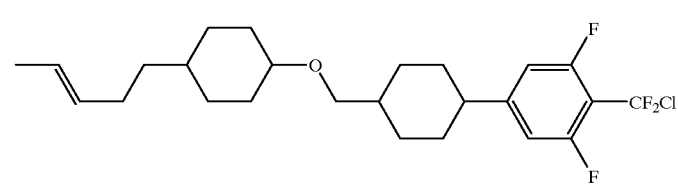 |
| 123 | 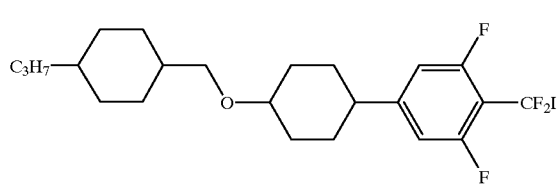 |
| 124 | 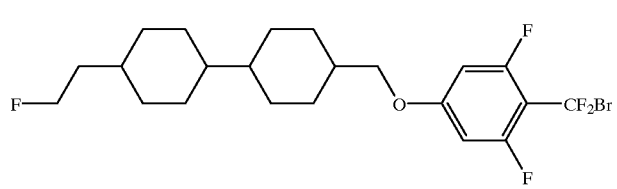 |
| 125 | 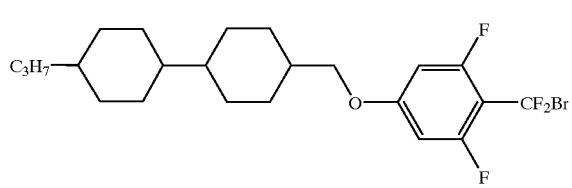 |

-continued
| No. | $R_1 {-} (A_1 {-} Z_1)_l {-} (A_2 {-} Z_2)_m {-} (A_3 {-} Z_3)_n {-}$ [2,6-difluorophenyl]${-} CF_2Y_1$ |
|---|---|
| 126 | 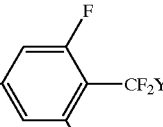 |
| 127 | 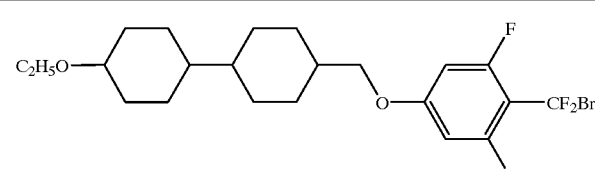 |
| 128 | 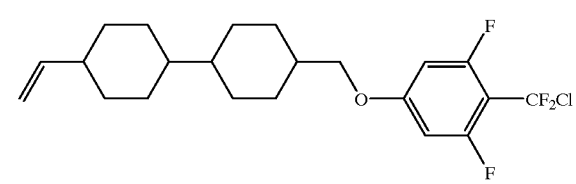 |
| 129 | 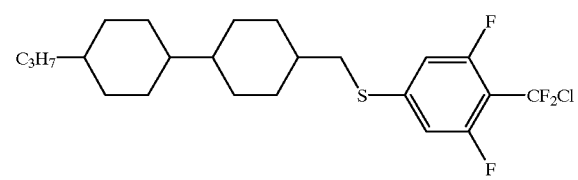 |
| 130 | 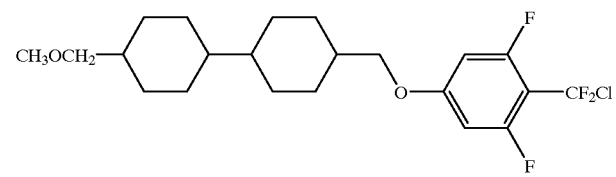 |
| 131 | 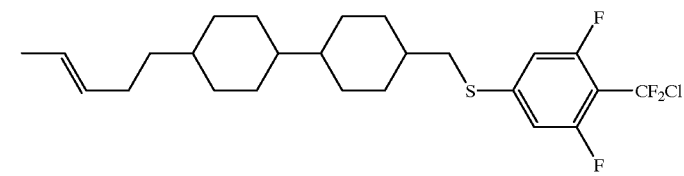 |
| 132 | 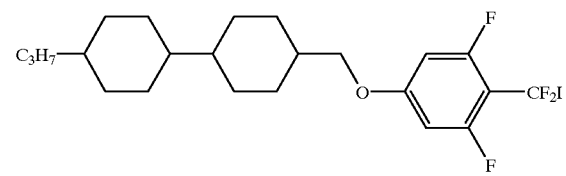 |

-continued
| | |
|---|---|
| No. | 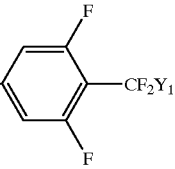 |
| 133 | 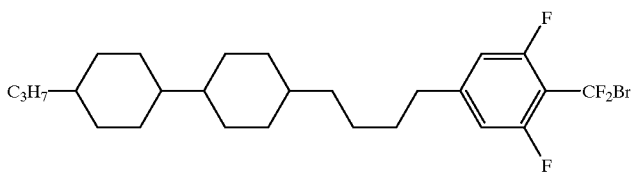 |
| 134 | 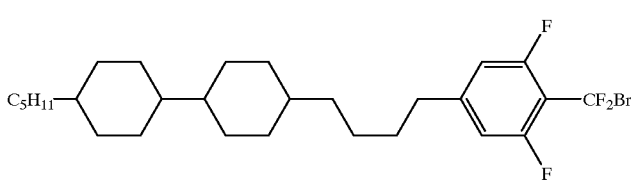 |
| 135 | 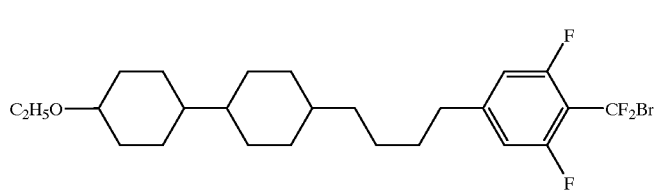 |
| 136 | 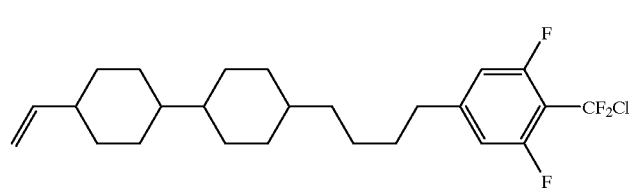 |
| 137 | 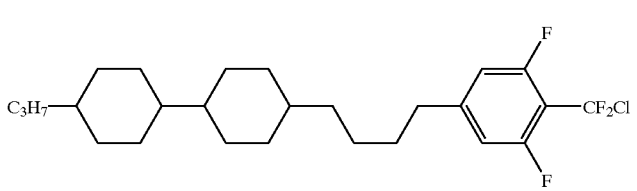 |
| 138 | 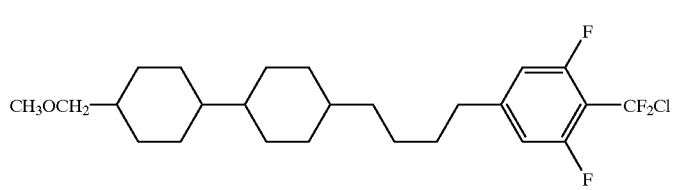 |
| 139 | 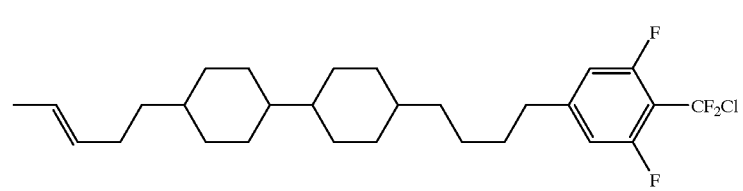 |

-continued
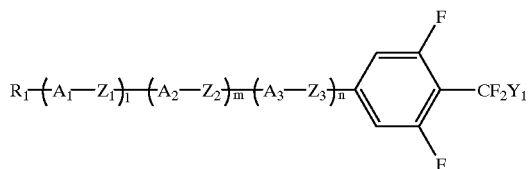
| No. | |
|---|---|
| 140 | 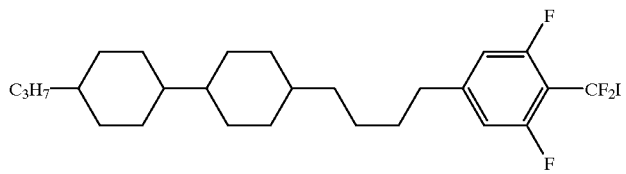 |
| 141 | 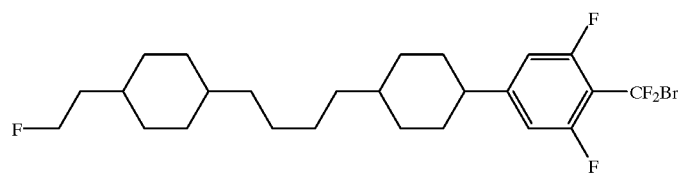 |
| 142 | 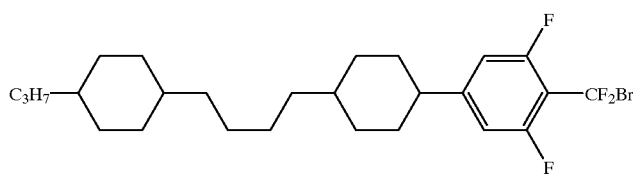 |
| 143 | 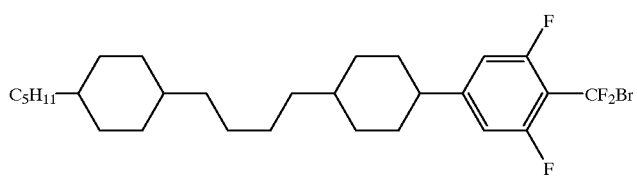 |
| 144 | 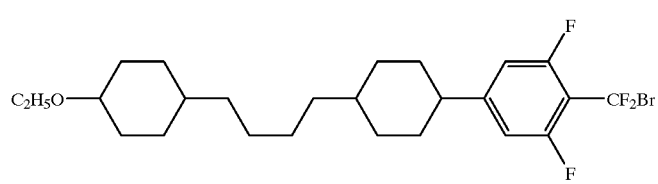 |
| 145 | 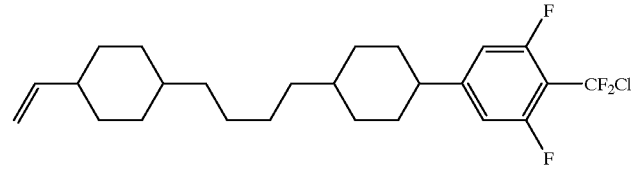 |
| 146 | 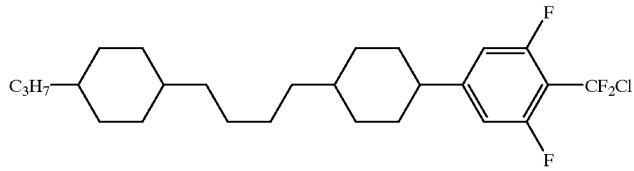 |

-continued
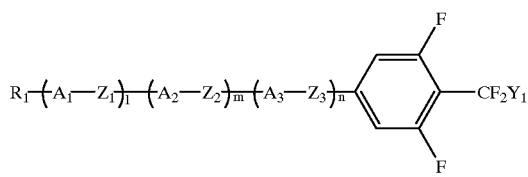
| No. | |
|---|---|
| 147 | 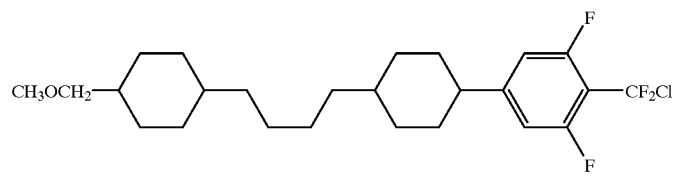 |
| 148 | 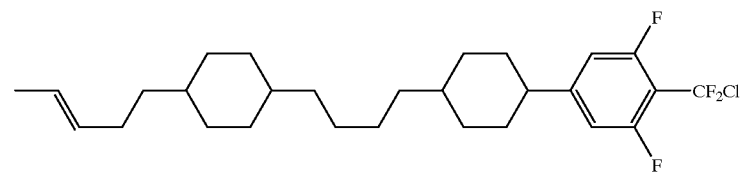 |
| 149 | 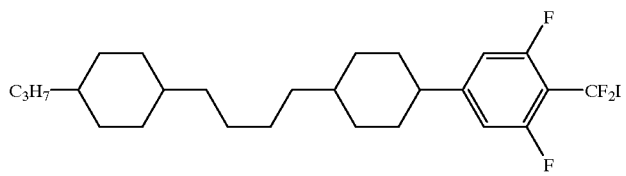 |
| 150 | 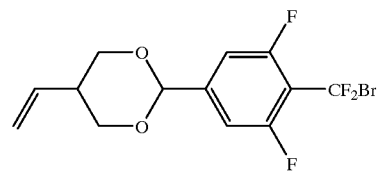 |
| 151 | 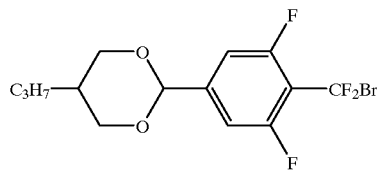 |
| 152 | 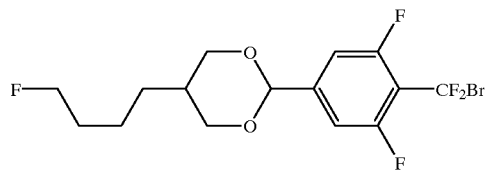 |
| 153 | 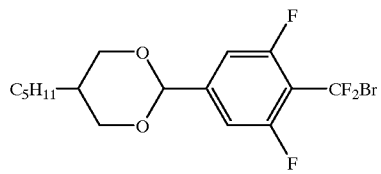 |

-continued
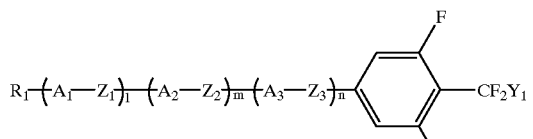
| No. | |
|---|---|
| 154 | 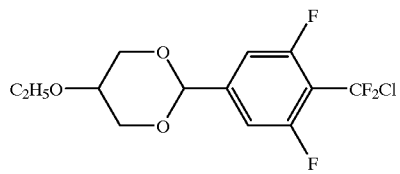 |
| 155 | 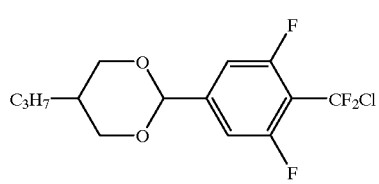 |
| 156 | 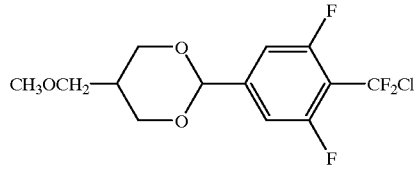 |
| 157 | 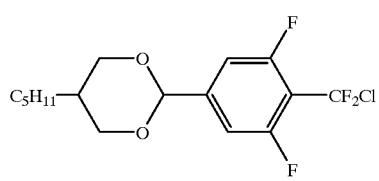 |
| 158 | 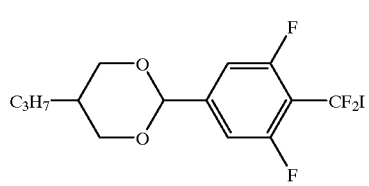 |
| 159 | 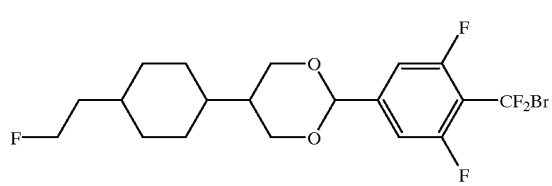 |
| 160 | 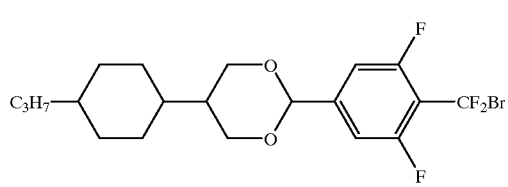 |

-continued
| | |
|---|---|
| No. | |
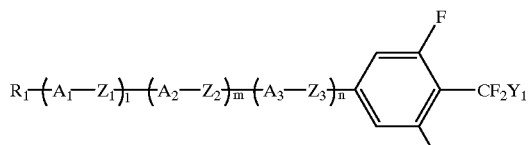
| No. | |
|---|---|
| 161 | 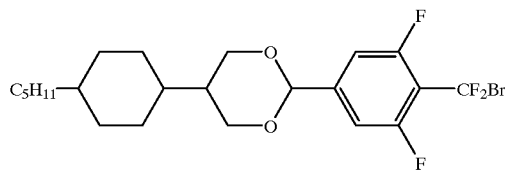 |
| 162 | 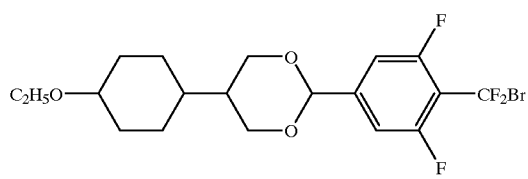 |
| 163 | 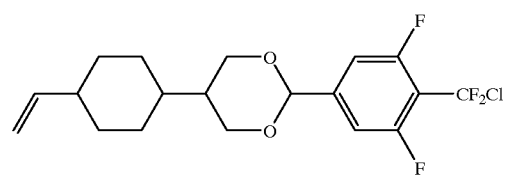 |
| 164 | 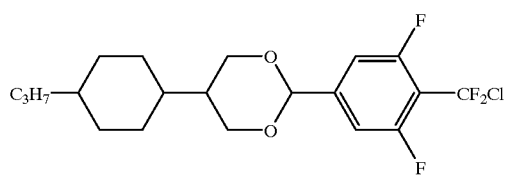 |
| 165 | 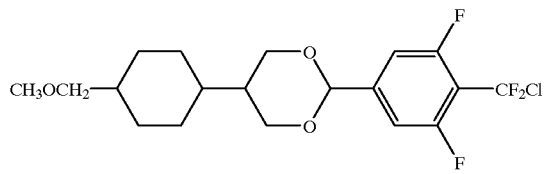 |
| 166 | 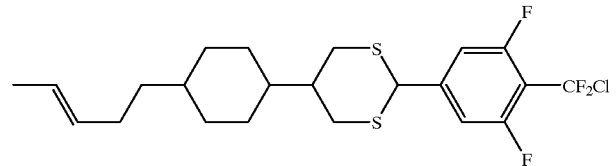 |
| 167 | 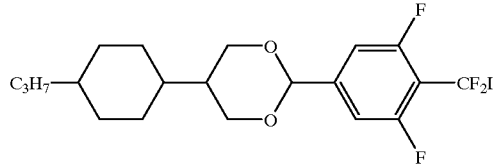 |

-continued
| | |
|---|---|
| No. | _l-(A_2-Z_2)_m-(A_3-Z_3)_n-C_6H_2F_2-CF_2Y_1) |
| 168 | 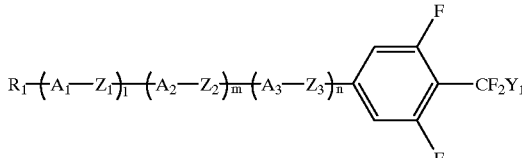 |
| 169 | 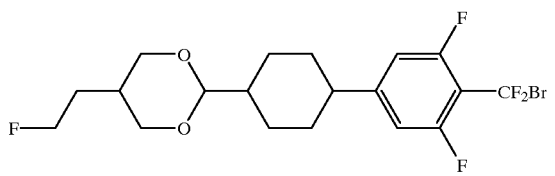 |
| 170 | 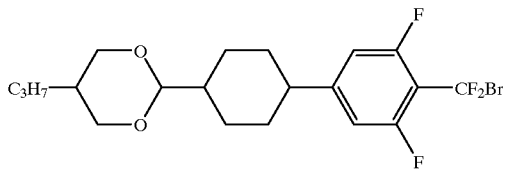 |
| 171 | 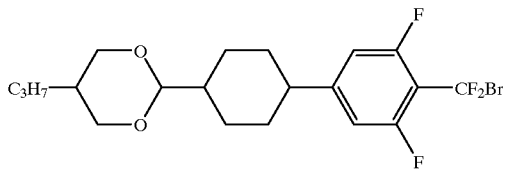 |
| 172 | 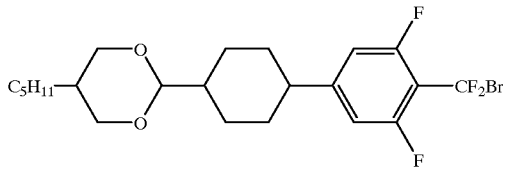 |
| 173 | 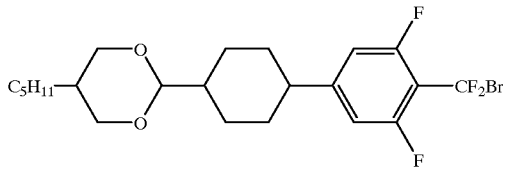 |
| 174 | 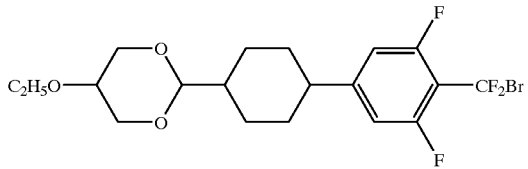 |

-continued
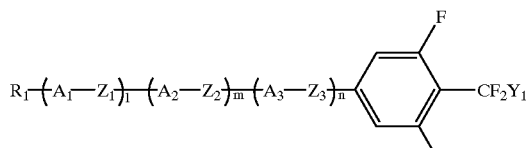
| No. | |
|---|---|
| 175 | 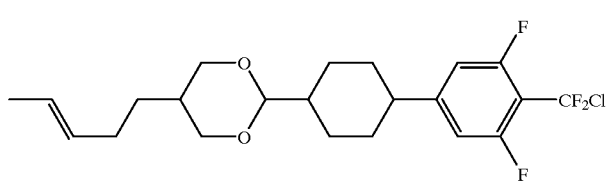 |
| 176 | 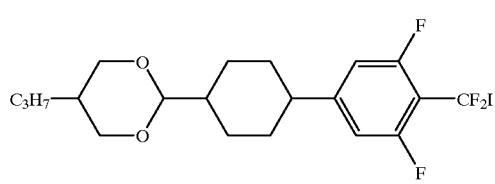 |
| 177 | 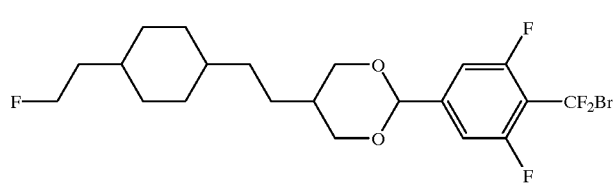 |
| 178 | 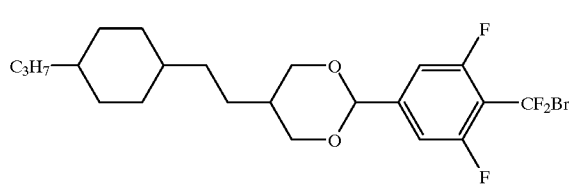 |
| 179 | 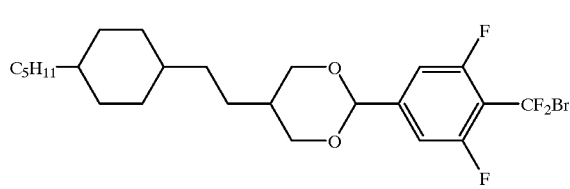 |
| 180 | 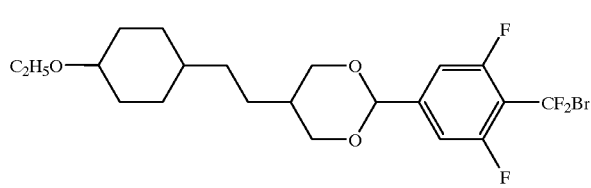 |
| 181 | 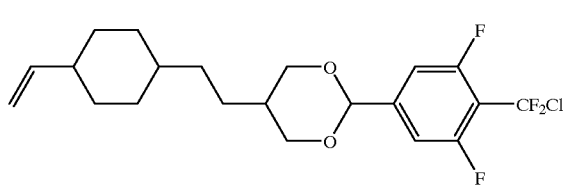 |

-continued
| | |
|---|---|
| No. | R₁-(A₁-Z₁)ₗ-(A₂-Z₂)ₘ-(A₃-Z₃)ₙ-[phenyl(F,F)]-CF₂Y₁ |
| 182 | 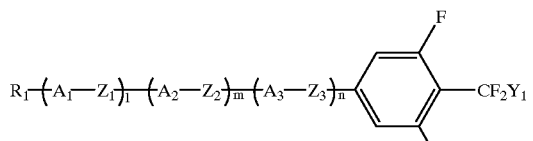 |
| 183 | 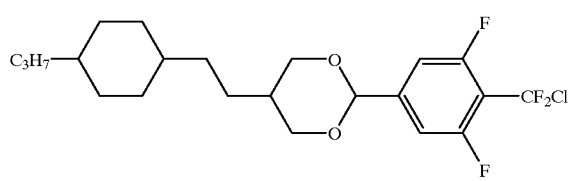 |
| 184 | 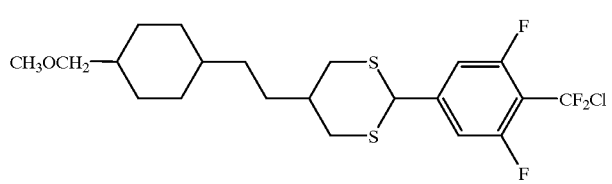 |
| 185 | 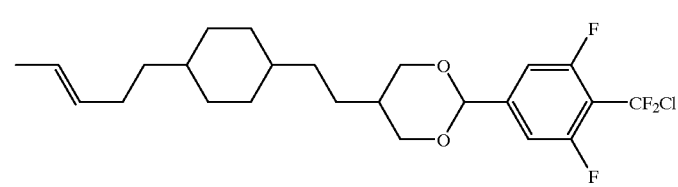 |
| 186 | 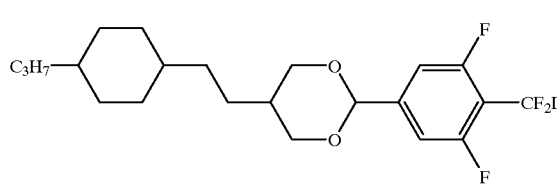 |
| 187 | 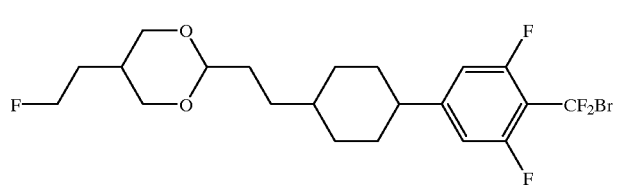 |
| 188 | 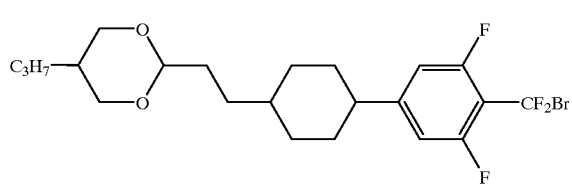 |

-continued
| | $R_1\!-\!(\!A_1\!-\!Z_1\!)_l\!-\!(\!A_2\!-\!Z_2\!)_m\!-\!(\!A_3\!-\!Z_3\!)_n\!-\!\phantom{X}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!$ (2,6-difluorophenyl)-CF$_2$Y$_1$ |
|---|---|
| No. | |
| 189 | 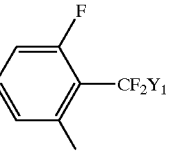 |
| 190 | 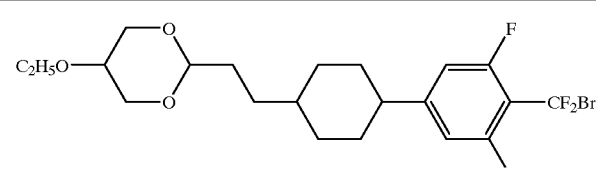 |
| 191 | 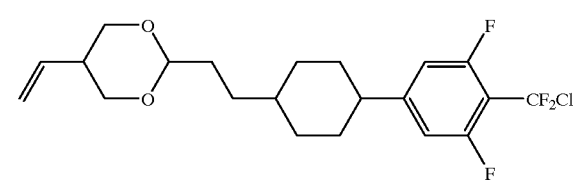 |
| 192 | 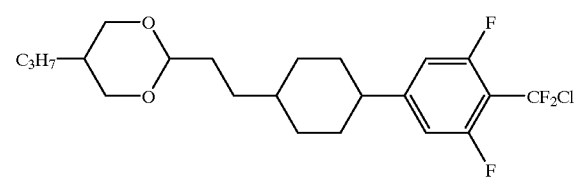 |
| 193 | 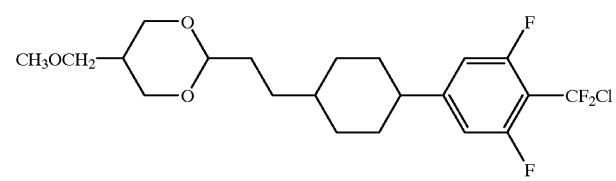 |
| 194 | 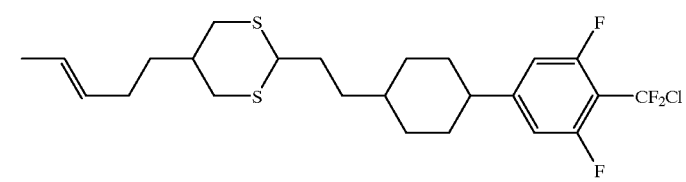 |
| 195 | 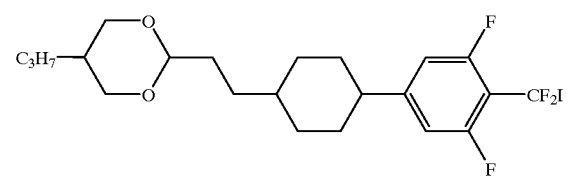 |

-continued
$$R_1-(A_1-Z_1)_l-(A_2-Z_2)_m-(A_3-Z_3)_n-\underset{F}{\underset{|}{\overset{F}{\overset{|}{C_6H_2}}}}-CF_2Y_1$$
| No. | |
|---|---|
| 196 | 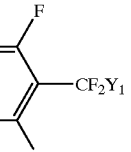 |
| 197 | 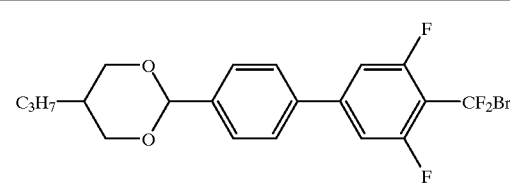 |
| 198 | 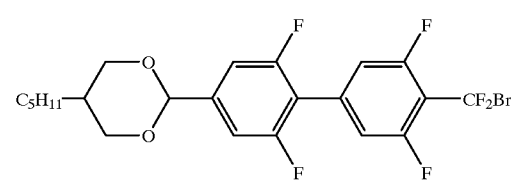 |
| 199 | 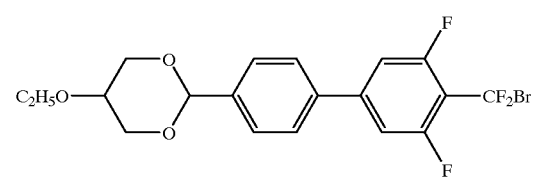 |
| 200 | 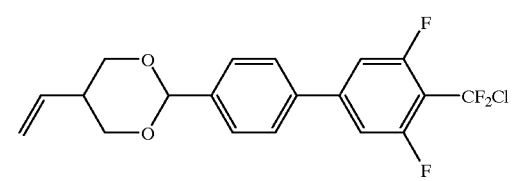 |
| 201 | 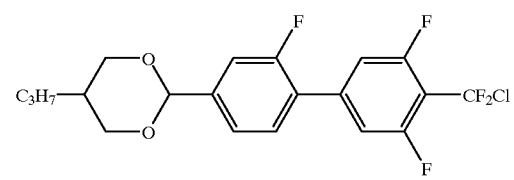 |
| 202 | 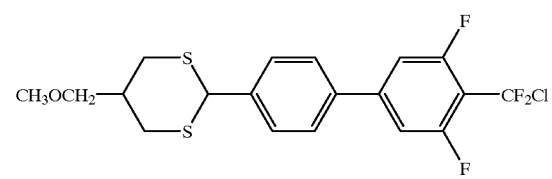 |

-continued
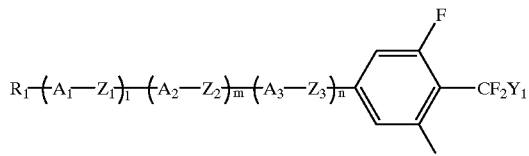
| No. | |
|---|---|
| 203 | 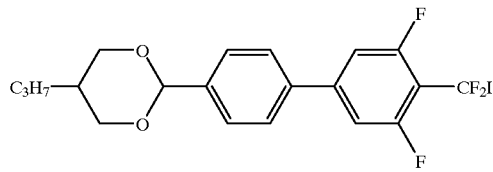 |
| 204 | 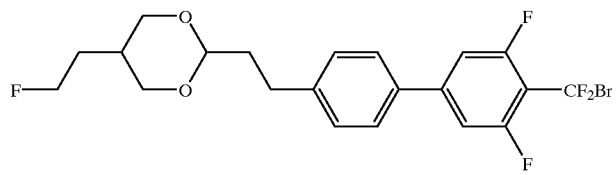 |
| 205 | 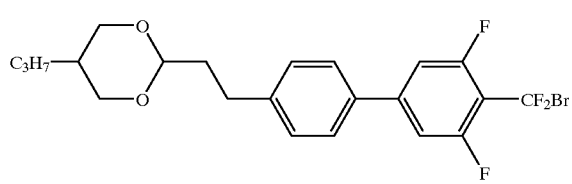 |
| 206 | 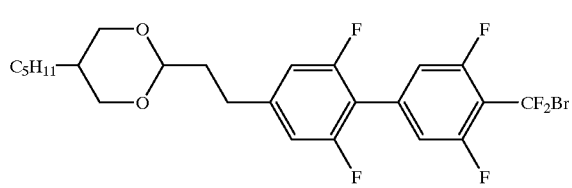 |
| 207 | 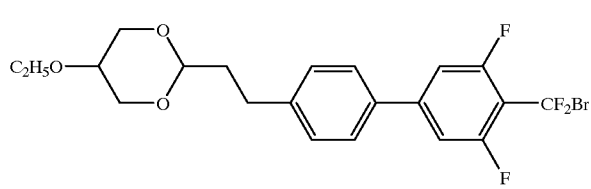 |
| 208 | 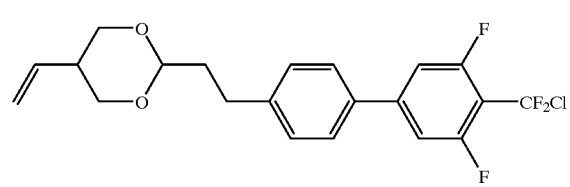 |
| 209 | 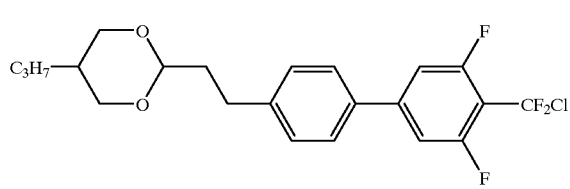 |

-continued
| No. | $R_1\text{-}(A_1\text{-}Z_1)_l\text{-}(A_2\text{-}Z_2)_m\text{-}(A_3\text{-}Z_3)_n\text{-}\text{[2,6-F}_2\text{-C}_6\text{H}_2\text{]-CF}_2Y_1$ |
|---|---|
| 210 | 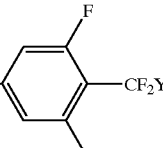 |
| 211 | 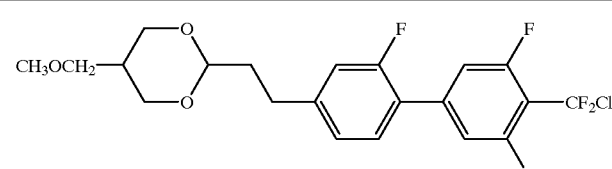 |
| 212 | 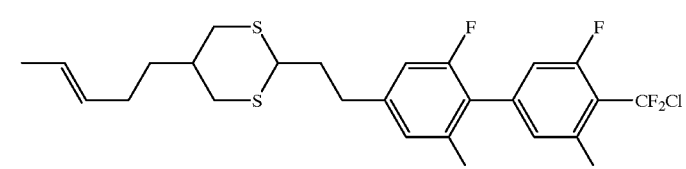 |
| 213 | 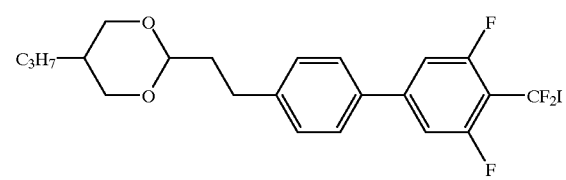 |
| 214 | 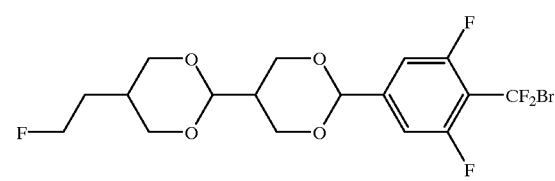 |
| 215 | 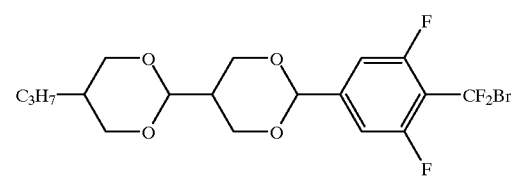 |
| 216 | 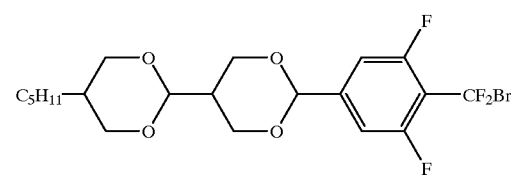 |

-continued
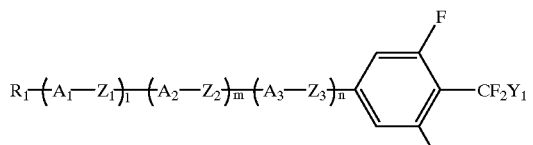
| No. | |
|---|---|
| 217 | 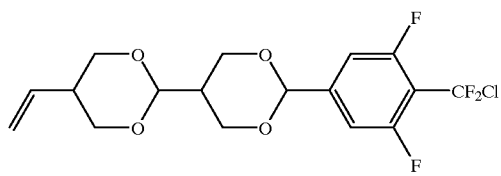 |
| 218 | 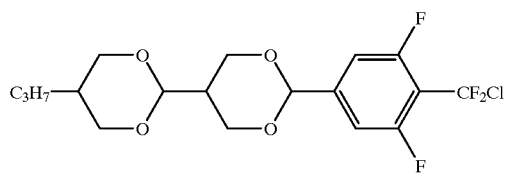 |
| 219 | 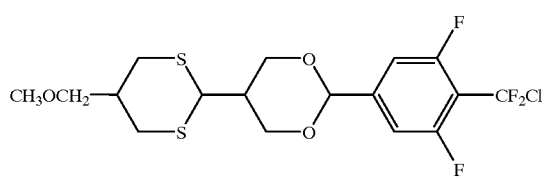 |
| 220 | 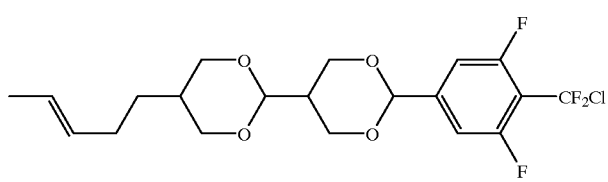 |
| 221 | 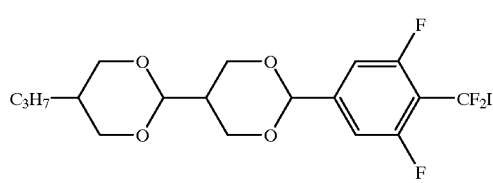 |
| 222 | 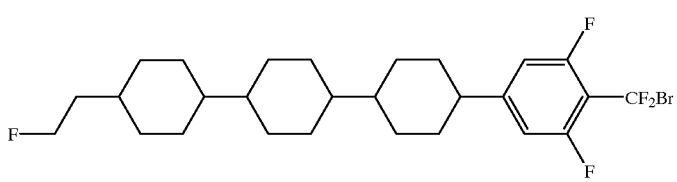 |
| 223 | 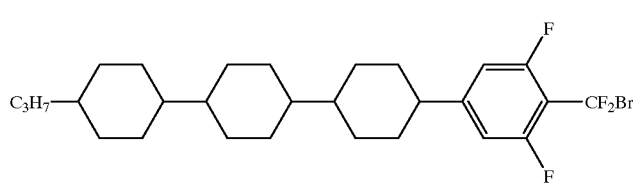 |

-continued
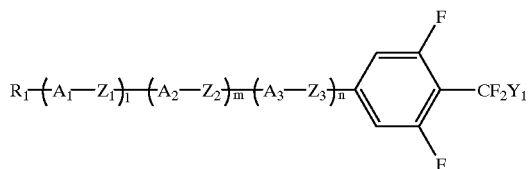
| No. | |
|---|---|
| 224 | 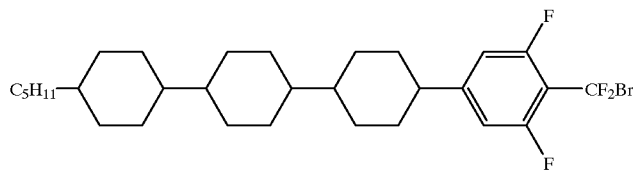 |
| 225 | 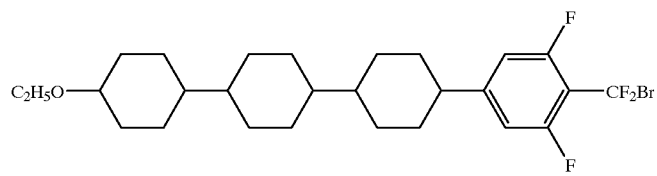 |
| 226 | 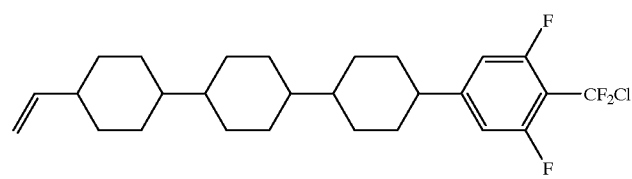 |
| 227 | 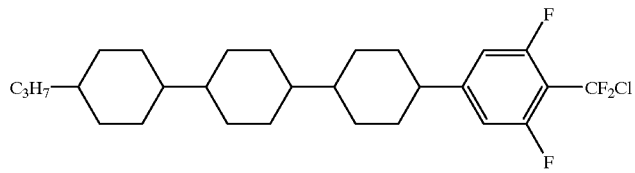 |
| 228 | 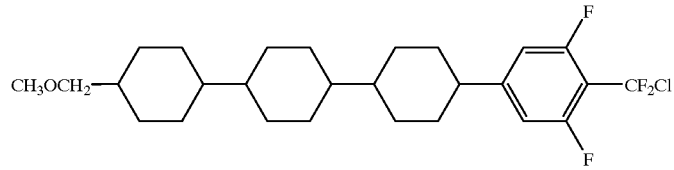 |
| 229 | 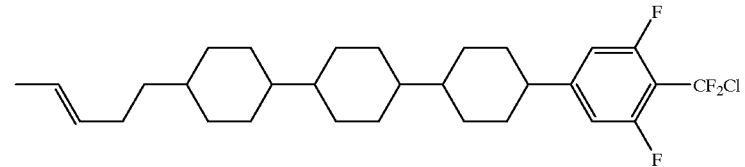 |
| 230 | 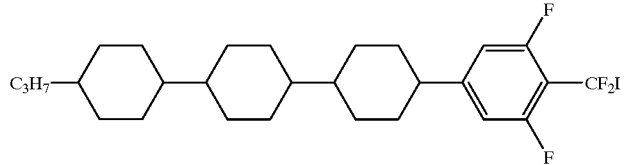 |

-continued
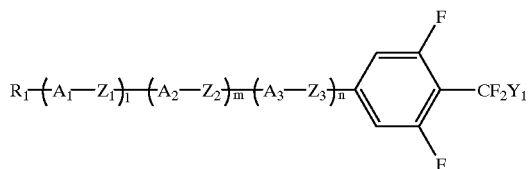
| No. | |
|---|---|
| 231 | 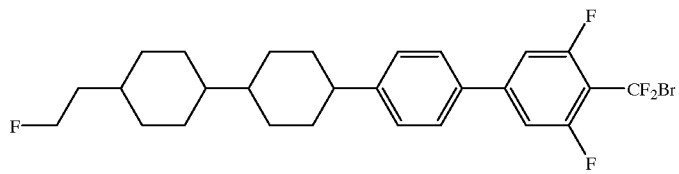 |
| 232 | 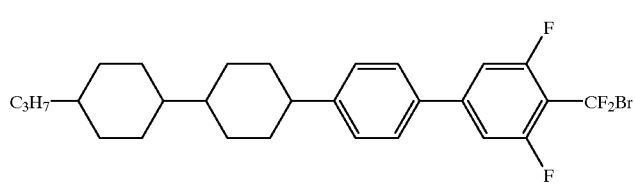 |
| 233 | 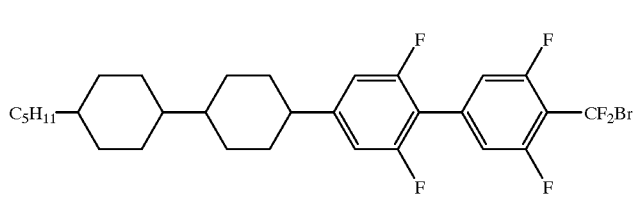 |
| 234 | 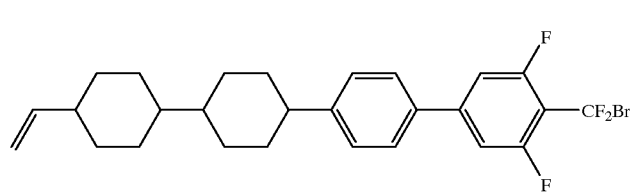 |
| 235 | 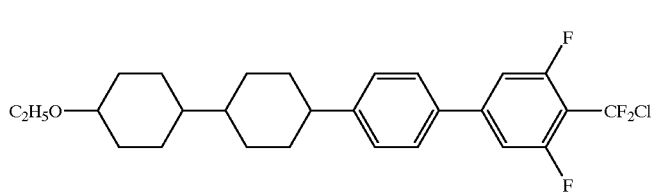 |
| 236 | 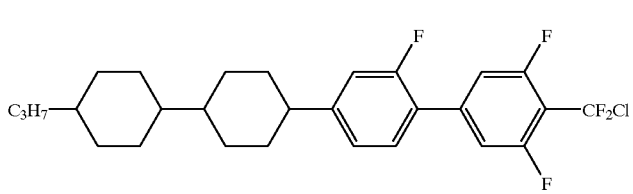 |
| 237 | 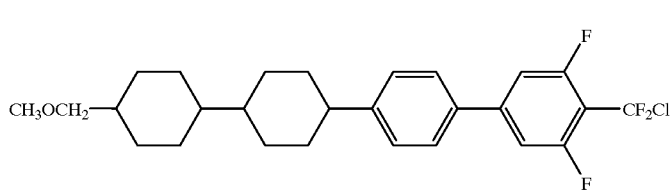 |

-continued
| | |
|---|---|
| No. | 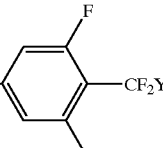 |
| 238 | 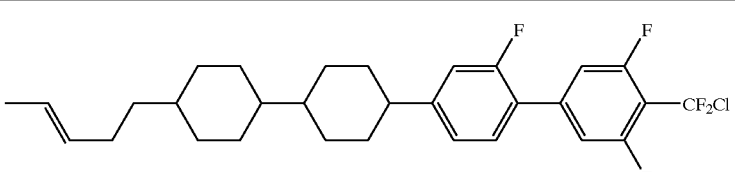 |
| 239 | 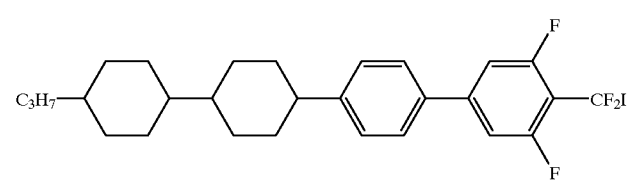 |
| 240 | 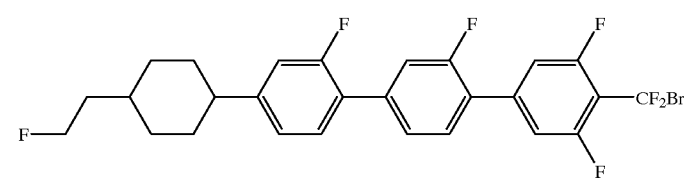 |
| 241 | 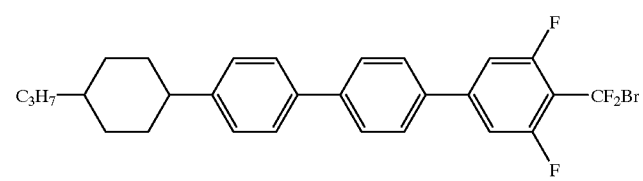 |
| 242 | 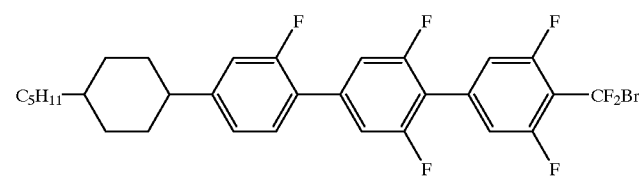 |
| 243 | 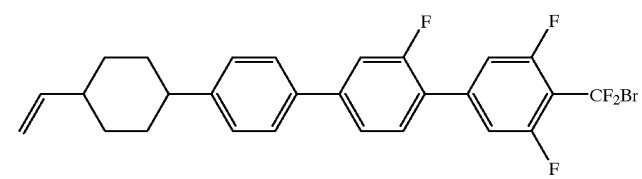 |
| 244 | 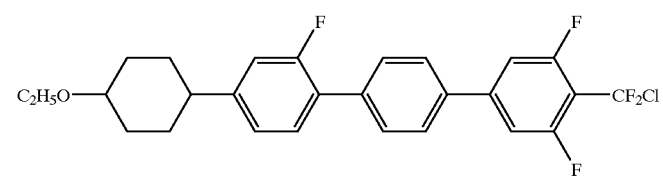 |

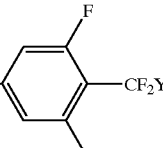

-continued
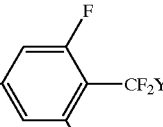
| No. | |
|---|---|
| 252 | 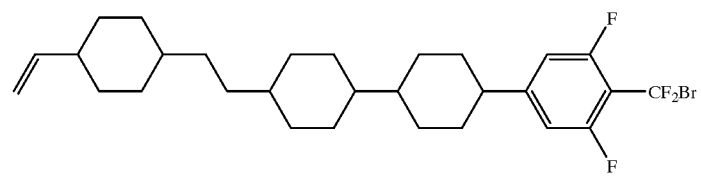 |
| 253 | 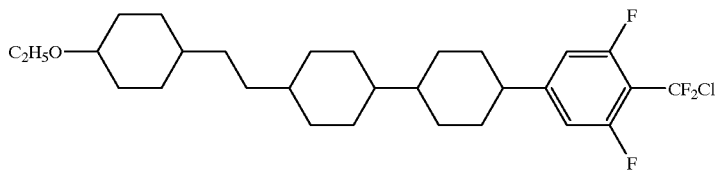 |
| 254 | 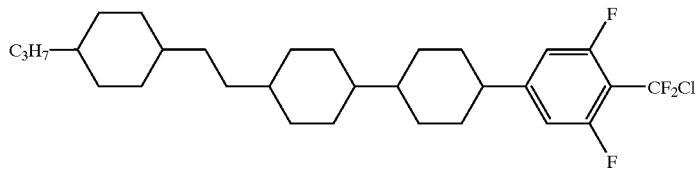 |
| 255 | 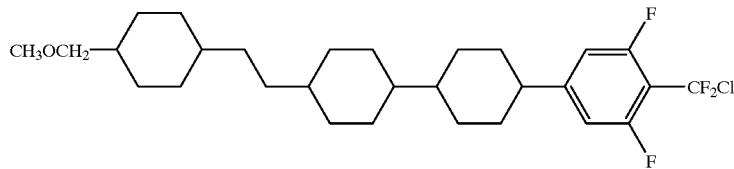 |
| 256 | 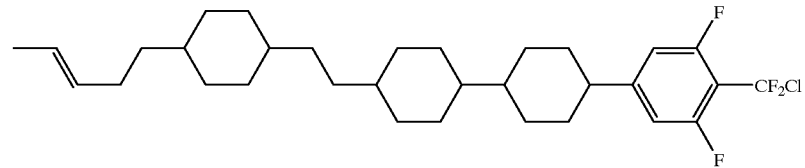 |
| 257 | 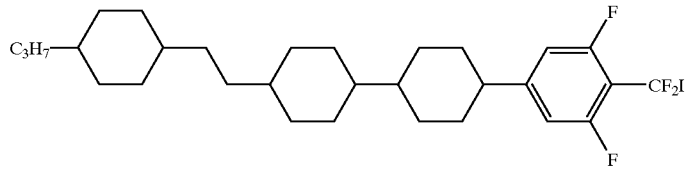 |
| 258 | 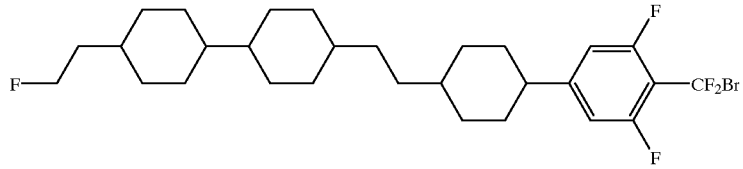 |

-continued
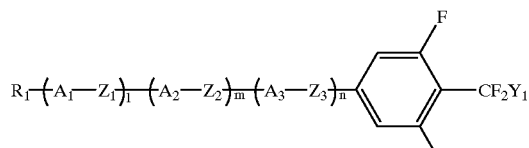
| No. | |
|---|---|
| 259 | 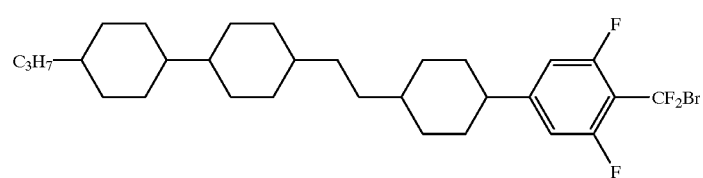 |
| 260 | 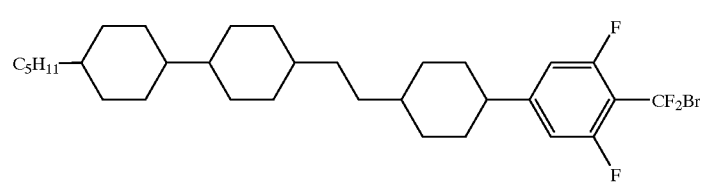 |
| 261 | 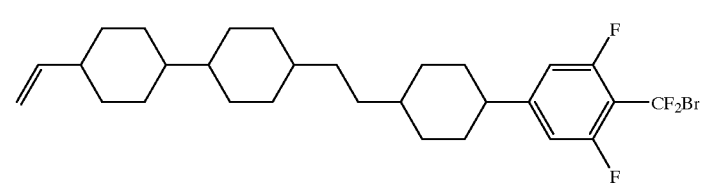 |
| 262 | 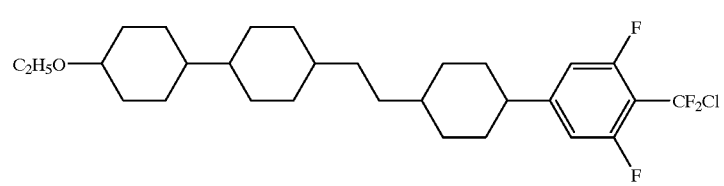 |
| 263 | 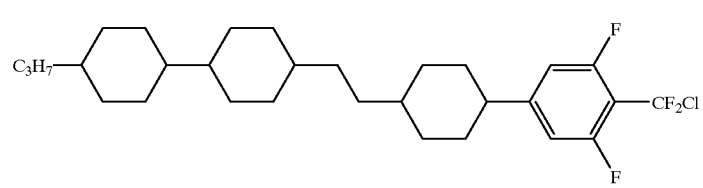 |
| 264 | 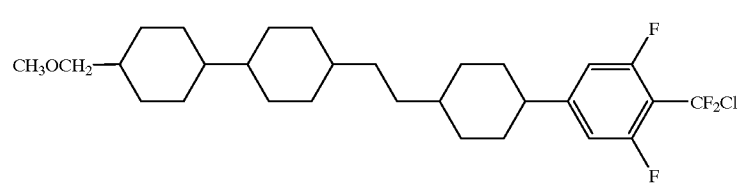 |
| 265 | 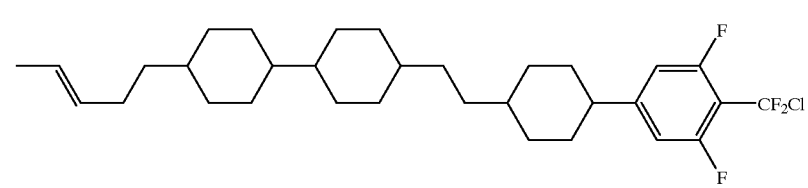 |

-continued
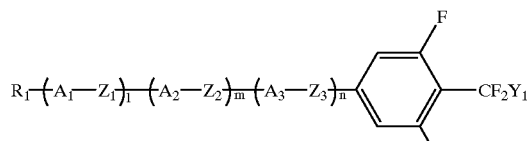
| No. | |
|---|---|
| 266 | 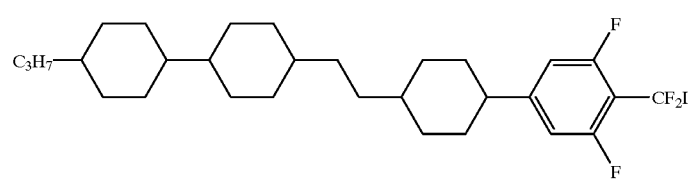 |
| 267 | 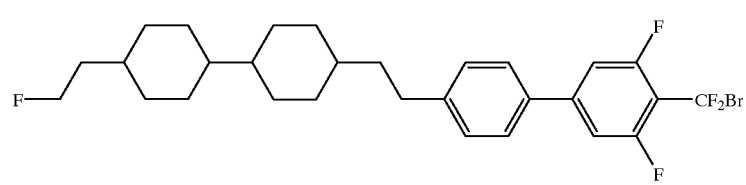 |
| 268 | 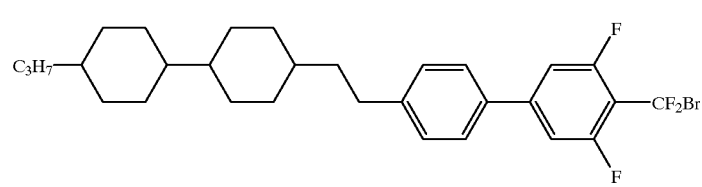 |
| 269 | 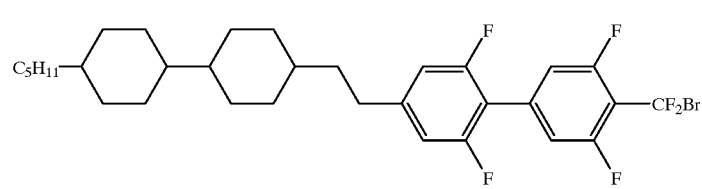 |
| 270 | 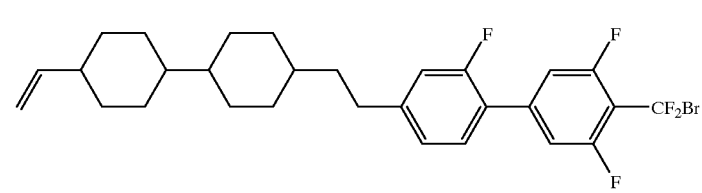 |
| 271 | 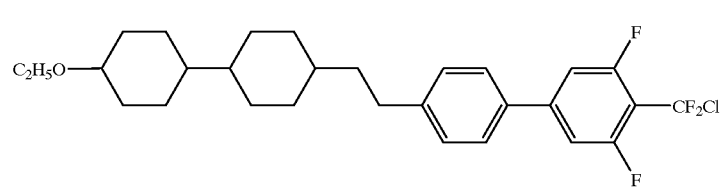 |
| 272 | 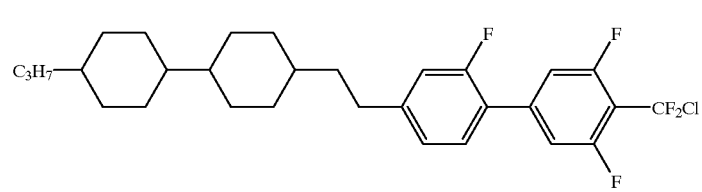 |

-continued
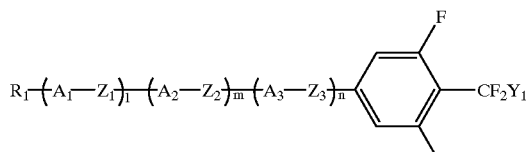
| No. | |
|---|---|
| 273 | 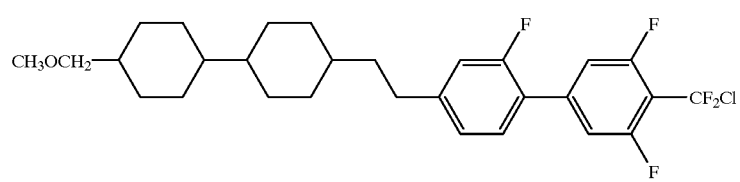 |
| 274 | 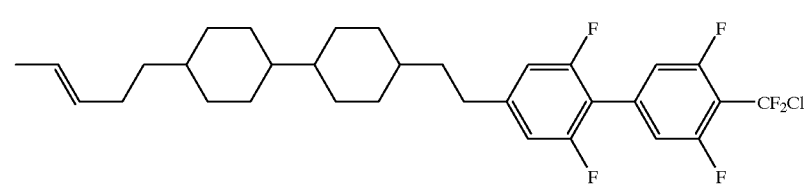 |
| 275 | 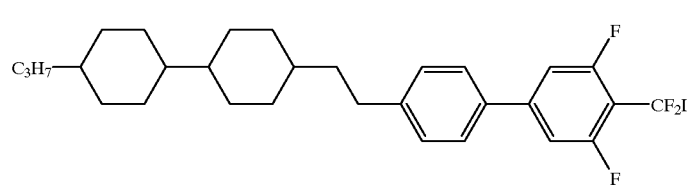 |
| 276 | 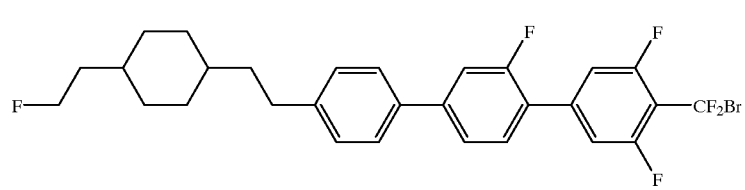 |
| 277 | 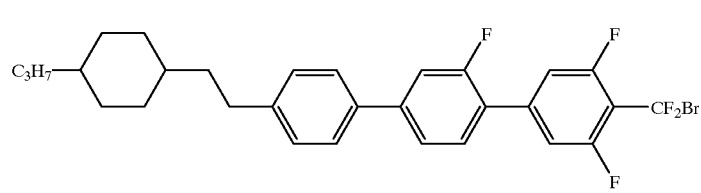 |
| 278 | 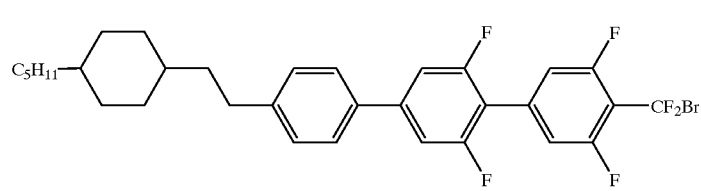 |
| 279 | 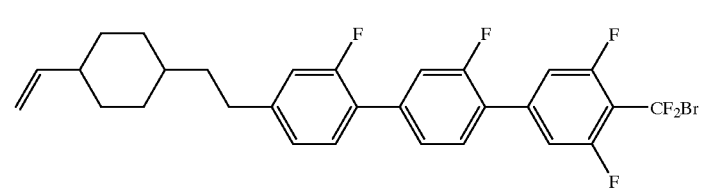 |

-continued
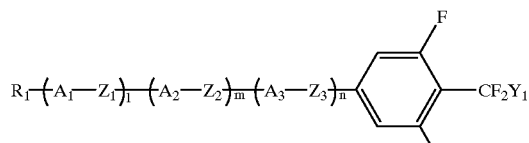
| No. | |
|---|---|
| 280 | 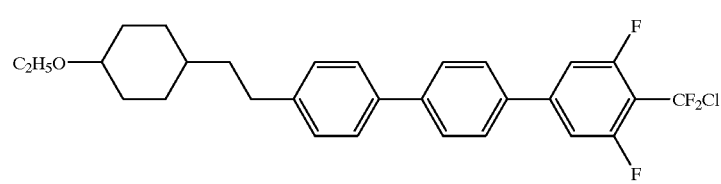 |
| 281 | 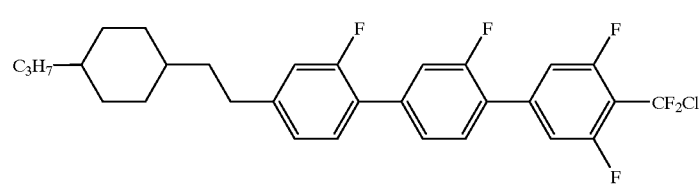 |
| 282 | 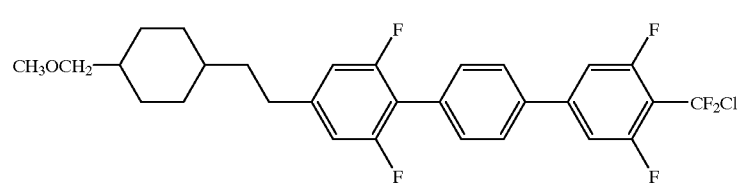 |
| 283 | 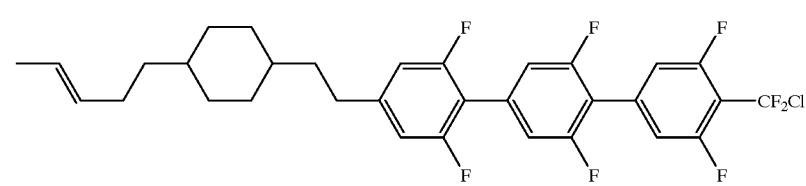 |
| 284 | 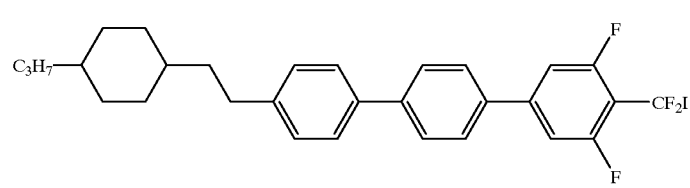 |
| 285 | 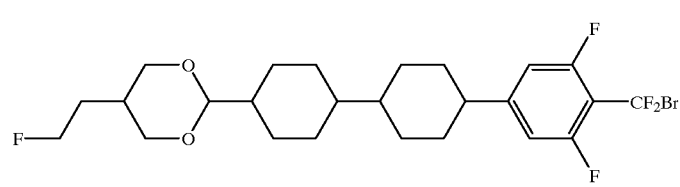 |
| 286 | 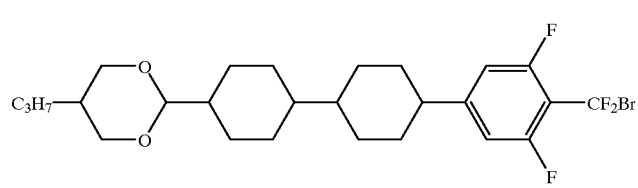 |

-continued
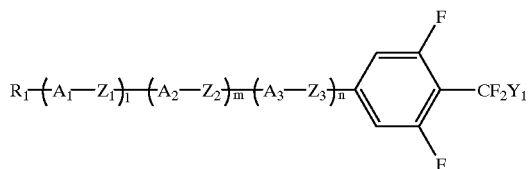
| No. | |
|---|---|
| 287 | 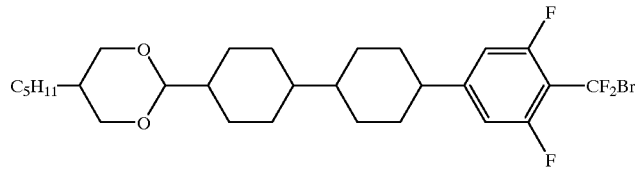 |
| 288 | 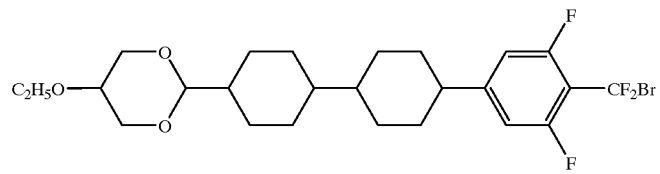 |
| 289 | 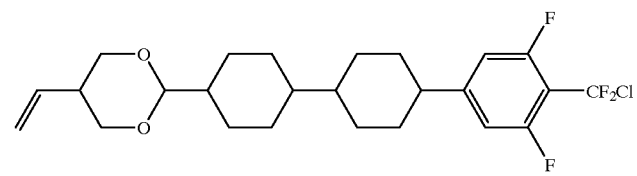 |
| 290 | 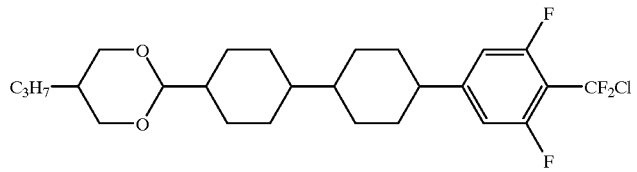 |
| 291 | 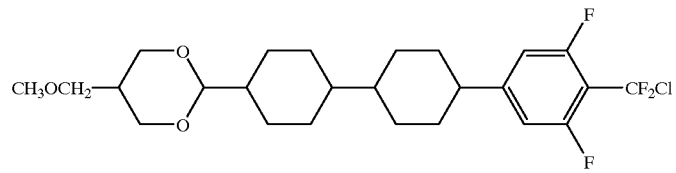 |
| 292 | 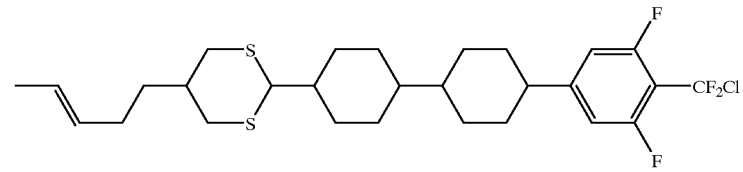 |
| 293 | 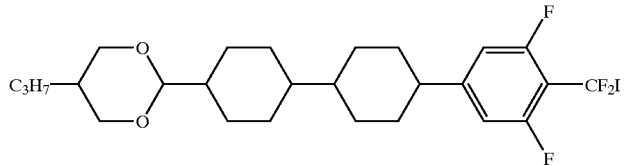 |

-continued
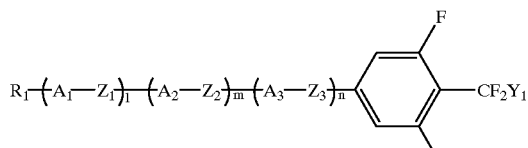
| No. | |
|---|---|
| 294 | 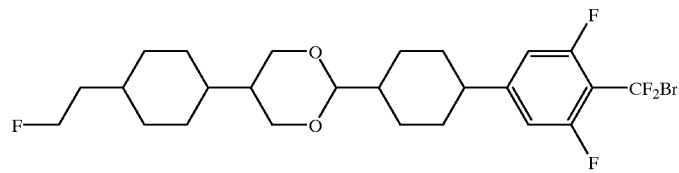 |
| 295 | 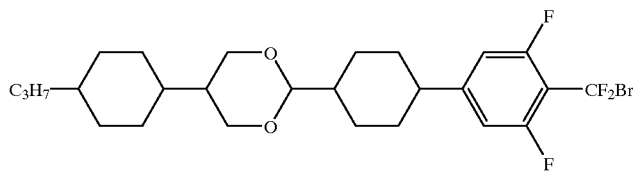 |
| 296 | 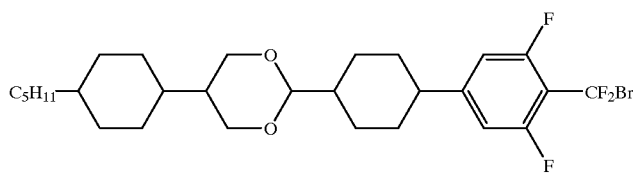 |
| 297 | 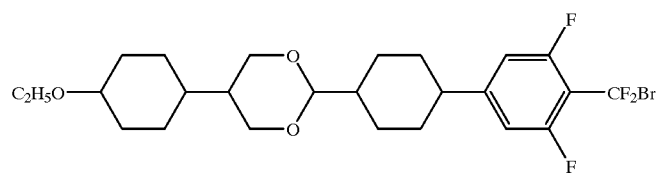 |
| 298 | 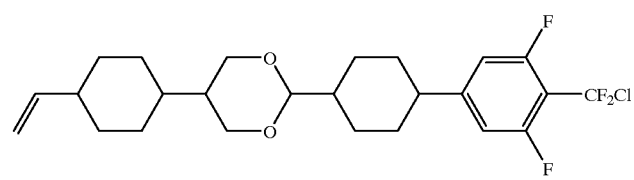 |
| 299 | 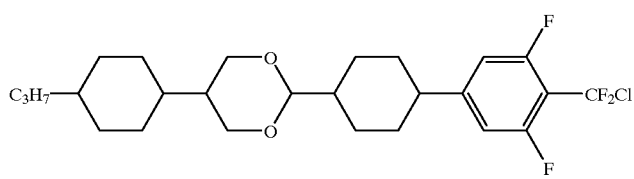 |
| 300 | 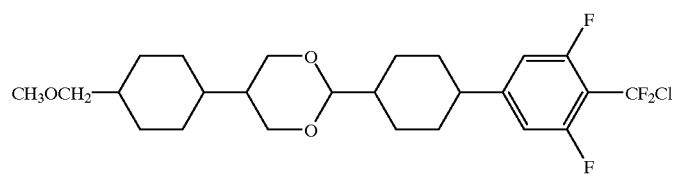 |

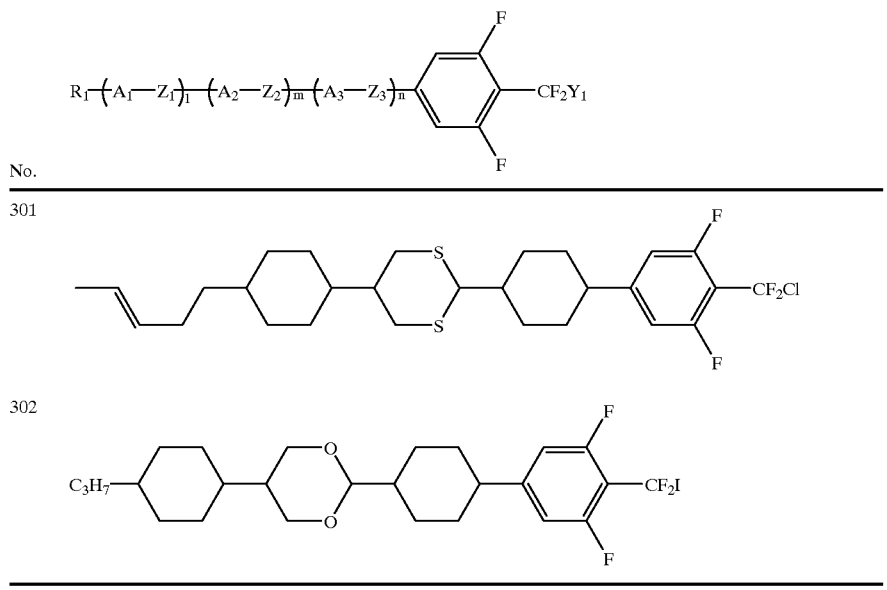

Example 3

Preparation of α,α-difluoro-2,6-difluoro-4-(trans-4-propylcyclohexyl) benzyl=3,4,5-trifluorophenyl ether—A compound of the formula (6) where $R_1$=n-propyl, l=1, , m=n=o=0, $A_1$=trans-1,4-cyclohexylene, $Z_1$=single bond, $L_1$, $L_2$ and $R_2$ are all F (compound No. 527)

In a flask equipped with a stirrer, a thermometer, a cooling tube and a nitrogen inlet, 10.0 g (27.2 mmol) of 1-bromodifluoromethyl-2,6-difluoro-4-(trans-4-propylcyclohexyl)benzene prepared in EXAMPLE 1, 4.2 g (28.6 mmol) of 3,4,5-trifluorophenol, 7.5 g (54.5 mmol) of potassium carbonate, 0.2 g (1.4 mmol) of potassium iodide and 50 ml of N,N-dimethyl formamide were mixed and heated to 120° C. and were stirred for 1.5 hours. After the reaction mixture was cooled down to room temperature, 100 ml of water was added and extracted with 200 ml of toluene. The extracted layer was washed with water, dried over anhydrous magnesium sulfate, and evaporation of the solvent under reduced pressure gave 11.3 g of the product. The obtained product was purified by silica gel column chromatography (eluent: heptane) to give 10.1 g of column treated product (the object 98%).

The above treated product was recrystallized from heptane to give 9.0 g of the objective α,α-difluoro-2,6-difluoro-4-(trans-4-propylcyclohexyl)benzyl-3,4,5-trifluorophenyl ether. The yield of this product from 1-bromodifluoromethyl-2,6-difluoro-4-(trans-4-propylcyclohexyl)benzene was 76.2%. The chemical structure of this compound was strongly supported by various spectral data.

Phase transition temperature (°C.): Cr 40.7 Iso $^1$H-NMR (δ ppm): 0.8–2.1 (m, 16H), 2.5 (m, 1H), 6.5–7.1 (m, 4H) $^{19}$F-NMR: −66.06 (m, 2F), −111.95 (m, 2F), −133.08 (m, 2F), −163.85 (m, 1F) GC-MS: 287 (100), 189 (6.5), 176 (4.3), 163 (26.6), 55 (3.4), 41 (4.0).

Referred Example

The objective α,α-difluoro-2,6-difluoro-4-(trans-4-propylcyclohexyl) benzyl=3,4,5-trifluorophenyl ether was prepared in the following from the column treated product which is a mixture of 1-bromodifluoromethyl-2,6-difluoro-4-(trans-4-propylcyclohexyl) benzene (66% by weight) and 2,6-difluoro-4-(trans-4-propylcyclohexyl) bromobenzene (32%. by weight) and was obtained in EXAMPLE 1 by silica gel column chromatographical purification.

In a flask equipped with a stirrer, a thermometer, a cooling tube and a nitrogen inlet, under nitrogen atmosphere, 25.0 g of column treated product of EXAMPLE 1 (1-bromodifluoromethyl-2,6-difluoro-4-(trans-4-propylcyclohexyl) benzene 44.9 mmol), 7.3 g (49.4 mmol) of 3,4,5-trifluorophenol, 12.4 g (89.9 mmol) of potassium carbonate, 0.5 g (2.2 mmol) of potassium iodide and 150 ml of N,N-dimethyl formamide were mixed and heated to 120° C., and were stirred for 1.5 hours. The reaction mixture was cooled down to room temperature, was added with 300 ml of water, and was extracted with 400 ml of toluene. The extracted layer was washed with water and after dried over anhydrous magnesium sulfate, evporation of the solvent under reduced pressure gave 28.0 g of the product. The obtained product was dissolved in a solution consisting of 100 ml toluene and 50 ml ethanol, 2.2 g of 5% palladium-carbon catalyst and 3.1 g (30.3 mmol) of triethylamine was added to the mixture, and the mixture was stirred for 8 hours at room temperature in an autoclave under hydrogen pressure of 2 kg/cm$^2$. After removing the catalyst by filtration, the reaction mixture was added by 150 ml water and extracted with 200ml toluene.

The extracted layer was washed with 100 ml of 1M aqueous solution of hydrochloric acid, then washed in sequence by 150 ml water, 100 ml of saturated aqueous solution of sodium carbonate and 150 ml water followed by drying over anhydrous magnesium sulfate, and evaporation of the solvent under reduced pressure gave 25.5 g of the reaction product.

Silica gel column chromatography (eluent: heptane) of the obtained reaction product gave components of Rf=0.74 (4.9 g) and Rf=0.46 (19.3 g). The above Rf=0.46 component was recrystallized from heptane to give 16.9 g of the objective α,α-difluoro-2,6-difluoro-4-(trans-4-propylcyclohexyl) benzyl-3,4,5-trifluorophenyl ether. In this method, the yield was 78.8% based on 3,4,5-trifluorophenol used and 46.9% based on 2,6-difluoro-4-(trans-4-propylcyclohexyl) benzene used in EXAMPLE 1.

The above Rf=0.74 component was 2,6-difluoro-4-(trans-4-propyl cyclohexyl) benzene. This shows that the by-product in EXAMPLE 1 can be recovered and hence the method of this invention is considered as an effective way of the production.

Example 4

Preparation of α,α-difluoro-2,6-difluoro-4-(trans-4-propyl-1,3-dioxane-2-yl) benzyl-3,4,5-trifluorophenyl ether—A compound of the formula (6) where $R_1$=n-propyl, l=1, m=n=o=0, $A_1$=trans-1,3-dioxanediyl, $Z_1$=single bond, $L_1$,$L_2$ and $R_2$ are all F (compound No. 583)

In a flask equipped with a stirrer, a thermometer, a cooling tube and a nitrogen inlet, under nitrogen atmosphere, 1.4 g (35.6 mmol) of sodium hydride (60% oily) was suspended in 20 ml DMF and 20 ml DMF solution of 4.4 g (29.6 mmol) of 3,4,5-trifluorophenol was added drop by drop with stirring at room temperature. After additional stirring for 1 more, 50 ml DMF solution of 10.0 g (26.9 mmol) trans-2-(3,5-difluoro-4-bromodifluoromethyl phenyl) -5-propyl-1,3-dioxane obtained in EXAMPLE 2 was added drop by drop, heated to 60° C. and stirred for 4 hours. The reaction mixture was cooled down to room temperature, added with 100 ml of water and extracted with 200 ml of toluene. The extracted layer was washed with water, dried over anhydrous magnesium sulfate and evaporation of the solvent under reduced pressure gave 11.6 g of the reaction product. The obtained reaction product was purified by silica gel column chromatography (eluent: heptane/toluene=3/2) followed by recrystallization from ethanol to give 7.7 g of the objective α,α-difluoro-2,6-difluoro-4-(trans-4-propyl-1,3-dioxane-2-yl)benzyl=3,4,5-trifluorophenyl ether. The yield from trans-2-(3,5-difluoro-4-bromodifluoromethylphenyl)-5-propyl-1, 3-dioxane was 65.9%. The chemical structure of this compound was strongly supported by various spectrum data.

Phase transition point (°C.): Cr 41.6 Iso $^1$H-NMR (δ ppm): 0.8–2.6 (m, 7H), 1.8–2.4 (m, 1H), 3.4–3.7 (m, 2H), 4.1–4.5 (m, 2H), 5.3–6 (s, 1H), 6.8–7.4 (m, 2H). $^{19}$F-NMR: −62.1 (m, 2F), −110.5 (m, 2F), −132.9 (m, 2F), −163.6 (m, 1F).

GC-MS: 291 ($M^+$-C6H2F3O, 100), 191 (23.4), 163 (70.2), 83 (24.3), 55 (91.7), 41 (46.8), 29 (22.3).

The following difluorobenzyl ether derivative (compound Nos. 501–526, 528–582, 584–668) can be easily prepared according to the method described in EXAMPLE 3 and EXAMPLE 4.

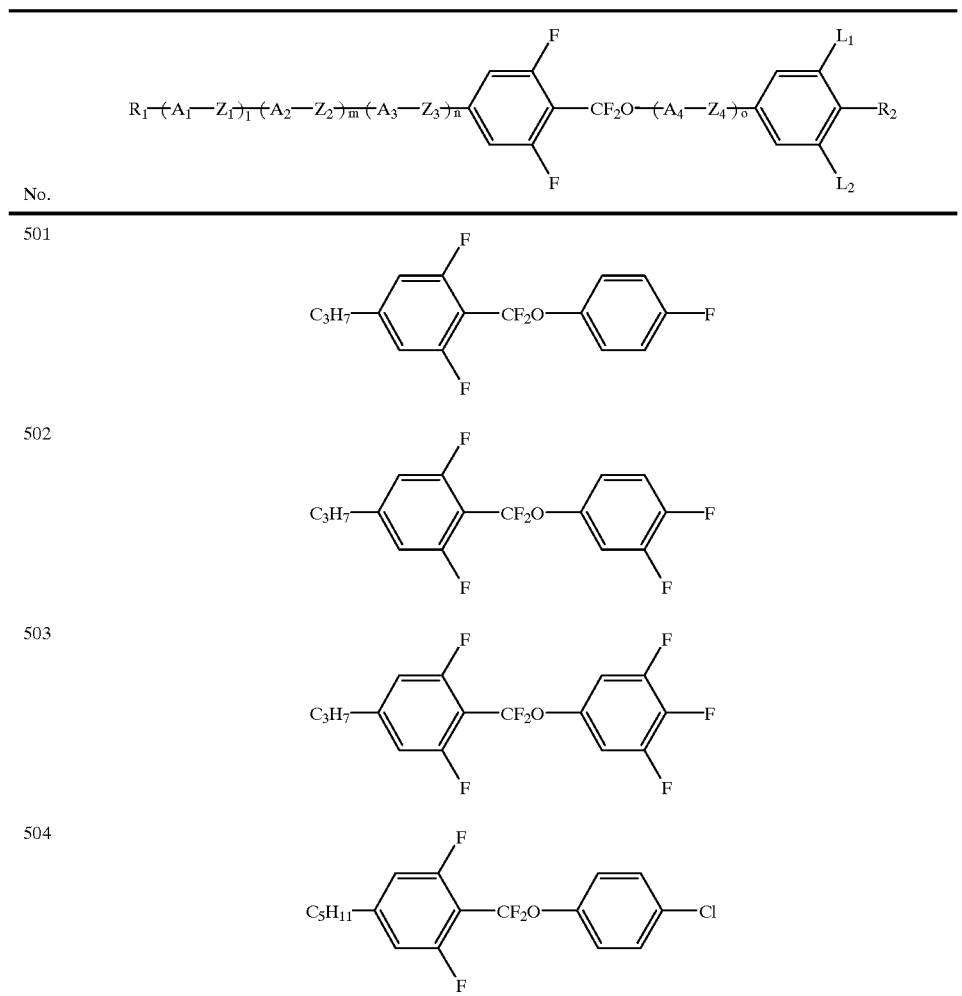

-continued
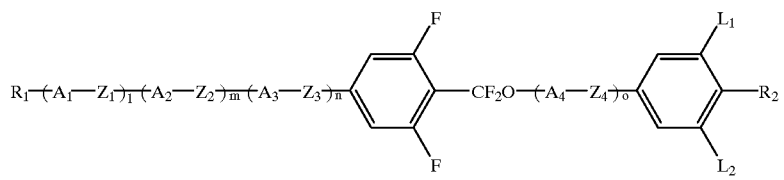
| No. | |
|---|---|
| 505 | 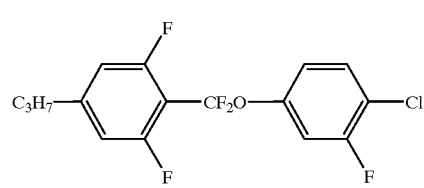 |
| 506 | 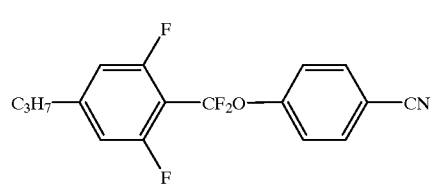 |
| 507 | 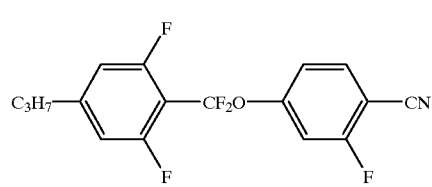 |
| 508 | 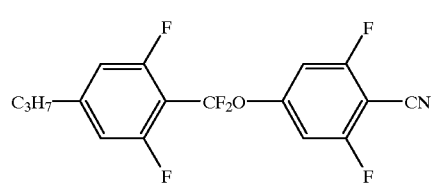 |
| 509 | 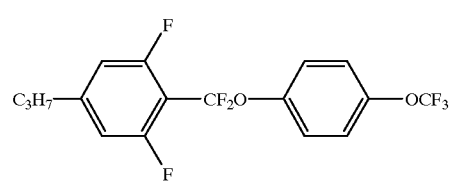 |
| 510 | 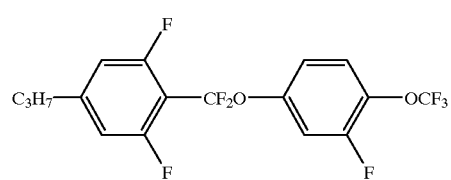 |
| 511 | 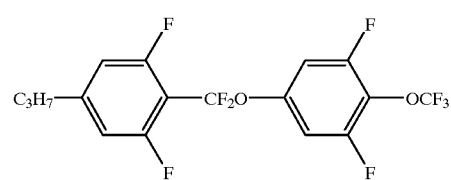 |

-continued
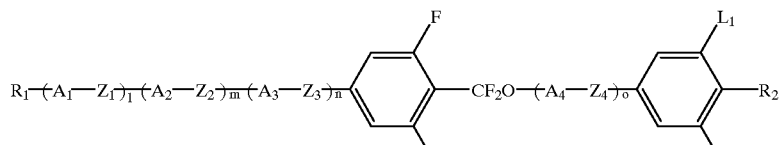
| No. | |
|---|---|
| 512 | 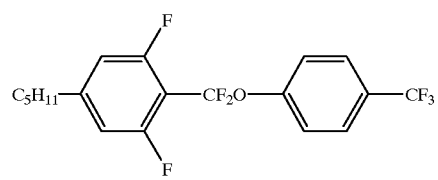 |
| 513 | 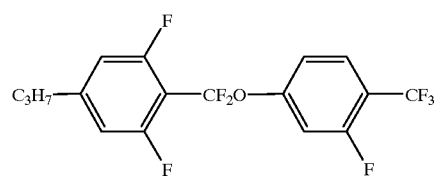 |
| 514 | 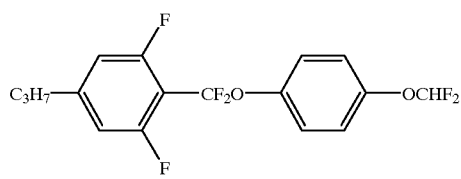 |
| 515 | 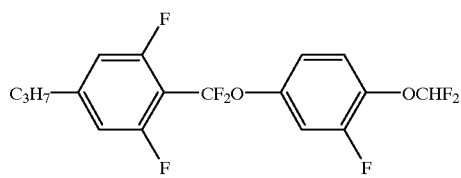 |
| 516 | 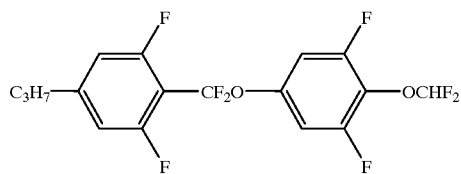 |
| 517 | 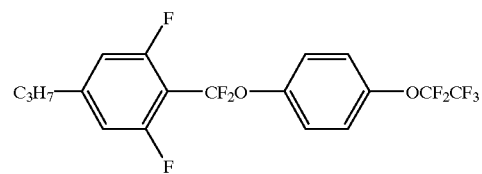 |
| 518 | 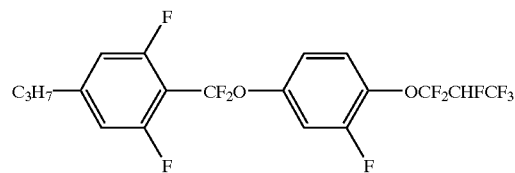 |

-continued
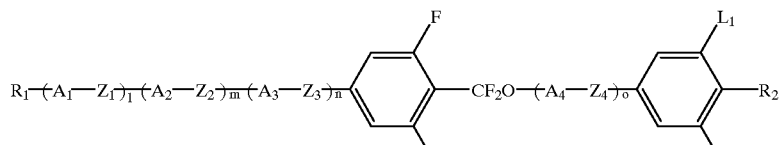
| No. | |
|---|---|
| 519 | 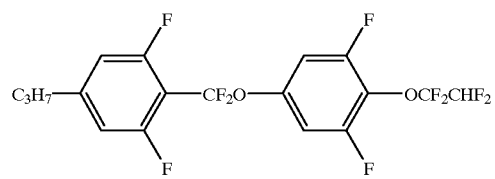 |
| 520 | 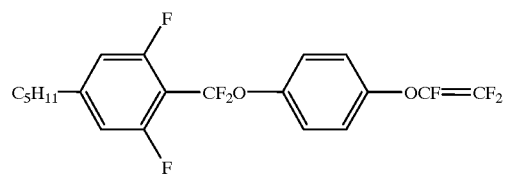 |
| 521 | 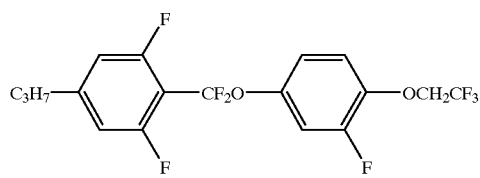 |
| 522 | 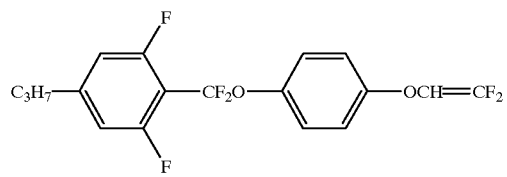 |
| 523 | 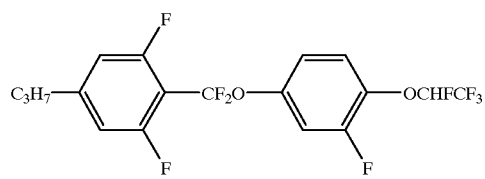 |
| 524 | 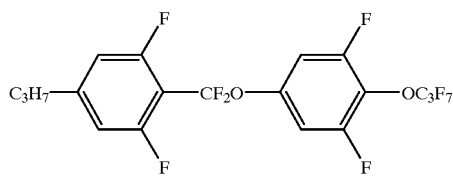 |
| 525 | 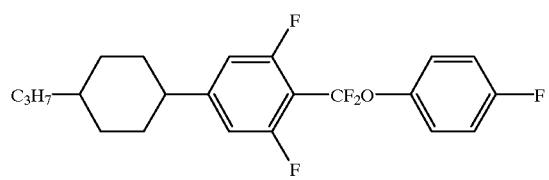 |

-continued
| | 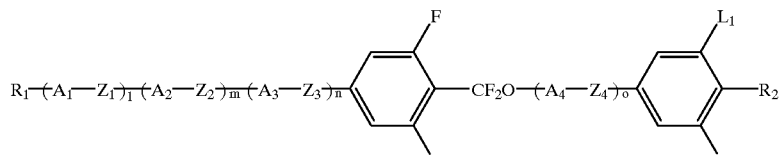 | |
|---|---|---|
| No. | | |
| 526 | 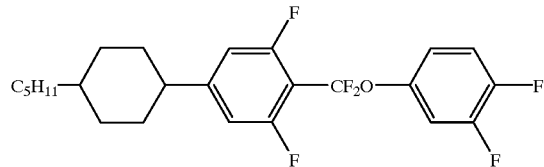 | |
| 527 | 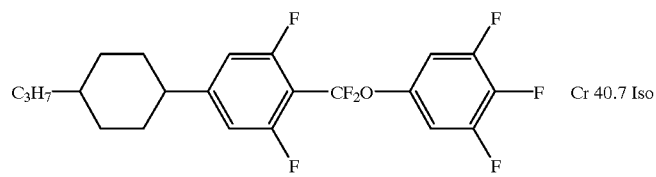 | Cr 40.7 Iso |
| 528 | 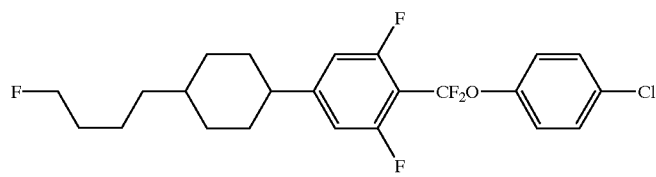 | |
| 529 | 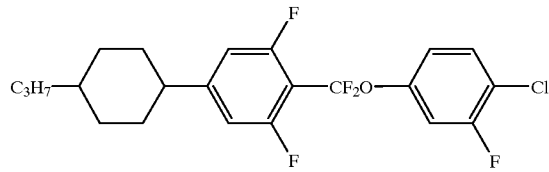 | |
| 530 | 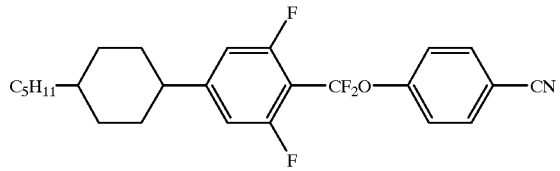 | |
| 531 | 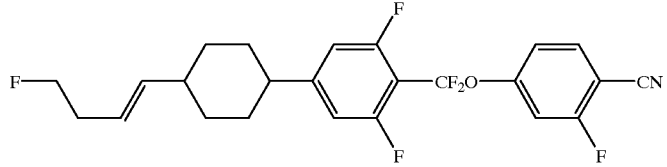 | |
| 532 | 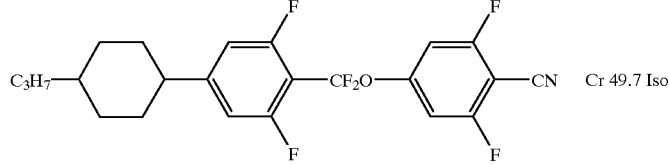 | Cr 49.7 Iso |

-continued
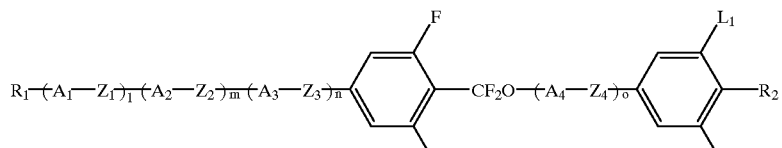
| No. | |
|---|---|
| 533 | 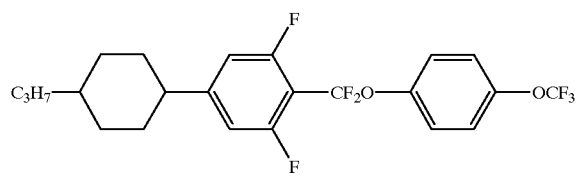 |
| 534 | 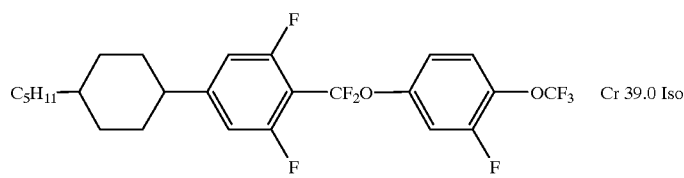 Cr 39.0 Iso |
| 535 | 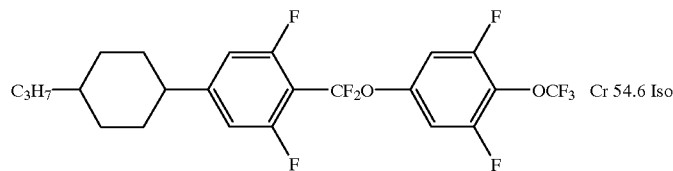 Cr 54.6 Iso |
| 536 | 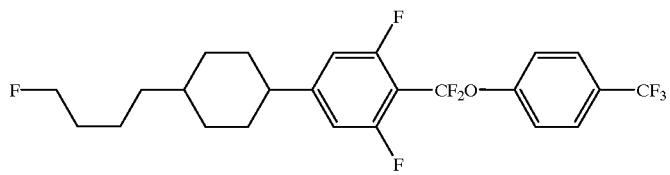 |
| 537 | 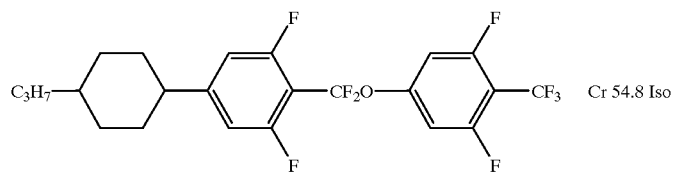 Cr 54.8 Iso |
| 538 | 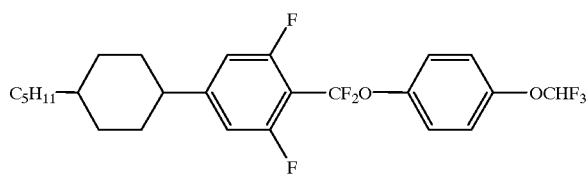 |
| 539 | 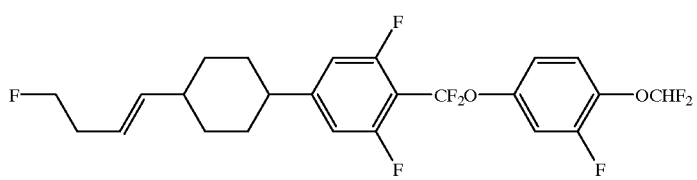 |

-continued
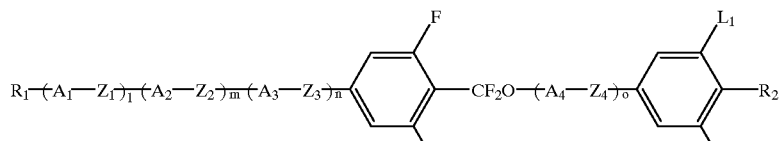
| No. | |
|---|---|
| 540 | 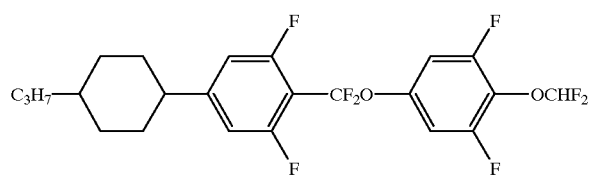 |
| 541 | 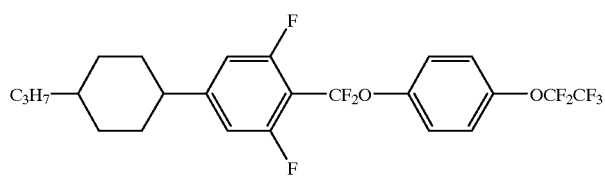 |
| 542 | 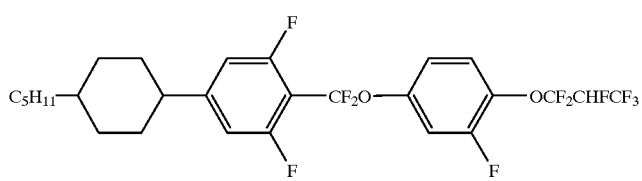 |
| 543 | 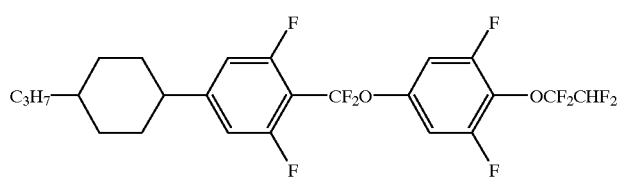 |
| 544 | 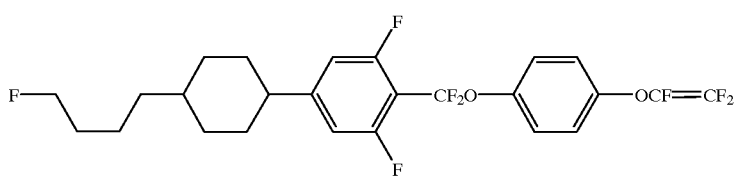 |
| 545 | 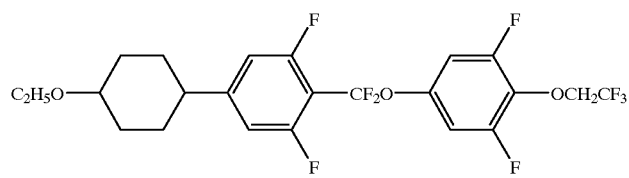 |
| 546 | 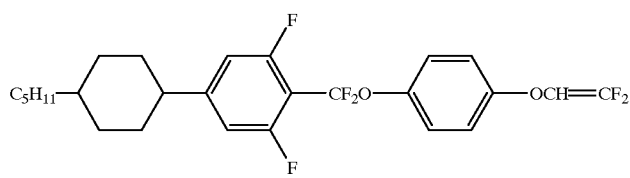 |

-continued
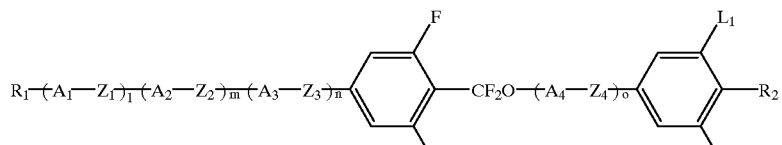
| No. | |
|---|---|
| 547 | 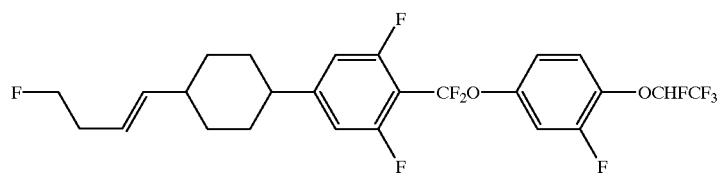 |
| 548 | 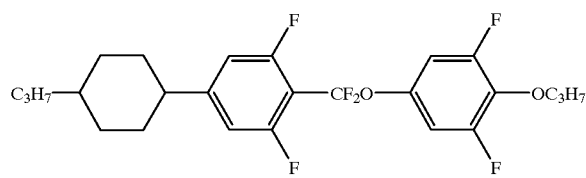 |
| 549 | 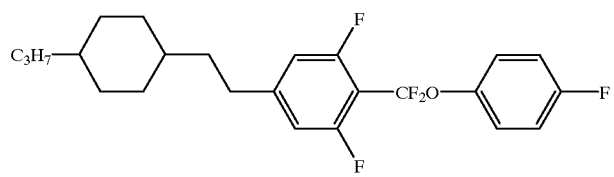 |
| 550 | 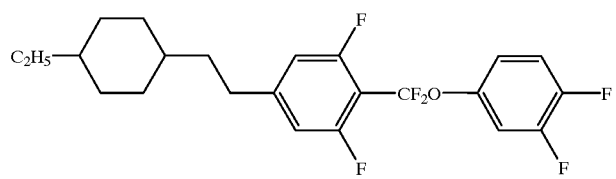 |
| 551 | 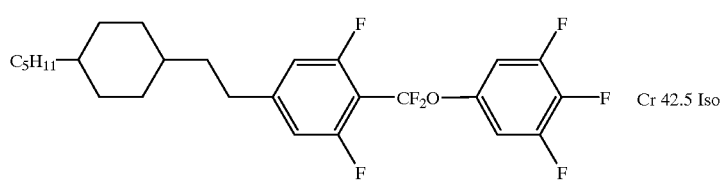 Cr 42.5 Iso |
| 552 | 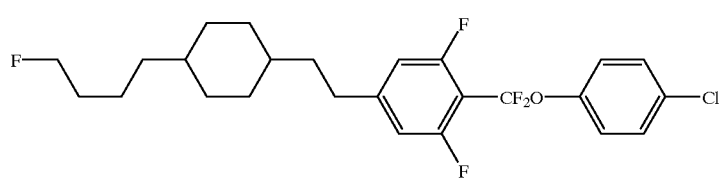 |
| 553 | 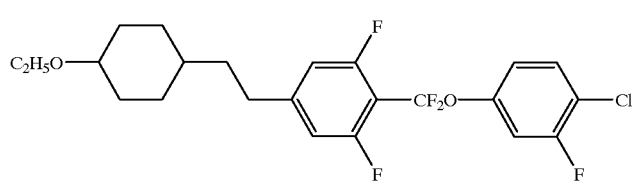 |

-continued
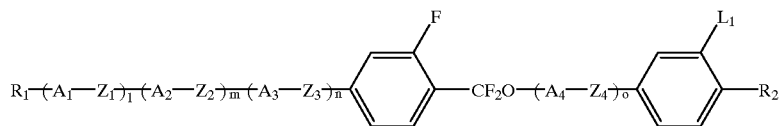
| No. | |
|---|---|
| 554 | 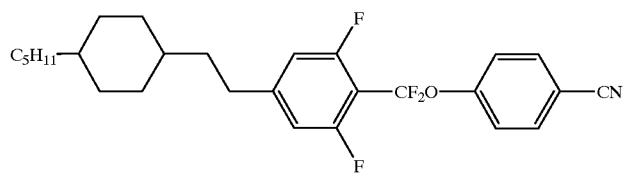 |
| 555 | 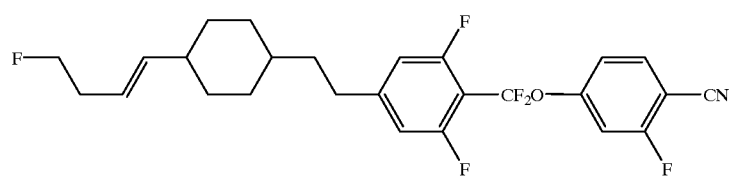 |
| 556 | 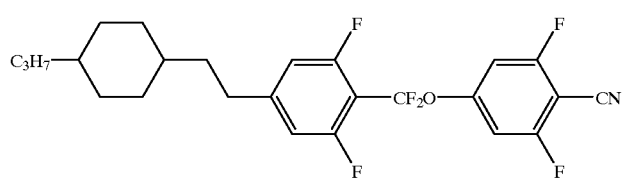 |
| 557 | 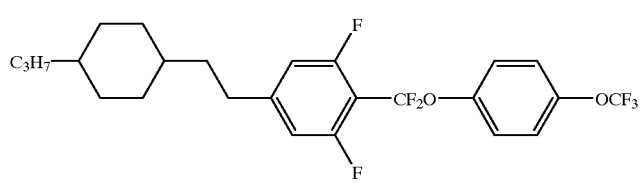 |
| 558 | 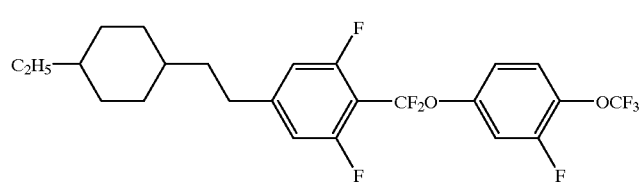 |
| 559 | 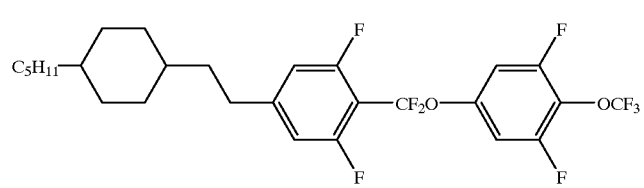 |
| 560 | 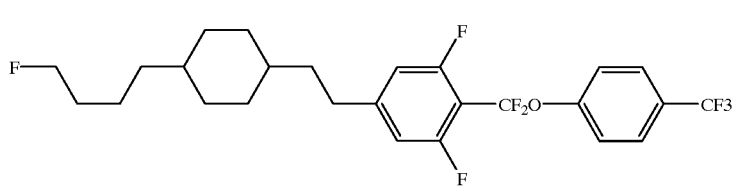 |

-continued
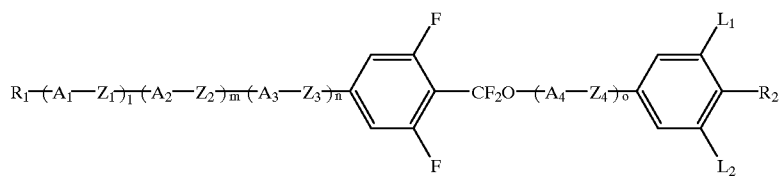
| No. | |
|---|---|
| 561 | 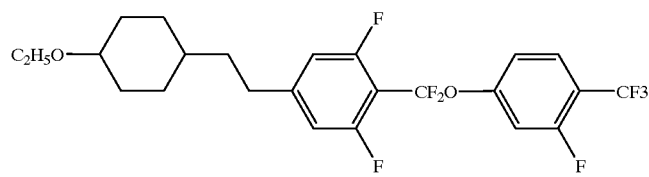 |
| 562 | 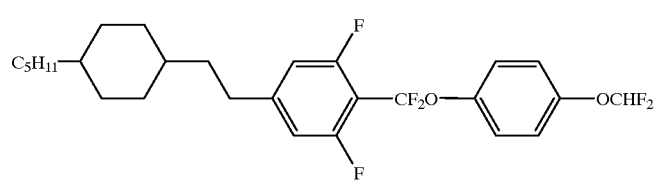 |
| 563 | 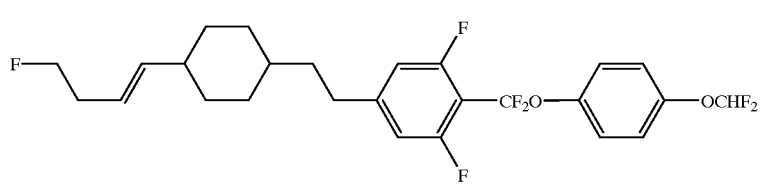 |
| 564 | 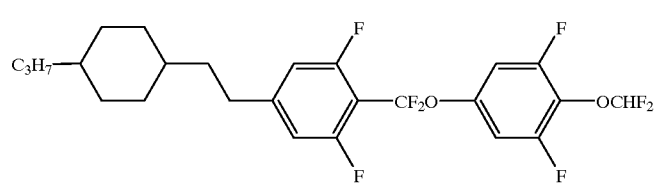 |
| 565 | 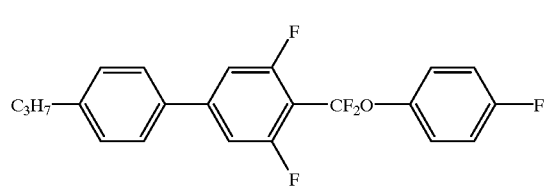 |
| 566 | 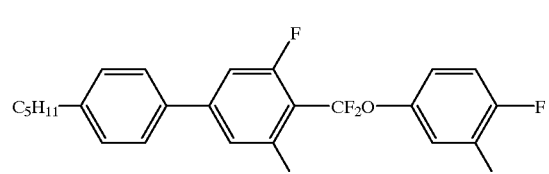 |
| 567 | 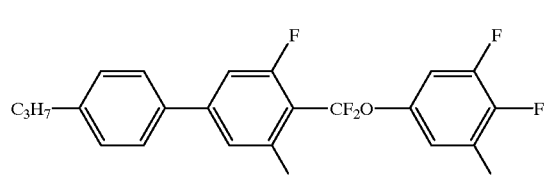 |

-continued
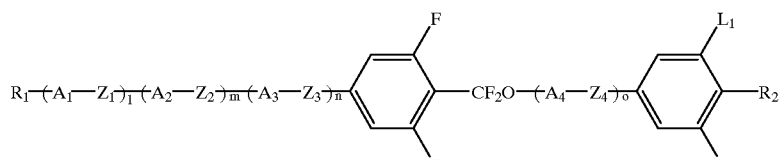
| No. | |
|---|---|
| 568 | 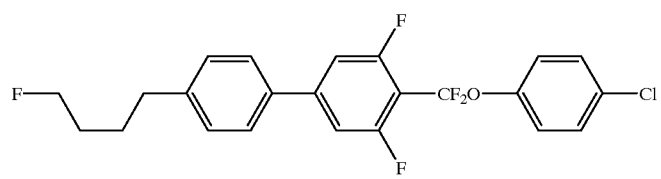 |
| 569 | 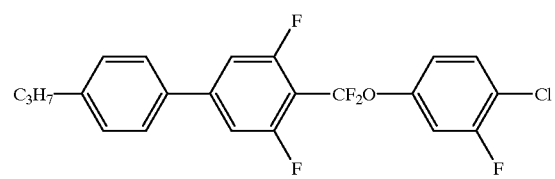 |
| 570 | 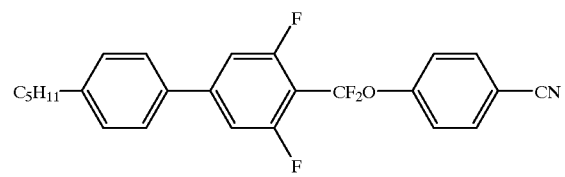 |
| 571 | 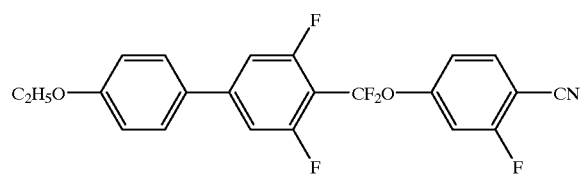 |
| 572 | 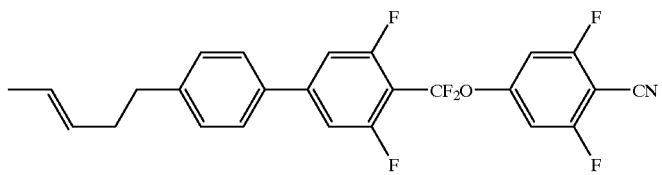 |
| 573 | 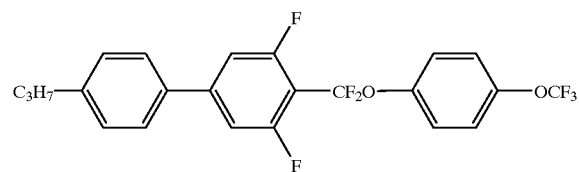 |
| 574 | 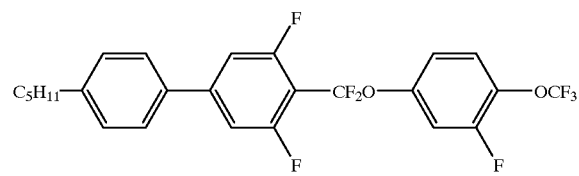 |

-continued
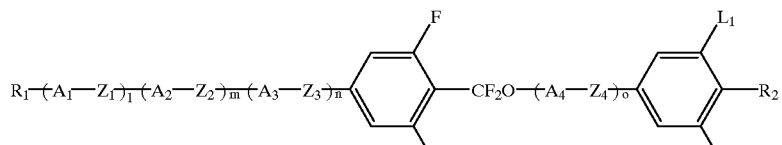
| No. | |
|---|---|
| 575 | 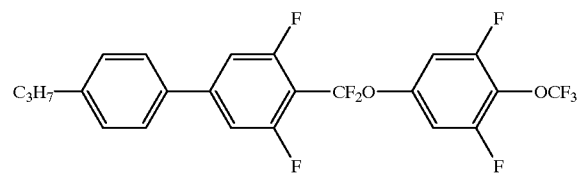 |
| 576 | 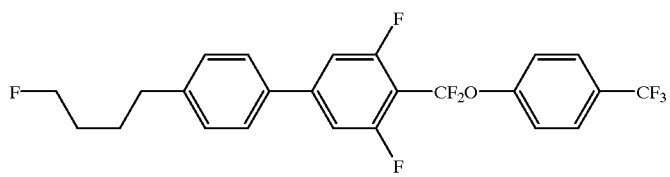 |
| 577 | 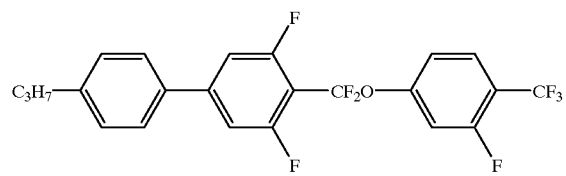 |
| 578 | 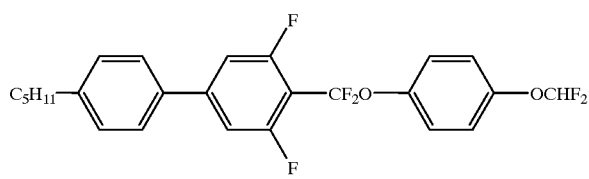 |
| 579 | 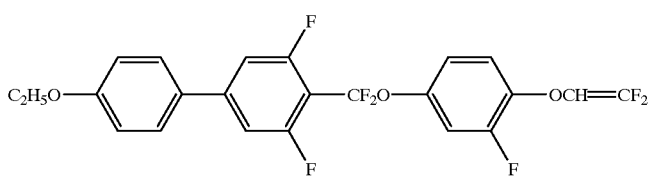 |
| 580 | 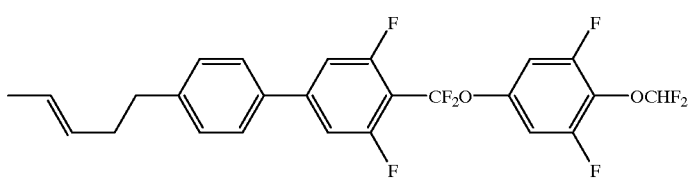 |
| 581 | 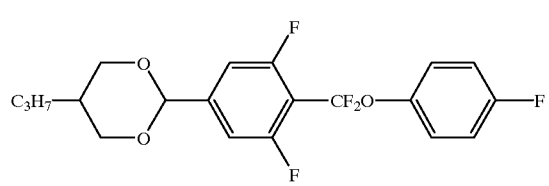 |

-continued
| No. | 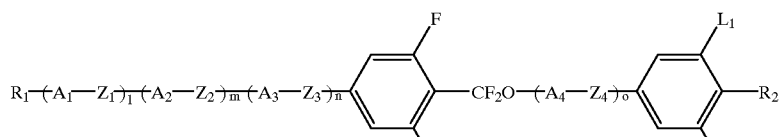 |
|---|---|
| 582 | 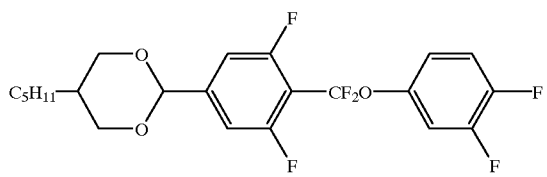 |
| 583 | 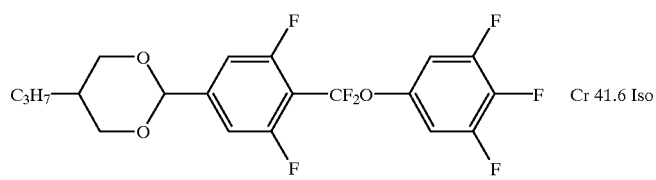 Cr 41.6 Iso |
| 584 | 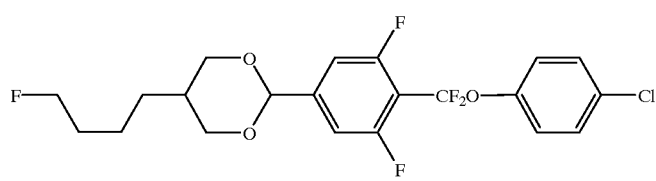 |
| 585 | 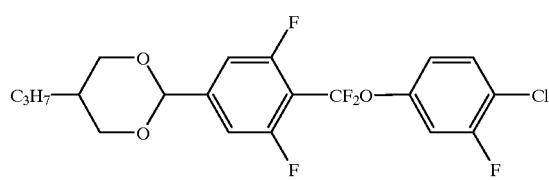 |
| 586 | 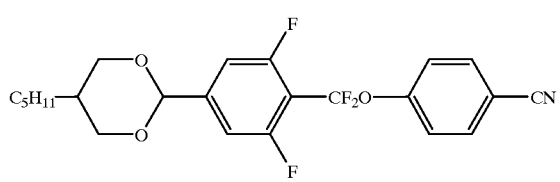 |
| 587 | 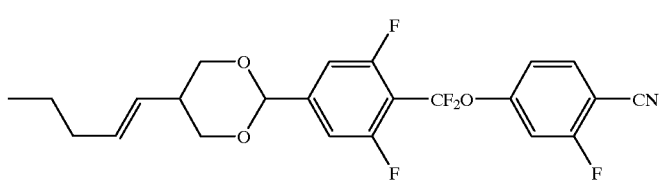 |
| 588 | 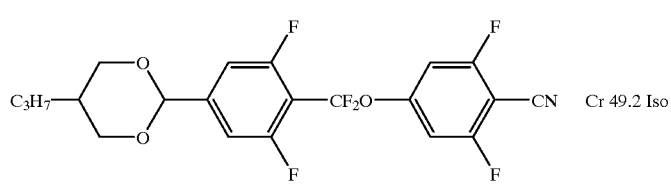 Cr 49.2 Iso |

-continued
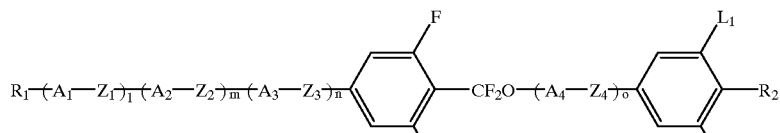
| No. | |
|---|---|
| 589 | 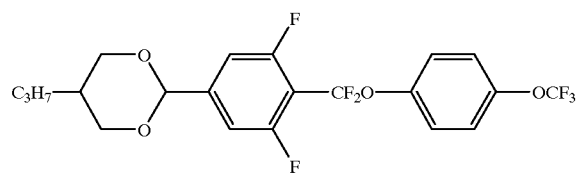 |
| 590 | 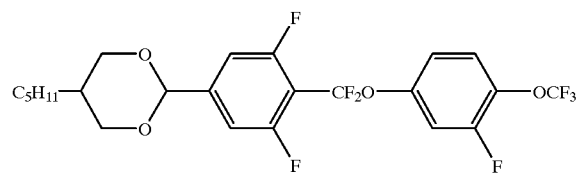 |
| 591 | 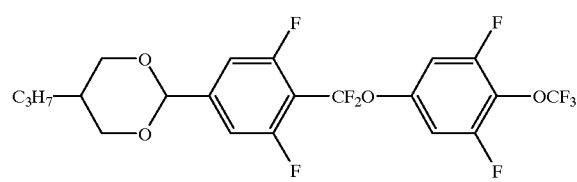 |
| 592 | 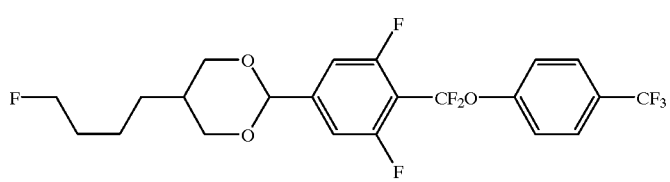 |
| 593 | 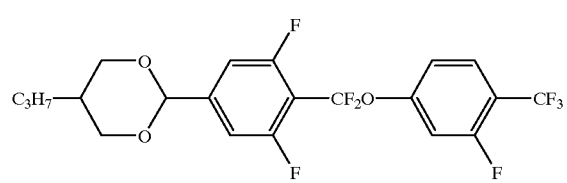 |
| 594 | 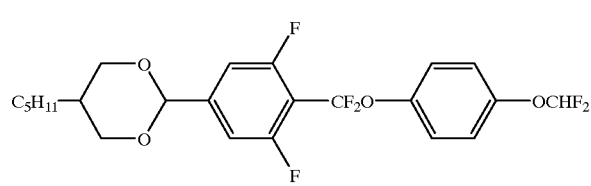 |
| 595 | 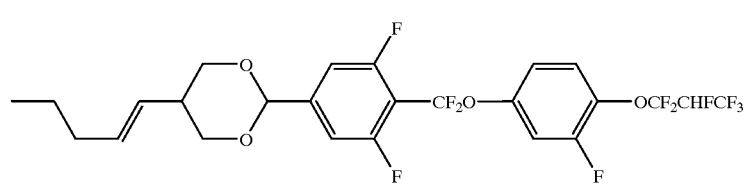 |

-continued
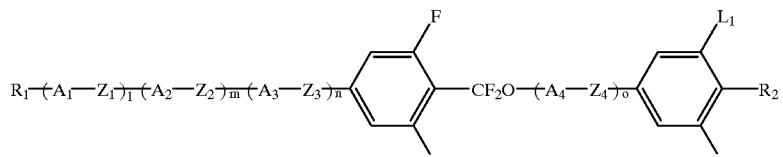
| No. | |
|---|---|
| 596 | 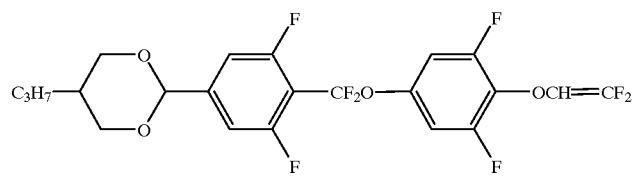 |
| 597 | 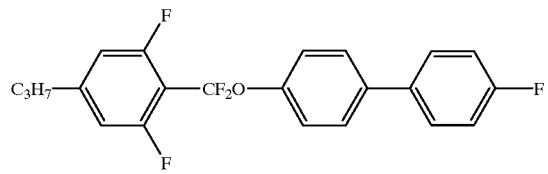 |
| 598 | 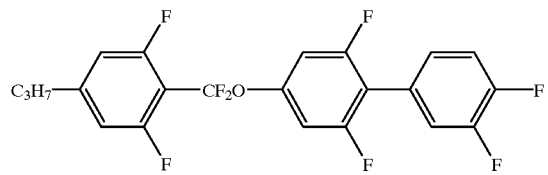 |
| 599 | 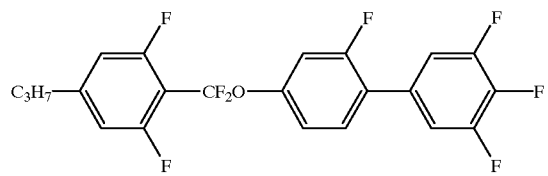 |
| 600 | 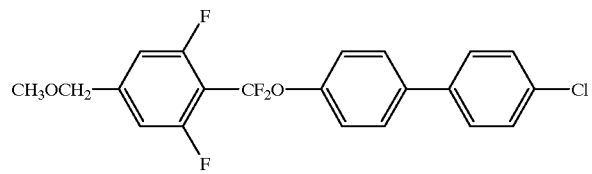 |
| 601 | 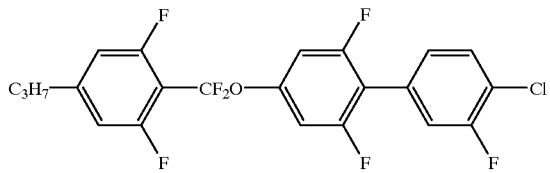 |
| 602 | 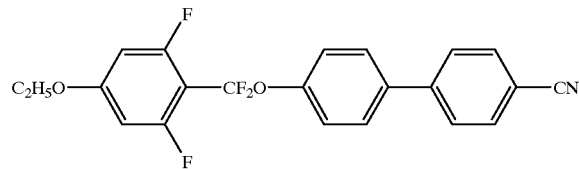 |

-continued
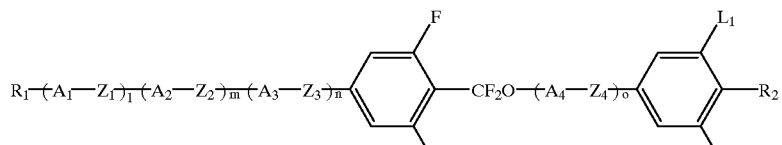
| No. | |
|---|---|
| 603 | 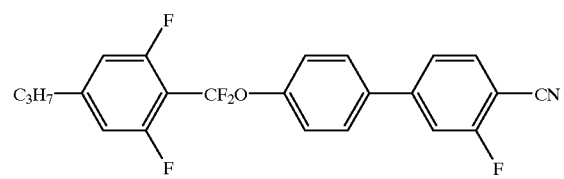 |
| 604 | 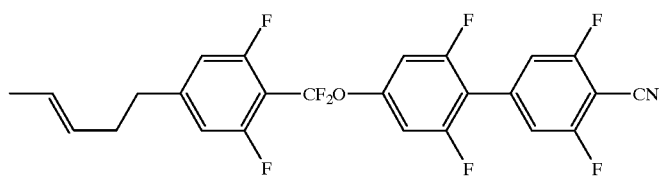 |
| 605 | 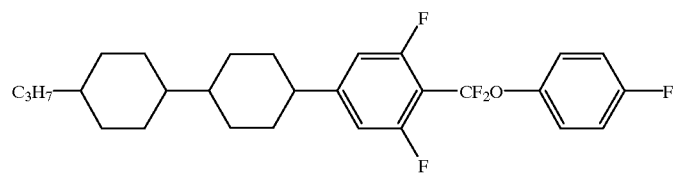 |
| 606 | 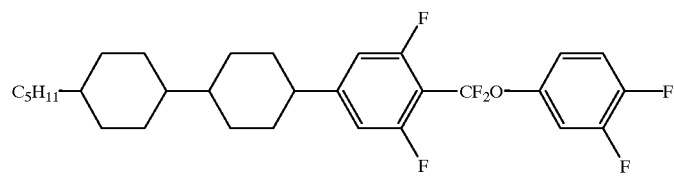 |
| 607 | 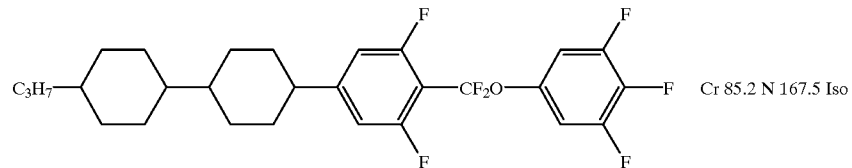 Cr 85.2 N 167.5 Iso |
| 608 | 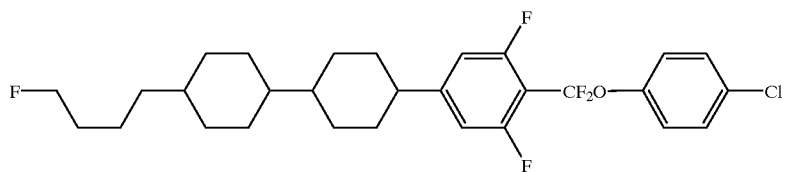 |
| 609 | 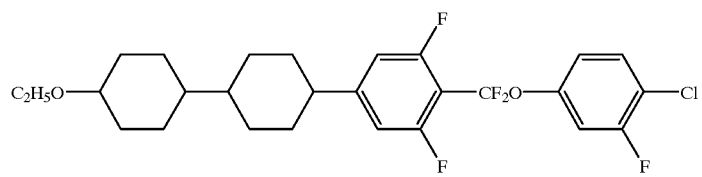 |

-continued
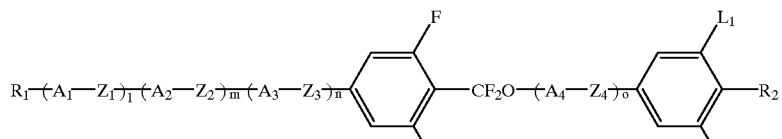
| No. | |
|---|---|
| 610 | 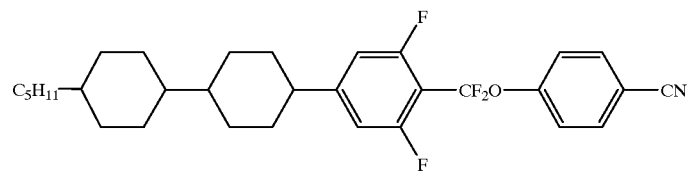 |
| 611 | 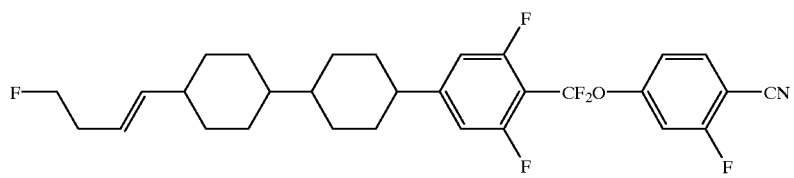 |
| 612 | 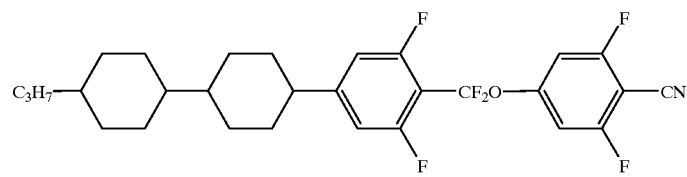 |
| 613 | 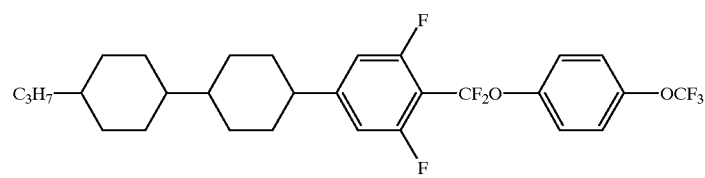 |
| 614 | 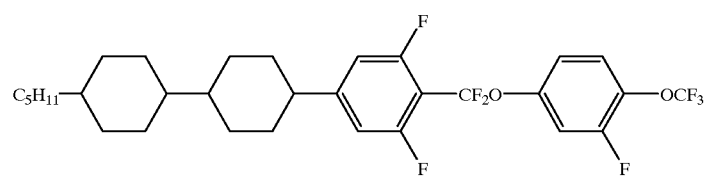 |
| 615 | 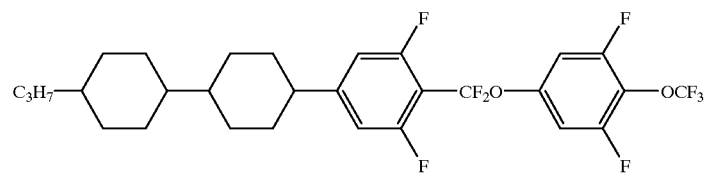 |
| 616 | 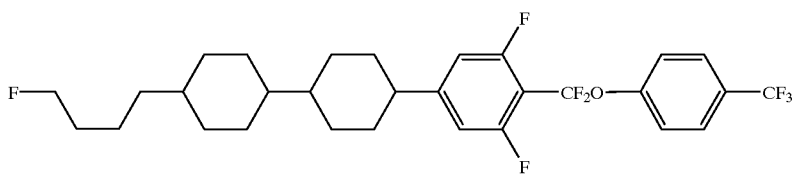 |

-continued
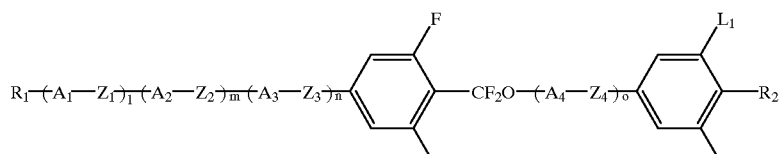
| No. | |
|---|---|
| 617 | 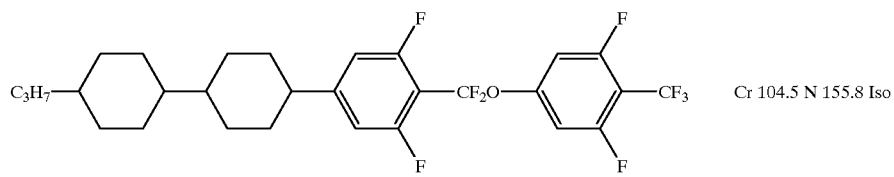 Cr 104.5 N 155.8 Iso |
| 618 | 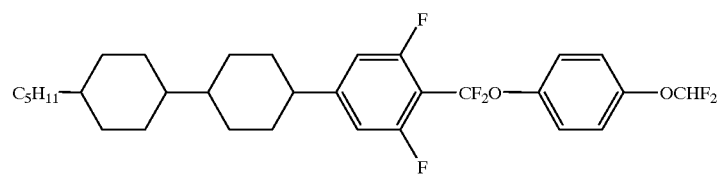 |
| 619 | 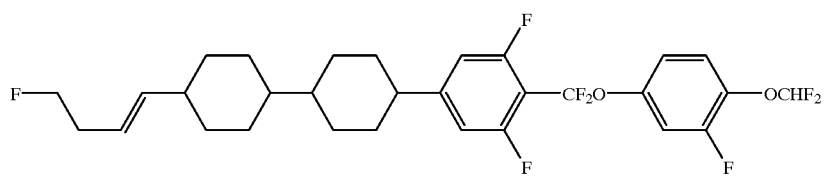 |
| 620 | 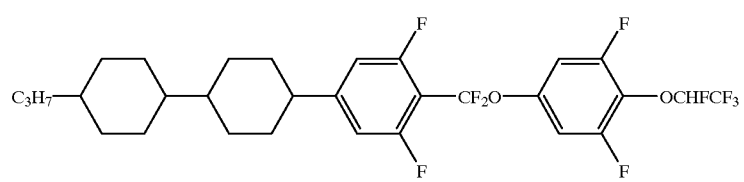 |
| 621 | 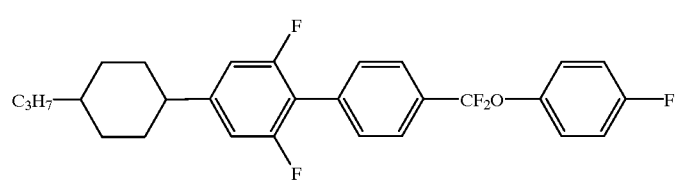 |
| 622 | 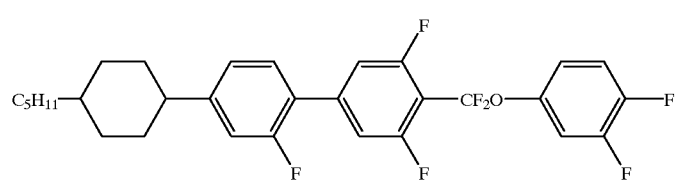 |
| 623 | 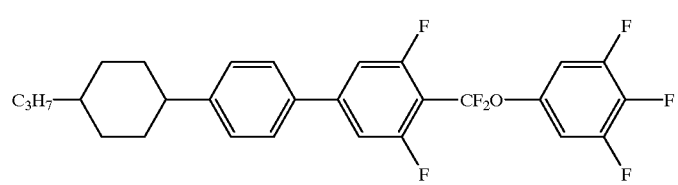 |

-continued
| | |
|---|---|
| No. | $R_1\text{---}(A_1\text{---}Z_1)_l\text{---}(A_2\text{---}Z_2)_m\text{---}(A_3\text{---}Z_3)_n\text{---}$ [ring with F,F,CF$_2$O]$\text{---}(A_4\text{---}Z_4)_o\text{---}$[ring with L$_1$, R$_2$, L$_2$] |
624 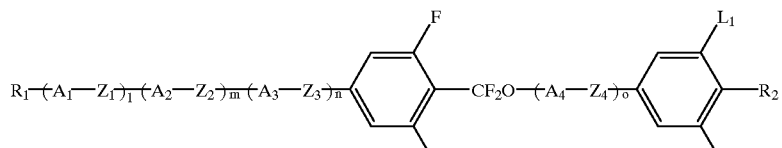
625 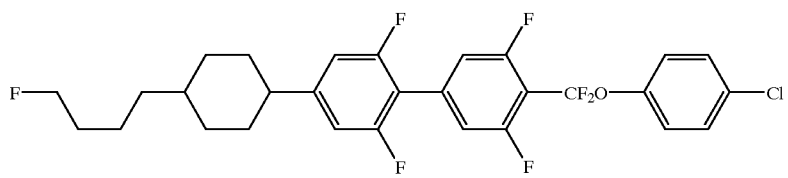
626 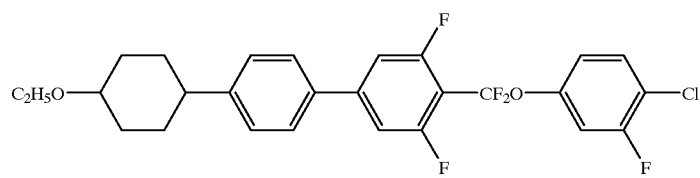
627 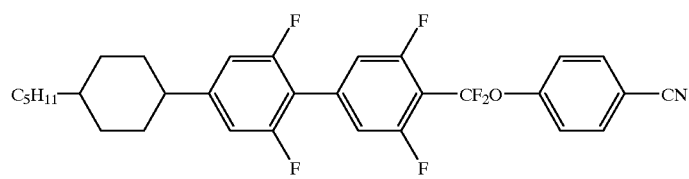
628 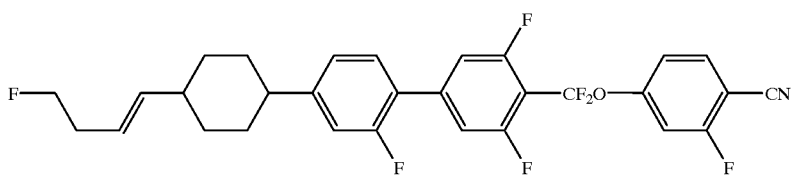
629 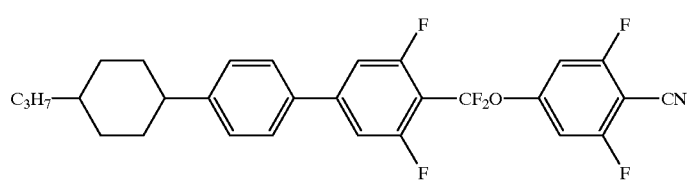
630 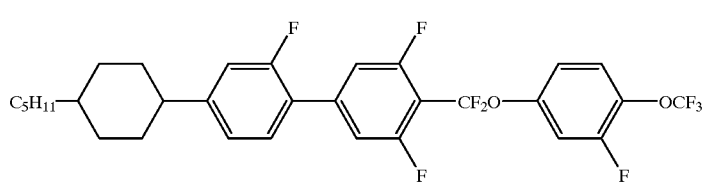

-continued
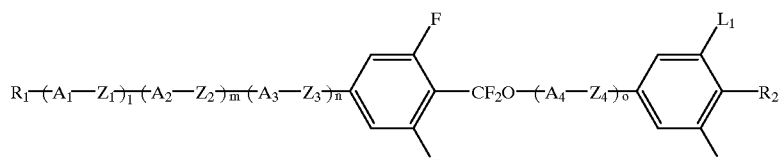
| No. | |
|---|---|
| 631 | 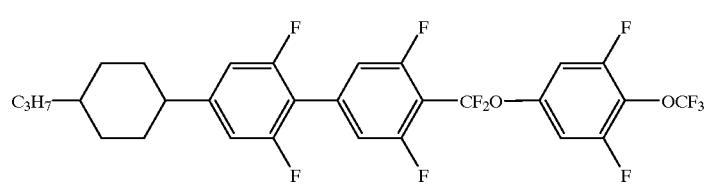 |
| 632 | 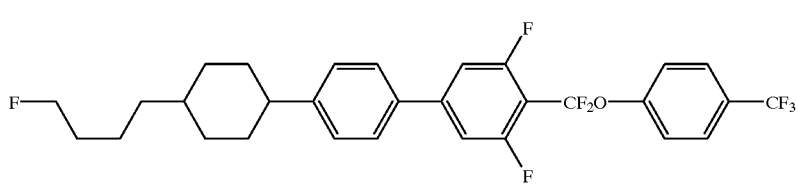 |
| 633 | 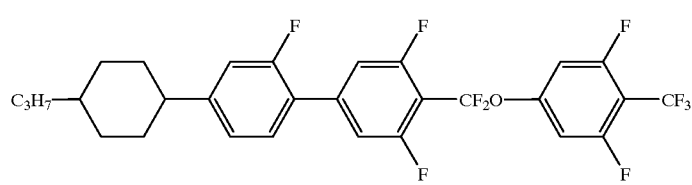 |
| 634 | 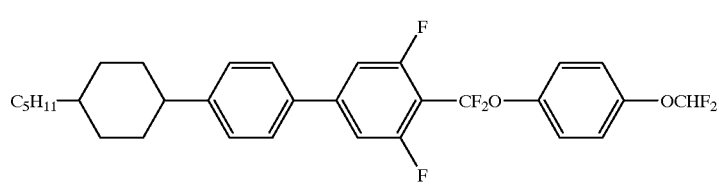 |
| 635 | 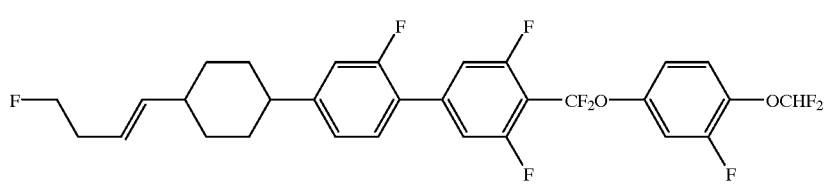 |
| 636 | 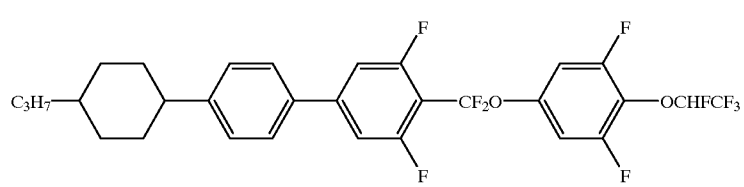 |
| 637 | 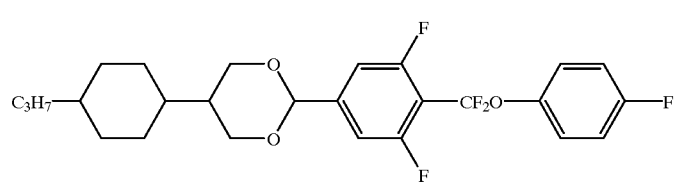 |

-continued
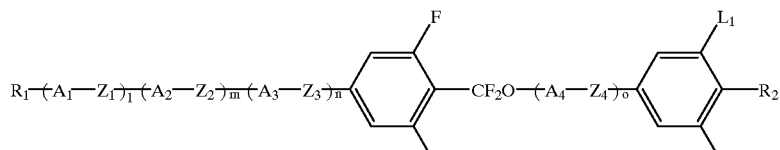
| No. | |
|---|---|
| 638 | 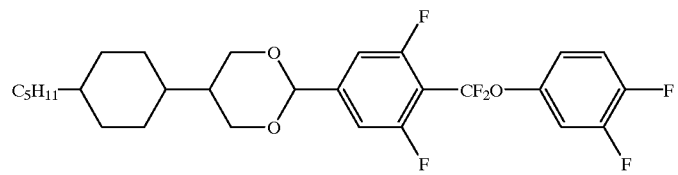 |
| 639 | 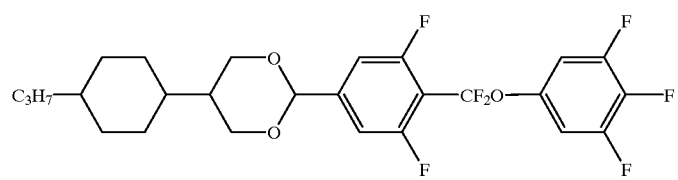 |
| 640 | 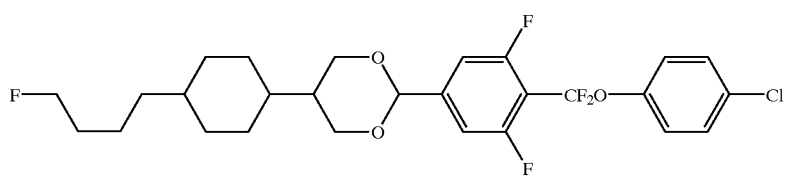 |
| 641 | 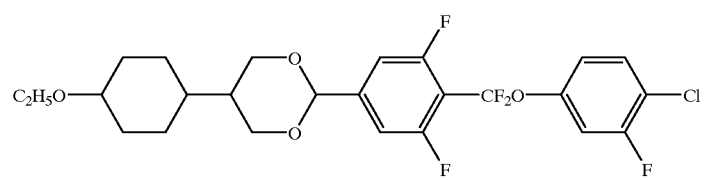 |
| 642 | 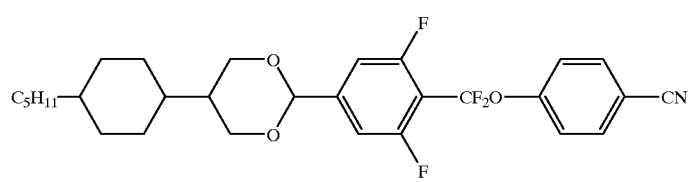 |
| 643 | 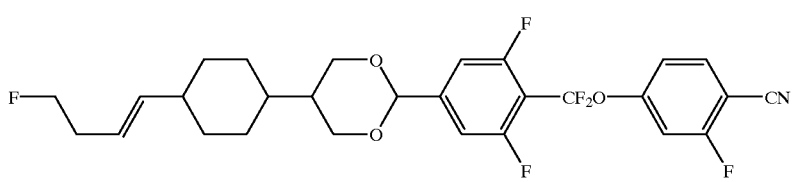 |
| 644 | 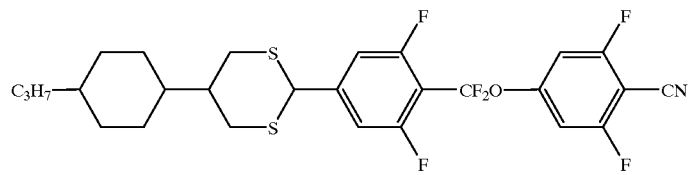 |

-continued
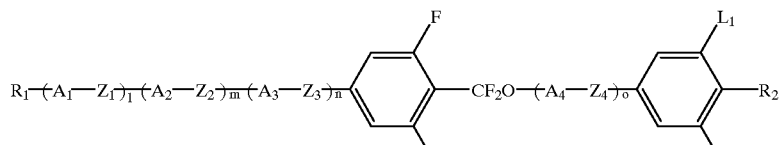
| No. | |
|---|---|
| 645 | 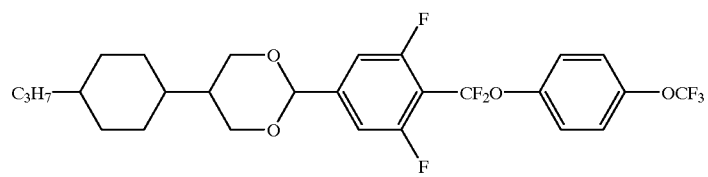 |
| 646 | 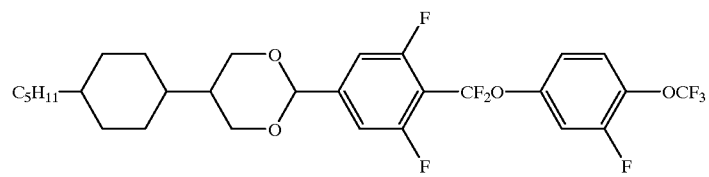 |
| 647 | 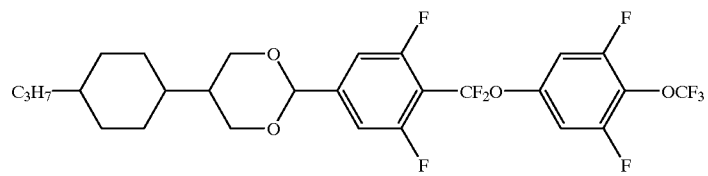 |
| 648 | 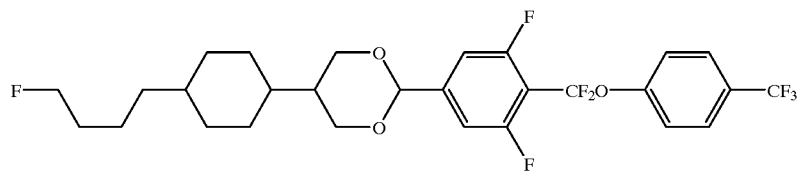 |
| 649 | 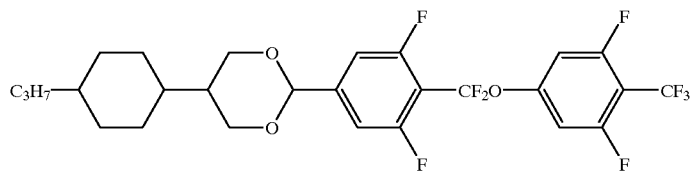 |
| 650 | 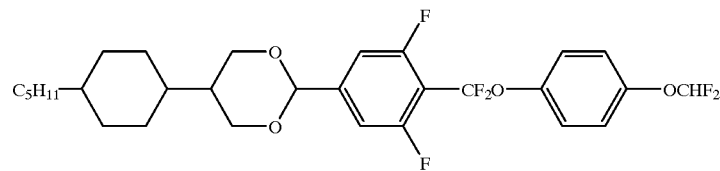 |
| 651 | 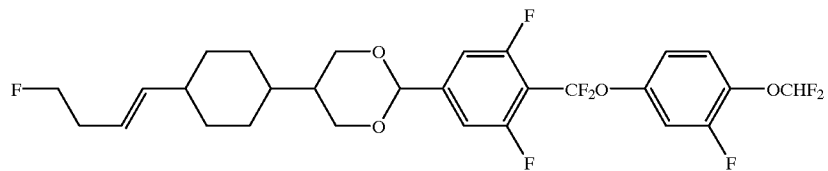 |

-continued
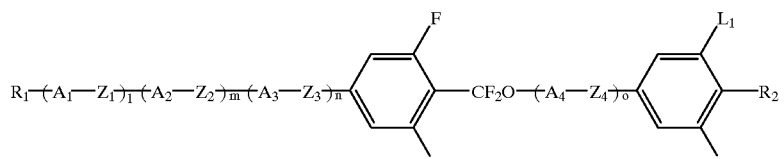
| No. | |
|---|---|
| 652 | 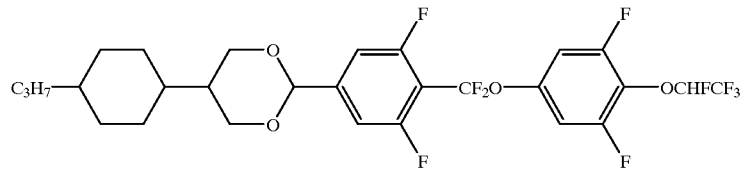 |
| 653 | 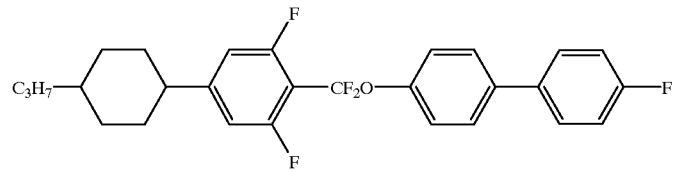 |
| 654 | 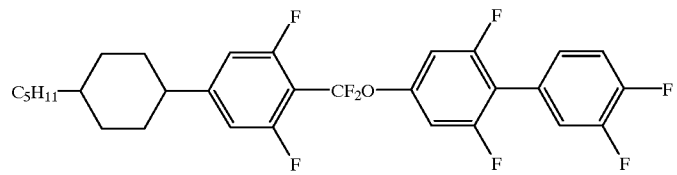 |
| 655 | 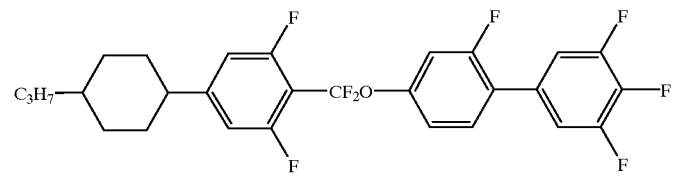 |
| 656 | 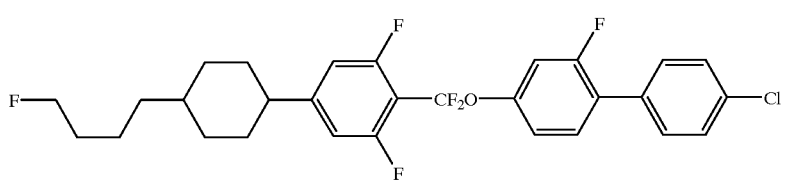 |
| 657 | 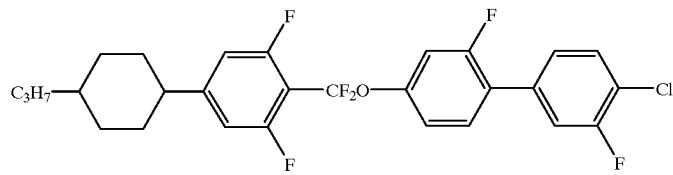 |
| 658 | 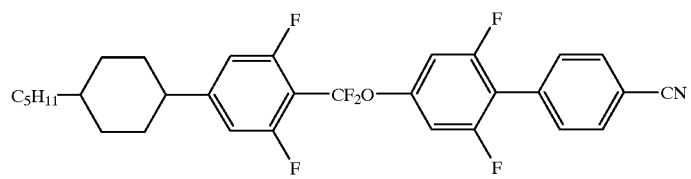 |

-continued
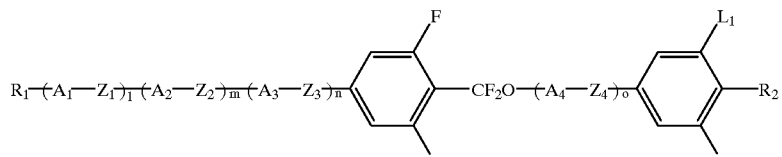
| No. | |
|---|---|
| 659 | 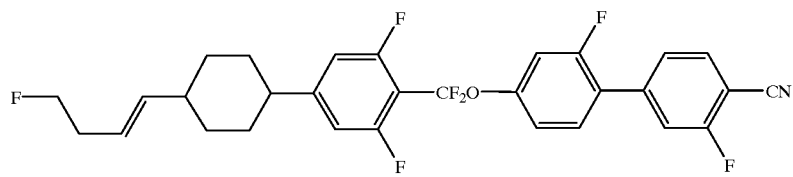 |
| 660 | 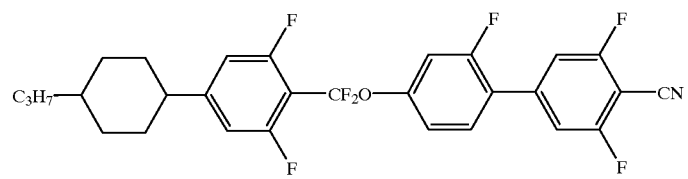 |
| 661 | 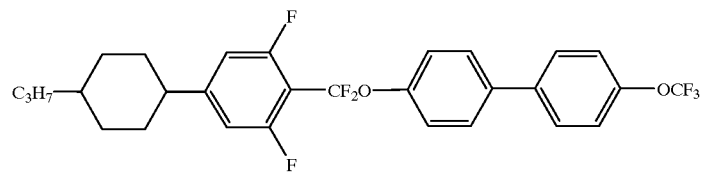 |
| 662 | 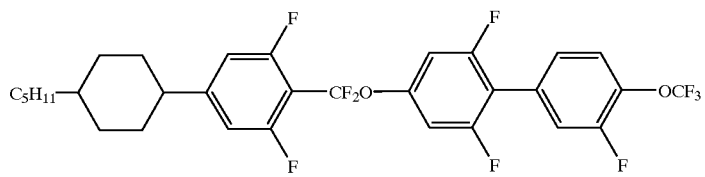 |
| 663 | 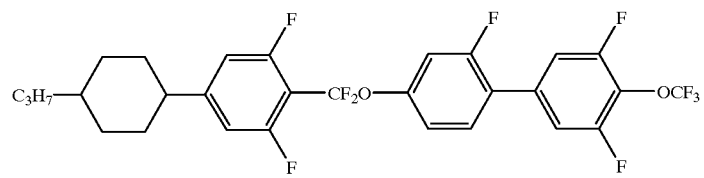 |
| 664 | 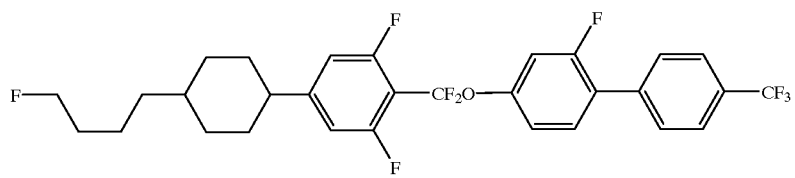 |
| 665 | 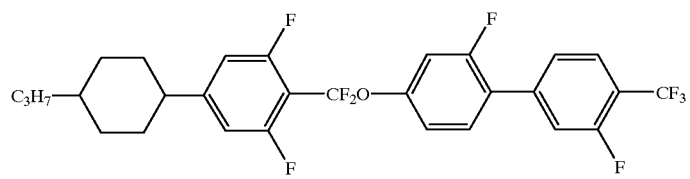 |

-continued

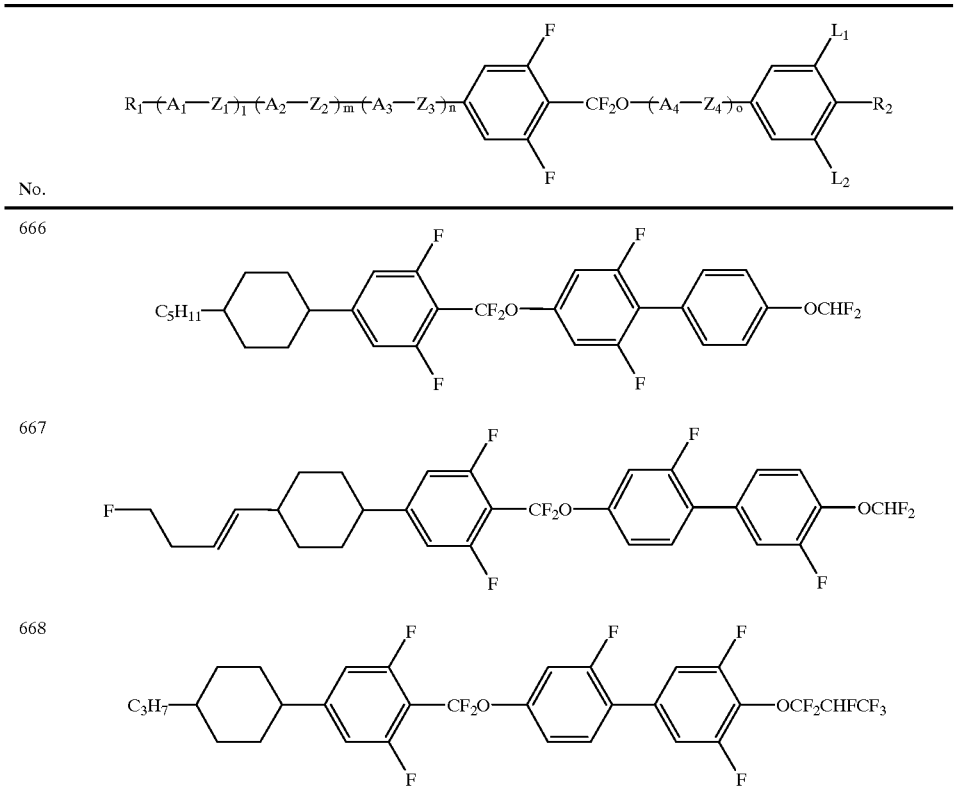

| No. | |
|---|---|
| 666 | |
| 667 | |
| 668 | |

The method of this invention makes it possible to produce more easily and effectively the benzene derivative which is useful for photoelectric material and others compared with conventional methods.

Furthermore, by reacting the benzene derivative obtained by the method of this invention with the phenol derivative in the presence of base material, difluorobenzyl ether expected for liquid crystalline materials can be prepared easily and effectively.

What is claimed is:

1. A method for producing a benzene derivative represented by the formula (3) according to Scheme 1, where $R_1$ represents hydrogen or alkyl having 1 to 15 carbons, one or more methylene groups in the alkyl which are not adjacent to each other may be replaced by oxygen, sulfur or —CH=CH—, and any hydrogen in the alkyl may be replaced by fluorine; $A_1$, $A_2$ and $A_3$ each independently represent trans-1,4-cyclohexylene in which one or more methylene groups constituting the ring may be replaced by oxygen or sulfur, or 1,4-phenylene in which one or more hydrogens on the ring may be replaced by fluorine; $Z_1$, $Z_2$ and $Z_3$ each independently represent a single bond, —$CH_2CH_2$—, —$(CH_2)_4$—, —$CH_2O$— or —$OCH_2$—; l, m and n each independently represent 0 or 1; and $Y_1$ represents chlorine, bromine or iodine,

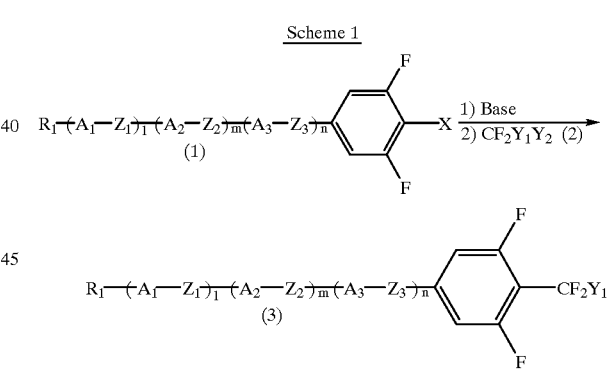

Scheme 1 which method comprises treating a benzene derivative represented by the formula (1), where $R_1$, $A_1$, $A_2$, $A_3$, $Z_1$, $Z_2$, $Z_3$, l, m and n have the same meanings as above; and X represents hydrogen, chlorine, bromine or iodine, with a base to produce a carbanion, and reacting the formed carbanion with a difluoromethane derivative represented by the formula (2), where $Y_1$ and $Y_2$ each independently represent chlorine, bromine or iodine.

2. A method for producing the benzene derivative according to claim 1, wherein both $Y_1$ and $Y_2$ in the formula (2) are bromine.

3. A method for producing the benzene derivative according to claim 2, wherein alkyl lithium is used as the base.

4. A method of producing the benzene derivative according to claim 3, wherein n-butyl lithium is used as the base.

5. A benzene derivative represented by the formula (4)

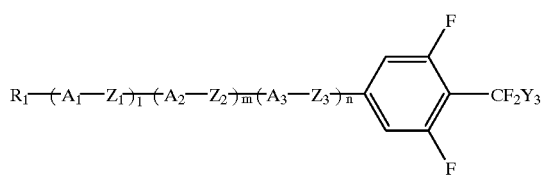

(4)

where $R_1$ represents hydrogen or alkyl having 1 to 15 carbons, one or more methylene groups in the alkyl which are not adjacent to each other may be replaced by oxygen, sulfur or —CH=CH—, and any hydrogen in the alkyl may be replaced by fluorine; $A_1$, $A_2$ and $A_3$ each independently represent trans-1,4-cyclohexylene in which one or more methylene groups constituting the ring may be replaced by oxygen or sulfur, or 1,4-phenylene in which one or more hydrogens on the ring may be replaced by fluorine; $Z_1$, $Z_2$ and $Z_3$ each independently represent a single bond, —CH$_2$CH$_2$—, —(CH$_2$)$_4$—, —CH$_2$O— or —OCH$_2$—; l, m and n each independently represent 0 or 1; and $Y_3$ represents bromine or iodine.

6. A liquid crystalline composition comprising two or more components, at least one of which is a compound represented by the formula (4)

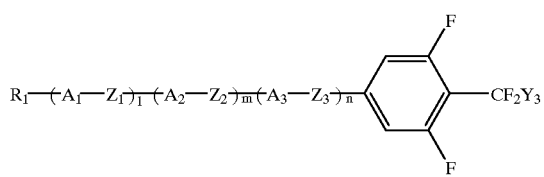

(4)

where $R_1$ represents hydrogen or alkyl having 1 to 15 carbons, one or more methylene groups in the alkyl which are not adjacent to each other may be replaced by oxygen, sulfur or —CH=CH—, and any hydrogen in the alkyl may be replaced by fluorine; $A_1$, $A_2$ and $A_3$ each independently represent trans-1,4-cyclohexylene in which one or more methylene groups constituting the ring may be replaced by oxygen or sulfur, or 1,4-phenylene in which one or more hydrogens on the ring may be replaced by fluorine; $Z_1$, $Z_2$ and $Z_3$ each independently represent a single bond, —CH$_2$CH$_2$—, —(CH$_2$)$_4$—, —CH$_2$O— or —OCH$_2$—; l, m and n each independently represent 0 or 1; and $Y_3$ represents bromine or iodine.

7. A method of producing a difluorobenzyl ether derivative represented by the formula (6) according to Scheme 2, where $R_2$ represents halogen, cyano or alkyl having 1 to 15 carbons, one or more methylene groups in the alkyl which are not adjacent to each other may be replaced by oxygen, sulfur or —CH=CH—, and one or more hydrogens in the alkyl may be replaced by halogen; $A_4$ represents 1,4-phenylene in which one or more hydrogens on the ring may be replaced by halogen; $Z_4$ represents a single bond, —CH$_2$CH$_2$—, —(CH$_2$)$_4$—, —CH$_2$O— or —OCH$_2$—; $L_1$ and $L_2$ each independently represent hydrogen or halogen; o is 0 or 1; $R_1$ represents hydrogen or alkyl having 1 to 15 carbons, one or more methylene groups in the alkyl which are not adjacent to each other may be replaced by oxygen, sulfur or —CH=CH—, and any hydrogen in the alkyl may be replaced by fluorine; $A_1$, $A_2$ and $A_3$ each independently represent trans-1,4-cyclohexylene in which one or more methylene groups constituting the ring may be replaced by oxygen or sulfur, or 1,4-phenylene in which one or more hydrogens on the ring may be replaced by fluorine; $Z_1$, $Z_2$ and $Z_3$ each independently represent a single bond, —CH$_2$CH$_2$—, —(CH$_2$)$_4$—, —CH$_2$O— or —OCH$_2$—; and l, m and n each independently represent 0 or 1, Scheme 2

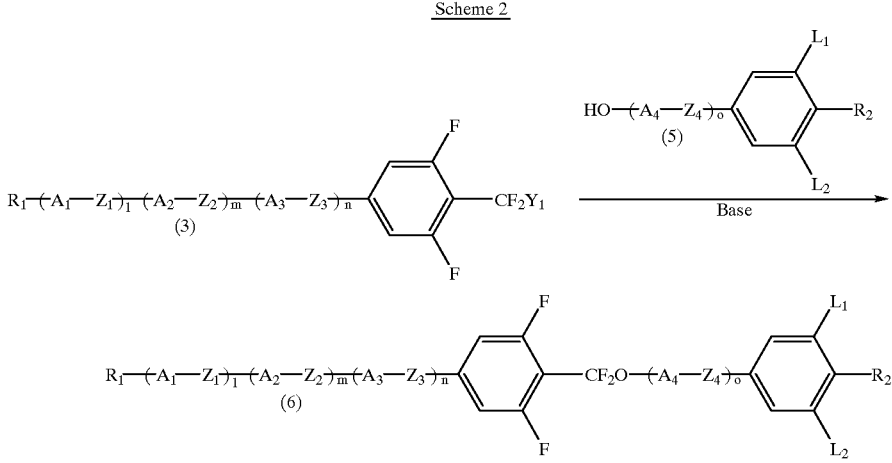

which method comprises reacting a benzene derivative represented by the formula (3), where $R_1, A_1, A_2, A_3, Z_1, Z_2, Z_3$, l, m and n have the same meanings as above, with a phenol derivative represented by the formula (5), where $A_4, Z_4, L_1, L_2$ and $R_2$ have the same meanings as above.

* * * * *